United States Patent [19]
Andersen et al.

[11] Patent Number: 5,830,548
[45] Date of Patent: Nov. 3, 1998

[54] ARTICLES OF MANUFACTURE AND METHODS FOR MANUFACTURING LAMINATE STRUCTURES INCLUDING INORGANICALLY FILLED SHEETS

[75] Inventors: Per Just Andersen; Simon K. Hodson, both of Santa Barbara, Calif.

[73] Assignee: E. Khashoggi Industries, LLC, Santa Barbara, Calif.

[21] Appl. No.: 630,210

[22] Filed: Apr. 9, 1996

Related U.S. Application Data

[63] Continuation-in-part of Ser. No. 631,676, Apr. 9, 1996, and a continuation-in-part of Ser. No. 27,451, Mar. 8, 1993, abandoned, and a continuation-in-part of Ser. No. 101,500, Aug. 3, 1993, abandoned, and a continuation-in-part of Ser. No. 378,880, Jan. 26, 1995, abandoned, and a continuation-in-part of Ser. No. 154,436, Nov. 19, 1993, Pat. No. 5,582,670, and a continuation-in-part of Ser. No. 157,695, Nov. 24, 1993, and a continuation-in-part of Ser. No. 218,971, Mar. 25, 1994, which is a continuation-in-part of Ser. No. 929,898, Aug. 11, 1992, abandoned.

[51] Int. Cl.$^6$ .............................. B32B 3/28; B32B 5/16; B32B 23/18; B65D 85/84

[52] U.S. Cl. .................. 428/36.4; 206/524.3; 206/524.7; 428/35.8; 428/36.6; 428/36.91; 428/43; 428/116; 428/152; 428/155; 428/182; 428/317.9; 428/323; 428/532; 428/906

[58] Field of Search .............................. 428/34.5, 35.6, 428/35.7, 36.4, 36.5, 53, 152, 182, 220, 312.4, 317.9, 339, 532, 906, 35.8, 36.6, 36.91, 43, 116, 155, 323; 206/524.3, 524.7, 819

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |

(List continued on next page.)

FOREIGN PATENT DOCUMENTS

| | | |
|---|---|---|
| 237557 | 8/1988 | Argentina . |
| 241781 | 12/1992 | Argentina . |
| 241782 A1 | 12/1992 | Argentina . |
| 619559 | 5/1961 | Canada . |
| 627550 | 9/1961 | Canada . |
| 0003481 A2 | 8/1979 | European Pat. Off. . |
| 0006390 A1 | 1/1980 | European Pat. Off. . |
| 0263723 A2 | 4/1988 | European Pat. Off. . |

(List continued on next page.)

OTHER PUBLICATIONS

Shah, *Recent Trends in the Science and Technology of Concrete,* Trends in Science and Technology of Concrete. (no date).

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Compositions and methods for manufacturing composite laminate structures incorporating sheets having a moldable matrix are disclosed. Suitable compositions are prepared by mixing together a water dispersable organic binder, water, and appropriate additives (such as aggregates and fibers) which impart predetermined properties so that a sheet formed therefrom has the desired performance criteria. The compositions are formed into sheets by first extruding them into a sheet and then calendaring the sheet using a set of rollers. The calendered sheets are dried in an accelerated manner to form a substantially hardened sheet. The drying process is performed by heated rollers and/or a drying chamber. The inorganically filled sheets so formed may have properties substantially similar to sheets made from presently used materials like paper, cardboard, polystyrene, or plastic. Such sheets can be rolled, pressed, scored, perforated, folded, and glued before or after being incorporated into composite laminate structures. Such composite laminate structures have especial utility in the mass production of containers, particularly food and beverage containers.

146 Claims, 18 Drawing Sheets

U.S. PATENT DOCUMENTS

| | | |
|---|---|---|
| 882,538 | 3/1908 | Sargent . |
| 1,223,834 | 4/1917 | Sänger . |
| 1,234,692 | 7/1917 | Poznanski . |
| 1,427,103 | 8/1922 | Haenicke et al. . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,700,615 | 1/1955 | Heijmer et al. . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,943,013 | 6/1960 | Arledter . |
| 2,959,489 | 11/1960 | Wagner . |
| 2,968,561 | 1/1961 | Birnkrant . |
| 3,006,615 | 10/1961 | Mason, Jr. . |
| 3,007,222 | 11/1961 | Ragan . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,403,205 | 9/1968 | Ottenholm . |
| 3,432,317 | 3/1969 | Kelly et al. . |
| 3,458,329 | 7/1969 | Owens et al. . |
| 3,459,632 | 8/1969 | Caldwell et al. . |
| 3,468,993 | 9/1969 | Bierlich . |
| 3,470,005 | 9/1969 | Flacheenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,683,760 | 8/1972 | Silva . |
| 3,689,294 | 9/1972 | Brannauer . |
| 3,697,366 | 10/1972 | Harlock et al. . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,773,700 | 11/1973 | Eash et al. . |
| 3,806,571 | 4/1974 | Rönnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram . |
| 3,968,004 | 7/1976 | Coffey et al. . |
| 3,979,217 | 9/1976 | Sutton . |
| 3,989,534 | 11/1976 | Plunguian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,043,862 | 8/1977 | Roberts . |
| 4,044,166 | 8/1977 | Koizumi . |
| 4,046,584 | 9/1977 | Synder et al. . |
| 4,053,346 | 10/1977 | Amberg et al. . |
| 4,070,196 | 1/1978 | Kraak et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,115,135 | 9/1978 | Goeman . |
| 4,117,059 | 9/1978 | Murray . |
| 4,117,060 | 9/1978 | Murray . |
| 4,121,402 | 10/1978 | Cress et al. . |
| 4,124,550 | 11/1978 | Kabayashi et al. . |
| 4,132,555 | 1/1979 | Barrable . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,158,989 | 6/1979 | Barr . |
| 4,159,302 | 6/1979 | Greve et al. . |
| 4,172,154 | 10/1979 | von Rymon Lipinski . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolom et al. . |
| 4,202,857 | 5/1980 | Lowe . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,229,225 | 10/1980 | Kraszewski et al. . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,269,657 | 5/1981 | Gomez et al. . |
| 4,271,228 | 6/1981 | Foster et al. . |
| 4,272,198 | 6/1981 | Velikov et al. . |
| 4,279,695 | 7/1981 | Winterbottom . |

| | | | | | |
|---|---|---|---|---|---|
| 4,287,247 | 9/1981 | Reil et al. . | 4,735,660 | 4/1988 | Cane . |
| 4,299,790 | 11/1981 | Greenberg . | 4,746,481 | 5/1988 | Schmidt . |
| 4,303,690 | 12/1981 | Haas, Sr. et al. . | 4,749,444 | 6/1988 | Lorz et al. . |
| 4,305,758 | 12/1981 | Powers et al. . | 4,753,710 | 6/1988 | Langley et al. . |
| 4,306,059 | 12/1981 | Yokobayashi et al. . | 4,754,589 | 7/1988 | Leth . |
| 4,310,996 | 1/1982 | Mulvey et al. . | 4,755,494 | 7/1988 | Ruben . |
| 4,313,997 | 2/1982 | Ruff et al. . | 4,772,439 | 9/1988 | Trevino-Gonzalez . |
| 4,326,891 | 4/1982 | Sadler . | 4,775,580 | 10/1988 | Dighton . |
| 4,328,136 | 5/1982 | Blount . | 4,784,693 | 11/1988 | Kirkland et al. . |
| 4,329,177 | 5/1982 | George . | 4,786,670 | 11/1988 | Tracy et al. . |
| 4,353,748 | 10/1982 | Birchall et al. . | 4,789,244 | 12/1988 | Dunton et al. . |
| 4,362,679 | 12/1982 | Malinowski . | 4,797,161 | 1/1989 | Kirchmayr et al. . |
| 4,370,166 | 1/1983 | Powers et al. . | 4,799,961 | 1/1989 | Friberg . |
| 4,373,957 | 2/1983 | Pedersen . | 4,814,012 | 3/1989 | Paul et al. . |
| 4,373,992 | 2/1983 | Bondoc . | 4,828,650 | 5/1989 | Wagle et al. . |
| 4,377,440 | 3/1983 | Gasland . | 4,833,191 | 5/1989 | Bushway et al. . |
| 4,378,271 | 3/1983 | Hargreaves et al. . | 4,836,940 | 6/1989 | Alexander . |
| 4,379,198 | 4/1983 | Jaeschke . | 4,840,672 | 6/1989 | Baes . |
| 4,383,862 | 5/1983 | Dyson . | 4,842,649 | 6/1989 | Heitzmann et al. . |
| 4,406,703 | 9/1983 | Guthrie et al. . | 4,846,932 | 7/1989 | Karita et al. . |
| 4,410,366 | 10/1983 | Birchall et al. . | 4,861,649 | 8/1989 | Browne . |
| 4,410,571 | 10/1983 | Korpman . | 4,863,655 | 9/1989 | Lacourse et al. . |
| 4,415,366 | 11/1983 | Copening . | 4,868,142 | 9/1989 | Waisala et al. . |
| 4,427,610 | 1/1984 | Murray . | 4,872,913 | 10/1989 | Dunton et al. . |
| 4,428,741 | 1/1984 | Westphal . | 4,879,173 | 11/1989 | Randall . |
| 4,428,775 | 1/1984 | Johnson et al. . | 4,888,059 | 12/1989 | Yamaguchi et al. . |
| 4,444,593 | 4/1984 | Schutz . | 4,889,428 | 12/1989 | Hodson . |
| 4,445,970 | 5/1984 | Post et al. . | 4,889,594 | 12/1989 | Gavelin . |
| 4,452,596 | 6/1984 | Clauss et al. . | 4,892,589 | 1/1990 | Kirkland et al. . |
| 4,460,348 | 7/1984 | Iioka et al. . | 4,892,590 | 1/1990 | Gill et al. . |
| 4,462,835 | 7/1984 | Car . | 4,895,598 | 1/1990 | Hedberg et al. . |
| 4,470,877 | 9/1984 | Johnstone et al. . | 4,912,069 | 3/1990 | Ruben . |
| 4,481,037 | 11/1984 | Beale et al. . | 4,919,758 | 4/1990 | Wagle et al. . |
| 4,487,657 | 12/1984 | Gomez . | 4,921,250 | 5/1990 | Ayers . |
| 4,490,130 | 12/1984 | Konzal et al. . | 4,923,665 | 5/1990 | Andersen et al. . |
| 4,497,662 | 2/1985 | Chisholm et al. . | 4,925,530 | 5/1990 | Sinclair et al. . |
| 4,504,315 | 3/1985 | Allemann et al. . | 4,927,043 | 5/1990 | Vanderlaan . |
| 4,522,772 | 6/1985 | Bevan . | 4,927,573 | 5/1990 | Alpár et al. . |
| 4,524,828 | 6/1985 | Sabins et al. . | 4,927,655 | 5/1990 | Ito . |
| 4,529,653 | 7/1985 | Hargreaves et al. . | 4,927,656 | 5/1990 | Ito . |
| 4,529,662 | 7/1985 | Lancaster et al. . | 4,935,097 | 6/1990 | Tashiro et al. . |
| 4,529,663 | 7/1985 | Lancaster et al. . | 4,939,192 | 7/1990 | t'Sas . |
| 4,533,393 | 8/1985 | Neuschaeffer et al. . | 4,941,922 | 7/1990 | Snyder . |
| 4,533,581 | 8/1985 | Asaumi et al. . | 4,943,349 | 7/1990 | Gomez . |
| 4,536,173 | 8/1985 | Puls . | 4,944,595 | 7/1990 | Hodson . |
| 4,545,854 | 10/1985 | Gomez et al. . | 4,948,429 | 8/1990 | Arfaei . |
| 4,549,930 | 10/1985 | Dessauer . | 4,952,278 | 8/1990 | Gregory et al. . |
| 4,551,384 | 11/1985 | Aston et al. . | 4,957,558 | 9/1990 | Ueda et al. . |
| 4,552,463 | 11/1985 | Hodson . | 4,957,754 | 9/1990 | Munk et al. . |
| 4,562,218 | 12/1985 | Fornandel et al. . | 4,963,309 | 10/1990 | Gohlisch et al. . |
| 4,571,233 | 2/1986 | Konzal . | 4,963,603 | 10/1990 | Felegi, Jr. et al. . |
| 4,581,003 | 4/1986 | Ito et al. . | 4,975,473 | 12/1990 | Kaneda et al. . |
| 4,585,486 | 4/1986 | Fujita et al. . | 4,976,131 | 12/1990 | Grims et al. . |
| 4,588,443 | 5/1986 | Bache . | 4,979,992 | 12/1990 | Bache . |
| 4,595,623 | 6/1986 | Du Pont et al. . | 4,983,257 | 1/1991 | Schultz et al. . |
| 4,613,627 | 9/1986 | Sherman et al. . | 4,985,119 | 1/1991 | Vinson et al. . |
| 4,619,636 | 10/1986 | Bogren . | 4,999,056 | 3/1991 | Rasmussen . |
| 4,621,763 | 11/1986 | Brauner . | 5,017,268 | 5/1991 | Clitherow et al. . |
| 4,622,026 | 11/1986 | Ito et al. . | 5,018,379 | 5/1991 | Shirai et al. . |
| 4,623,150 | 11/1986 | Moehlman et al. . | 5,021,093 | 6/1991 | Beshay . |
| 4,636,345 | 1/1987 | Jensen et al. . | 5,030,282 | 7/1991 | Matsuhashi et al. . |
| 4,637,860 | 1/1987 | Harper et al. . | 5,035,930 | 7/1991 | Lacourse et al. . |
| 4,640,715 | 2/1987 | Heitzmann et al. . | 5,039,003 | 8/1991 | Gordon et al. . |
| 4,642,137 | 2/1987 | Heitzmann et al. . | 5,039,378 | 8/1991 | Pommier et al. . |
| 4,650,523 | 3/1987 | Kikuchi et al. . | 5,039,560 | 8/1991 | Durgin et al. . |
| 4,655,981 | 4/1987 | Nielsen et al. . | 5,043,196 | 8/1991 | Lacourse et al. . |
| 4,673,438 | 6/1987 | Wittwer et al. . | 5,047,086 | 9/1991 | Hayakawa et al. . |
| 4,680,023 | 7/1987 | Varano . | 5,049,237 | 9/1991 | Bohrn et al. . |
| 4,707,187 | 11/1987 | Tsuda et al. . | 5,051,217 | 9/1991 | Alpár et al. . |
| 4,707,221 | 11/1987 | Beer et al. . | 5,061,346 | 10/1991 | Taggart et al. . |
| 4,710,422 | 12/1987 | Fredenucci . | 5,071,512 | 12/1991 | Bixler et al. . |
| 4,711,669 | 12/1987 | Paul et al. . | 5,076,985 | 12/1991 | Koch et al. . |

| | | | | | | |
|---|---|---|---|---|---|---|
| 5,076,986 | 12/1991 | Delvaux et al. . | | 5,320,669 | 6/1994 | Lim et al. . |
| 5,082,500 | 1/1992 | Nachtman et al. . | | 5,338,349 | 8/1994 | Farrar . |
| 5,085,366 | 2/1992 | Durgin et al. . | | 5,340,558 | 8/1994 | Friedman et al. . |
| 5,085,707 | 2/1992 | Bundy et al. . | | 5,346,541 | 9/1994 | Goldman et al. . |
| 5,089,186 | 2/1992 | Moore et al. . | | 5,354,424 | 10/1994 | Rha et al. . |
| 5,089,198 | 2/1992 | Leach . | | 5,360,586 | 11/1994 | Wyatt et al. . |
| 5,095,054 | 3/1992 | Lay et al. . | | 5,362,776 | 11/1994 | Barenberg et al. . |
| 5,096,650 | 3/1992 | Renna . | | 5,362,777 | 11/1994 | Tomka . |
| 5,102,596 | 4/1992 | Lempfer et al. . | | 5,366,549 | 11/1994 | Imaizumi et al. . |
| 5,104,487 | 4/1992 | Taggart et al. . | | 5,372,877 | 12/1994 | Kannankeril . |
| 5,104,669 | 4/1992 | Wolke et al. . | | 5,411,639 | 5/1995 | Kurrie . |
| 5,106,423 | 4/1992 | Clarke . | | 5,500,089 | 3/1996 | Huang et al. . |
| 5,106,880 | 4/1992 | Miller et al. . | | 5,506,277 | 4/1996 | Griesbach, III . |
| 5,108,677 | 4/1992 | Ayers . | | 5,512,090 | 4/1996 | Franke . |
| 5,108,679 | 4/1992 | Rirsch et al. . | | 5,512,378 | 4/1996 | Bastioli . |
| 5,110,413 | 5/1992 | Steer . | | | | |
| 5,122,231 | 6/1992 | Anderson . | | FOREIGN PATENT DOCUMENTS | | |
| 5,126,013 | 6/1992 | Wiker et al. . | | 0265745 A2 | 5/1988 | European Pat. Off. . |
| 5,126,014 | 6/1992 | Chung . | | 0271853 B2 | 6/1988 | European Pat. Off. . |
| 5,132,155 | 7/1992 | Singh et al. . | | 0290007 A1 | 11/1988 | European Pat. Off. . |
| 5,134,179 | 7/1992 | Felegi, Jr. et al. . | | 0304401 B1 | 2/1989 | European Pat. Off. . |
| 5,139,615 | 8/1992 | Conner et al. . | | 0118240 B1 | 7/1989 | European Pat. Off. . |
| 5,141,797 | 8/1992 | Wheeler . | | 0340707 A2 | 11/1989 | European Pat. Off. . |
| 5,151,130 | 9/1992 | Croft et al. . | | 0340765 A2 | 11/1989 | European Pat. Off. . |
| 5,153,037 | 10/1992 | Altieri . | | 0370913 B1 | 5/1990 | European Pat. Off. . |
| 5,154,771 | 10/1992 | Wada et al. . | | 0405146 B1 | 1/1991 | European Pat. Off. . |
| 5,156,718 | 10/1992 | Neubert . | | 0447797 A2 | 9/1991 | European Pat. Off. . |
| 5,160,368 | 11/1992 | Begovich . | | 0453980 A2 | 10/1991 | European Pat. Off. . |
| 5,160,676 | 11/1992 | Singh et al. . | | 0497151 A1 | 8/1992 | European Pat. Off. . |
| 5,167,894 | 12/1992 | Baumgarten . | | 0546956 A2 | 6/1993 | European Pat. Off. . |
| 5,169,566 | 12/1992 | Stucky et al. . | | 0551954 A2 | 7/1993 | European Pat. Off. . |
| 5,178,730 | 1/1993 | Bixler et al. . | | 0608031 A1 | 7/1994 | European Pat. Off. . |
| 5,184,995 | 2/1993 | Kuchenbecker . | | 1278195 | 10/1961 | France . |
| 5,185,382 | 2/1993 | Neumann et al. . | | 2642731 | 7/1990 | France . |
| 5,186,990 | 2/1993 | Starcevich . | | 3011330 | 3/1980 | Germany . |
| 5,194,206 | 3/1993 | Koch et al. . | | 2841172 | 4/1980 | Germany . |
| 5,206,087 | 4/1993 | Tokiwa et al. . | | 3420195 A1 | 12/1985 | Germany . |
| 5,208,267 | 5/1993 | Neumann et al. . | | 4008862 C1 | 4/1991 | Germany . |
| 5,221,435 | 6/1993 | Smith, Jr. . | | 47-20190 | 9/1972 | Japan . |
| 5,224,595 | 7/1993 | Sugimoto et al. . | | 51-2729 | 1/1976 | Japan . |
| 5,232,496 | 8/1993 | Jennings et al. . | | 53-16730 | 2/1978 | Japan . |
| 5,240,561 | 8/1993 | Kaliski . | | 54-31320 | 3/1979 | Japan . |
| 5,248,702 | 9/1993 | Neumann et al. . | | 54-48821 | 3/1979 | Japan . |
| 5,252,271 | 10/1993 | Jeffs . | | 55-37407 | 3/1980 | Japan . |
| 5,256,711 | 10/1993 | Tokiwa et al. . | | 55-100256 | 7/1980 | Japan . |
| 5,258,430 | 11/1993 | Bastioli et al. . | | 56-17965 | 2/1981 | Japan . |
| 5,262,458 | 11/1993 | Bastioli et al. . | | 58-120555 | 7/1983 | Japan . |
| 5,264,030 | 11/1993 | Tanabe etal. . | | 60-260484 | 12/1985 | Japan . |
| 5,264,080 | 11/1993 | Shaw et al. . | | 60-264375 | 12/1985 | Japan . |
| 5,266,368 | 11/1993 | Miller . | | 62-36055 | 2/1987 | Japan . |
| 5,268,187 | 12/1993 | Quinlan . | | 62-36056 | 2/1987 | Japan . |
| 5,269,845 | 12/1993 | Grunau et al. . | | 62-39204 | 2/1987 | Japan . |
| 5,272,181 | 12/1993 | Boehmer et al. . | | 62-46941 | 2/1987 | Japan . |
| 5,273,821 | 12/1993 | Olson et al. . | | 62-151304 | 7/1987 | Japan . |
| 5,275,774 | 1/1994 | Bahr et al. . | | 62-253407 | 11/1987 | Japan . |
| 5,277,762 | 1/1994 | Felegi, Jr. et al. . | | 63-00551 | 1/1988 | Japan . |
| 5,277,764 | 1/1994 | Johansson et al. . | | 63-00552 | 1/1988 | Japan . |
| 5,278,194 | 1/1994 | Tickner et al. . | | 63-123851 | 5/1988 | Japan . |
| 5,279,658 | 1/1994 | Aung . | | 63-210082 | 8/1988 | Japan . |
| 5,284,672 | 2/1994 | Ito . | | 63-218589 | 9/1988 | Japan . |
| 5,288,318 | 2/1994 | Mayer et al. . | | 63-248759 | 10/1988 | Japan . |
| 5,288,765 | 2/1994 | Bastioli et al. . | | 63-310780 | 12/1988 | Japan . |
| 5,290,350 | 3/1994 | Besnard et al. . | | 64-37478 | 2/1989 | Japan . |
| 5,290,355 | 3/1994 | Jakel . | | 2-51460 | 2/1990 | Japan . |
| 5,294,299 | 3/1994 | Zeunner et al. . | | 2-141484 | 5/1990 | Japan . |
| 5,298,273 | 3/1994 | Ito . | | 2-190304 | 7/1990 | Japan . |
| 5,300,333 | 4/1994 | Wilkerson et al. . | | 3-80141 | 4/1991 | Japan . |
| 5,308,879 | 5/1994 | Akamatu et al. . | | 3-153551 | 7/1991 | Japan . |
| 5,314,754 | 5/1994 | Knight . | | 3-187962 | 8/1991 | Japan . |
| 5,316,624 | 5/1994 | Racine . | | 3-202310 | 9/1991 | Japan . |
| 5,317,037 | 5/1994 | Golden et al. . | | 3-202313 | 9/1991 | Japan . |
| 5,317,119 | 5/1994 | Ayres . | | 3-208847 | 9/1991 | Japan . |

| | | |
|---|---|---|
| 4-70304 | 3/1992 | Japan . |
| 4-361698 | 12/1992 | Japan . |
| 5-230401 | 12/1993 | Japan . |
| 6-32386 | 2/1994 | Japan . |
| 9100590 | 11/1992 | Netherlands . |
| 453555 | 10/1936 | United Kingdom . |
| 490820 | 8/1938 | United Kingdom . |
| 1584387 | 2/1981 | United Kingdom . |
| 2086748 | 5/1982 | United Kingdom . |
| 2050459 | 6/1983 | United Kingdom . |
| 2192392 | 1/1988 | United Kingdom . |
| 2208651 | 4/1989 | United Kingdom . |
| 2214516 | 9/1989 | United Kingdom . |
| 2220934 | 1/1990 | United Kingdom . |
| 2265916 | 10/1993 | United Kingdom . |
| WO 87/00828 | 2/1987 | WIPO . |
| WO 89/02225 | 3/1989 | WIPO . |
| WO 91/12186 | 8/1991 | WIPO . |
| WO 92/04408 | 3/1992 | WIPO . |
| WO 93/01242 | 1/1993 | WIPO . |
| WO 93/20990 | 10/1993 | WIPO . |
| WO 94/18384 | 8/1994 | WIPO . |
| WO 94/18388 | 8/1994 | WIPO . |

OTHER PUBLICATIONS

Alexanderson, Self–Smoothing Floors Based on Polymer Cement Concrete, *Concrete International* (Jan. 1990).

Algnesberger, The Use of Anionic Melamine Resin as a Concrete Additive, *Cement Lime and Gravel*, (Sep. 1973).

Andersen, *Control and Monitoring of Concrete Production;A Study of Particle Packing and Rheology*, The Danish Academy of Technical Sciences (1990).

Andersen, *Effect of Organic Superplasticizing Admixtures and Their Components on Zeta Potential and Related Properties of Cement Materials*, Pennsylvania State University (1987).

Andersen, *Effects of W/C–Ratio and Dispersion on the Pore Size Distribution of Cement Paste and Concrete*, Paper prepared for MRL by Per Just Andersen (Aug. 1988).

Andersen, *Rheology of Cement Phase, Mortar and Concrete*. (no date).

Andersen, et al., *Tailoring of Cement–Bound Materials By the Use of Packing and Rheological Models* American Ceramic Society (1988).

Andersen, Tailoring of Concrete Materials, *R&H Annual Review* (1988).

Ashby, Materials Selection in Engineering Design, *Indian Journal of Technology*, vol. 28, 217–225 (Jun.–Aug. 1990).

Ashby, Overview No. 80: On the Engineering Properties of Materials, *Acta Metall*, vol. 37, No. 5, 1273–1293 (1989).

Attwood, *Paperboard, The Wiley Encyclopedia of Packaging Technology* 500–506 (Marilyn Bakker ed., 1986).

Bach, *Cement–Based Products Processed the Plastics Way*. (no date).

Bache, *Densified Cement/Ultra–Fine Particle–Based Materials*, Presented at the Second International Conference on Superplasticizers in Concrete, Ottawa, Ontario, Canada (Jun. 10–12, 1981).

Bailey and Higgins, Flexural Strength of Cements, *Nature*, vol. 292, (Jul. 2, 1981).

Bajza, On The Factors Influencing the Strength of Cement Compacts, *Cement and Concrete Research*, vol. 2, 67–78 (1972).

Balaguru and Kendzulak, *Flexural Behavior of Slurry Infiltrated Fiber Concrete (SIFCON) Made Using Condensed Silica Fume*. (no date).

Bardsley, Horizontal Form/Fill/Seal, *The Wiley Encyclopedia of Packaging Technology*, pp. 364–367, (1986).

Baum, et al., *Paper, Kirk–Othmer Concise Encyclopedia of Chemical Technology*, 834–836 (Martin Grayson ed., 1985).

Bemis Co., Inc., Paper Bags, *The Wiley Encyclopedia of Packaging Technology*, pp. 36–39, (1986).

Benbow, et al., The Extrusion Mechanics of Pastes–The Influence of Paste Formulation on Extrusion Parameters, *Chemical Engineering Science*, vol. 42, No. 9, 2151–2162 (1987).

Berg and Young, Introduction to MDF Cement Composites, *Cementing the Future, ACBM*, vol. 1, No. 2 (Fall 1989).

Berger, et al., Acceleration of Hydration of Calcium Silicates by Carbon Dioxide Treatment, *Nature Physical Science*, vol. 240 (Nov. 6, 1972).

Blaha, Ideas in Concrete, *Concrete Products* (Sep. 1992).

Bohrer, Folding Cartons, *The Wiley Encyclopedia of Packaging Technology*, pp. 146–152, (1986).

Bousum, Beverage Carriers, *The Wiley Encyclopedia of Packaging Technology*, pp. 129–132, (1986).

Brady, et al., *Materials Handbook*, 588–594 (1991).

Brown, et al., *An Investigation of a High Speed Shear Mixer on Selected Pastes and Mortars*, Materials Research Society Symp. Proc., vol. 137 (1989).

Bukowski and Berger, *Reactivity and Strength Development of $CO_2$Activated Non–Hydraulic Calcium Silicates*, Cement and Concrete Research, vol. 9, 57–68 (1979).

Clauson, Kaas, et al., *Ekstrudering afFiberbeton–delrapport*, Teknologisk Institut, Byggeteknik, (Jan. 1987).

English Translation: Clauson–Kaas, et al., *Extrusion of Fiber Concrete–Interim Report*, Department of Building Technology, Technological Institute of Denmark.

Clauson–Kaas, *Opsprøjtet Glasfiberbeton i Byggeriet*, Teknologisk Institut Byggeteknik, (1987) (No translation).

Collepardi, et al., Combined Effect of Lignosulfate and Carbonate on Pure Portland Clinker Compounds Hydration, I: Tetracalcium Aluminoferrite Hydration, *Cement and Concrete Research*, vol. 10, pp. 455–462, (1980).

Collepardi, et al., *Influence of Polymerization of Sulfonated Naphthalene Condenate and Its Interaction With Cement*, SP 68–27. (no date).

Davidson and Sittig, *Water–Soluble Resins*, New York: Reinhold Publishing Corp., Chapman & Hall, Ltd., London, (1962).

Devlin et al., Waxes, *The Wiley Encyclopedia of Packaging Technology*, pp. 697–700, (1986).

Dow Plastics, *Thermoforming Process Guide* (no date).

Eriksen and Andersen, *Foam Stability Experiments on Solutions Containing Superplasticizing and Air–Entraining Agents for Concrete*, The Technological Institute, Department of Building Technology, Taastrup, Denmark, 1985.

Eubanks, Cans, Composites, *The Wiley Encyclopedia of Packaging Technology*, pp. 94–98, Marilyn Bakker ed., (1986).

Ferretti, Distributed Reinforcement Concrete Pipes: An Innovative Product, *Concrete International*, (May 1993).

Fördös, Natural or Modified Cellulose Fibres As Reinforcement in Cement Composites, *Concrete Technology and Design*, vol. 5, Natural Fiber Reinforced Cement and Concrete (1988).

Greminger, Jr., and Krumel, *Alkyl and Hydroxyalkylcellulose*, Dow Chemical U.S.A., Midland, Michigan. (no date).

Gresher, Carded Packaging, *The Wiley Encyclopedia of Packaging Technology*, pp. 124–129, (1986).

Gross et al., Flexible Packages, *Modern Packaging Encyclopedia and Planning Guide, Second Edition*, (1972).
Gross et al., Labeling and Printing, *Modern Packaging Encyclopedia and Planning Guide, Second Edition*, (1972).
Gross et al., Materials, *Modern Packaging Encyclopedia and Planning Guide, Second Edition*, (1972).
Gross et al., Rigid and Semirigid Containers: Introduction To Paperboard Containers, *Modern Packaging Encyclopedia and Planning Guide, Second Edition*, (1972).
Gross et al., Shipping and Protection, *Modern Packaging Encyclopedia and Planning Guide, Second Edition*, (1972).
Hanlon, Fibre Tubes, Cans and Drums, *Handbook of Package Engineering*, Second Edition, McGraw–Hill & Co., New York, (1984).
Hewlett, *Physico–Chemical Mechanisms of Admixtures*, Lecture, CGLI Advanced Concrete Technology Course, Cement and Concrete Association Training Center, (May 1, 1975).
Hlaváč, The Technology of Glass and Ceramics, *Glass Science and Technology*, 4: The Technology of Glass and Ceramics, Elsevier Publishing (1983).
Hyland, F–Flute Inches Its Way Into Folding Carton Market, *Paperboard Packaging*, 28–29 (May 1993).
Iler, The Chemistry of Silica: Solubility, Polymerization, Colloid and Surface Properties and Biochemistry, pp. 430–433, John Wiley & Sons, (1979).
Johansen and Andersen, Particle Packing and Concrete Properties, *Materials Science of Concrete II*, 111–147. (no date).
Jones and Berard. Raw Materials Processing, *Ceramics: Industrial Processing and Testing*, Iowa State University Press (1972).
Kaye, Adhesive, *The Wiley Encyclopedia of Packaging Technology*, pp. 14–16, (1986).
Klieger, *Studies of the Effect of Entrained Air on the Strength and Durability of Concretes Made with Various Maximum Sizes of Aggregate*, Research and Development Laboratories of the Portland Cement Association, (Oct. 1952).
Kline, Corrugating Operations and Raw Materials, *Paper and Paperboard: Manufacturing and Converting Fundamentals*, 184–195, 2nd ed., Miller Freeman Publications, Inc. (1991).
Kline, Packaging, *Paper and Paperboard: Manufacturing and Converting Fundamentals*, 2nd ed., Miller Freeman Publications, Inc., 196–211, (1991).
Kline, Paperboard and Properties, *Paper and Paperboard Manufacturing and Converting Fundamentals*, 19–28, 2nd ed., (1982).
Knab, et al., Effects of Maximum Void Size and Aggregate Characteristics on the Strength of Mortar, *Cement and Concrete Research*, vol. 13, 383–390 (1983).
Knudsen, *On Particle Size Distribution in Cement Hydration*, Presented to the 7th International Congress on the Chemistry of Cement, Paris (1980).
Kohn and Jowitt, *Cans Fabrication*, The Wiley Encyclopedia of Packaging Technology, 100–108, Marilyn Bakker ed., (1986).
Laenger, *Designing An Extruder With Allowance for the Properties of Ceramic Extrusion Compounds—Part 1*, cfi/ber. DKG 67, No. 4, (1990).
Laenger, *Extruderauslegung unter Berücksichtingung der Merkmale keramischer Arbeitsmassen*, cfi/Ber. DKG 68, No. 9, (1991).
English translation: *Designing An Extruder With Allowance for the Properties of Ceramic Extrusion Compounds, Part 2a*, (1991).
Laenger, *Extruderauslegung unter Berücksichtingung der Merkmale keramischer Arbeitsmassen*, cfi/Ber. DKG 68, No. 10/11, (1991).
English translation: *Designing An Extruder With Allowance for the Properties of Ceramic Extrusion Compounds—Part 2b*, (1991).
Laenger, *Extruderauslegung unter Berücksichtingung der Merkmale keramischer Arbeitsmassen*, cfi/Ber. DKG 69, No. 3, (1992).
Laenger, *Designing An Extruder With Allowance for the Properties of Ceramic Extrusion Compounds—Part 3*, cfi/Ber. DKG 69, No. 3, (1992).
Laenger, *Extruderauslegung unter Berücksichtingung der Merkmale keramischer Arbeitsmassen*, cfi/Ber. DKG 69, No. 7/8, (1992).
Laenger, *Designing An Extruder With Allowance for the Properties of Ceramic Extrusion Compounds—Part 4a*, cfi/Ber. DKG 69, No. 7/8, (1992).
Laenger, *Extruderauslegung unter Berücksichtingung der Merkmale keramischer Arbeitsmassen*, cfi/Ber. DKG 69, No. 9, (1992).
Laenger, *Designing An Extruder With Allowance for the Properties of Ceramic Extrusion Compounds—Part 4b*, cfi/Ber. DKG 69, No. 9, (1992).
Laenger, *Extruderauslegung unter Berücksichtingung der Merkmale keramischer Arbeitsmassen*, cfi/Ber. DKG 69, No. 10, (1992).
Laenger, *Designing An Extruder With Allowance for the Properties of Ceramic Extrusion Compounds—Part 5a*, cfi/Ber. DKG 69, No. 10, (1992).
Laenger, *Extruderauslegung unter Berücksichtingung der Merkmale keramischer Arbeitsmassen*, cfi/Ber. DKG 70, No. 3, (1993).
Laenger, *Designing An Extruder With Allowance for the Properties of Ceramic Extrusion Compounds—Part 5b*, cfi/Ber. DKG 70, No. 3, (1993).
Lavins, Cans, Composite, Self–manufactured, *The Wiley Encyclopedia of Packaging Technology*, Marilyn Bakker ed., (1986).
Lawrence, The Properties of Cement Paste Compacted Under High Pressure: Research Report 19, *Cement and Concrete Association Research*, Jun. 1969).
Leaversuch, Blowing Agents: Products Minimize Tradeoffs as CFC Phase–out Takes Effect, *Modern Plastics*, (Sep. 1993).
Lecznar and Barnoff, Strength of Neat Cement Pastes Molded Under Pressure, *Journal of the American Concrete Institute*, Concrete Briefs, (Feb. 1961).
Lentz, Printing, *The Wiley Encyclopedia of Packaging Technology*, 554–559., (1986).
Lewis and Kriven, *Microstructure–Property Relationships in Macro–Defect–Free Cement*, MRS Bulletin (Mar. 1993).
Lewis, Sr., *Condensed Chemical Dictionary*, 870 (12th ed. 1993).
Lisiecki, Gabletop Cartons, *The Wiley Encyclopedia of Packaging Technology*, pp. 152–154, (1986).
Litvan and Sereda, Particulate Admixture for Enhanced Freeze–Thaw Resistance of Concrete, *Cement and Concrete Research*, vol. 8, 53–60, Pergamon Press, Inc. (1978).
Lynch et al., Rigid–Paperboard Boxes, *The Wiley Encyclopedia of Packaging Technology*, pp. 76–79, (1986).

Manson, et al., *Use of Polymers in Highway Concrete,* National Cooperative Highway Research Program Report 190, Transportation Research Board of the National Research Council, (1978).

Maries, *The Activation of Portland Cement by Carbon Dioxide.* (no date).

Mass, Premixed Cement Paste, *Concrete International,* (Nov. 1989).

Maycock and Skalny, Carbonation of Hydrated Calcium Silicates, *Cement and Concrete Research,* vol. 4, 69–76 (1974).

Miyake et al., Superplasticized Concrete Using Refined Lignosulfonate and its Action Mechanism, *Cement and Concrete Research,* vol. 15, No. 2, 295–302 (1985).

Moyer, Vertical Form/Fill/Seal, *The Wiley Encyclopedia of Packaging Technology,* pp. 367–369, (1986).

Naaman and Homrich, Tensile Stress–Strain Properties of SIFCON, *ACI Materials Journal* (May–Jun. 1989).

Niël, *Supplementary Paper II–117, The Influence of Alkali––Carbonate on the Hydration of Cement* (1968).

Purton, The Effect of Sand Grading On The Calcium Silicate Brick Reaction, *Cement and Concrete Research,* vol. 4, 13–29 (1974).

Putnam, et al., *Papermaking Additives, Kirk–Othmer Concise Encyclopedia of Chemical Technology,* 836–837 (Martin Grayson ed., 1985).

Radek, Closure Lines, *The Wiley Encyclopedia Packaging Technology,* 171–172, Marilyn Bakker ed., (1986).

Reingold, Cans, Steel, *The Wiley Encyclopedia Packaging Technology, ,* 109–118, Marilyn Bakker ed., (1986).

Robinson, Extrusion Defects, *Structures Produced by Extrusion,* 391–407. (no date).

Rosenberg and Gaidis, *A New Mineral Admixture for High––Strength Concrete–Proposed Mechanism for Strength Enhancement,* Second International Conference on the Use of Fly Ash, Silica Fume, Slag and Natural Pozzoplans in Concrete, Madrid, Spain (Apr. 21–25, 1986).

Roy, New Strong Cement Materials: Chemically Bonded Ceramics, *Science,* vol. 235–6 (Feb. 6, 1987).

Roy, et al., *Processing of Optimized Cements and Concretes Via Particle Packing,* MRS Bulletin (Mar. 1993).

Roy, et al., Very High Strength Cement Pastes Prepared by Hot Pressing and Other High Pressure Techniques, *Cement and Concrete Research,* vol. 2, 349–366 (1972).

Satas, Equipment Coating, *The Wiley Encyclopedia of Packaging Technology,* pp. 186–191, (1986).

Sciaudone, Rigid–Plastic Boxes, *The Wiley Encyclopedia of Packaging Technology,* pp. 78–79, (1986).

Sequa Chemicals, Inc., Technical Data, *Sunrez® 700 Series Insolubilizers Coating Additive* (no date).

Shilstone, Sr., *Concrete Mixture Optimization by Coarseness Factor, Mortar Factor & Particle Distribution,* Report for American Concrete Institution Convention, San Diego, California, U.S.A. (no date).

Shilstone, Sr., Mix Temperature and $$$$$, *Concrete Producer News,* (Oct. 1989).

Shilstone, Sr., *Mixture Optimization for Fast–Track,* Report for Transportation Research Board 69th Annual Meeting. (no date).

Sievers, Chub Packaging, *The Wiley Encyclopedia of Packaging Technology,* pp. 170–171, (1986).

Sikora, Paper, *The Wiley Encyclopedia of Packaging Technology,* 497–500 (Marilyn Bakker ed., 1986).

Skalny and Bajza, Properties of Cement Pastes Prepared by High Pressure Compaction, *ACI Journal,* Title No. 67–11, (Mar. 1970).

Skalny, et al., Low Water to Cement Ratio Concretes, *Cement and Concrete News,* vol. 3, 29–40 (1973).

Soroushian, et al., Recycling of Wood and Paper in Cementitious Materials, *Materials Research Society Symposium Proc.,* vol. 266, (1992).

Staley Starch and Specialty Products Group, Technical Data.*Sta–Lok® 400 Cationic Potato Starch,* (no date).

Stix, Concrete Solutions, *Scientific American* (Apr. 1993).

Strabo, et al., *Cementbaserede Hybridkompositter,* Teknologisk Institut, Byggeteknik, TR–Projekt 1985–133/177–85.533 (1987).

English Translation—Strabo, et al., *Cement–Based Hybrid Composites,* Technological Institute of Denmark, Department of Building Technology, TR–Project 1985–133/177–85.533 (1987).

Strabo, et al., *Fiberbeton Teknologi,* Teknologisk Institut, Byggeteknik, TR–Project 133/117–82.042 (1986).

English Translation—Strabo, et al., *Fiber Concrete Technology,* Technological Institute of Denmark, Department of Building Technology, TR–Project 133/177–82.042 (1986).

Strabo, et al., *Ekstrudering af Fiberbeton,* Teknologisk Institut, Byggeteknik, TR–Project 1985–133/177–85.538 (Oktober 1987).

English Translation—Strabo, et al., *Extrusion of Fiber Concrete,* Danish Technological Institute, Department of Building Technology, TR–Project 1985–133/177–85.538 (Oct. 1987).

Strabo, et al., *Nye Formgivningsmetoder til Fiberbeton,* Teknologisk Institut, Byggeteknik, TR–Project 1984–133/117–84.028 (Apr. 1987).

English translation—Strabo, et al., *New Design Methods for Fiber Concrete,* Technological Institute of Denmark, Department of Building Technology, TR–Project 1984–133/117–84.028 (Apr. 1987).

Studt, New Advances Revive Interest In Cement–Based Materials, *R&D Magazine* (Nov. 1992).

Sun et al., *The Composition of Hydrated DSP Cement Pastes.* (no date).

Sutherland, Air–Entrained Concrete, *Cement and Concrete Association,* (1970).

Suzuki, et al., Formation and Carbonation of C–S–H In Water, *Cement and Concrete Research,* vol. 15, 213–224 (1985).

Swec, Corrugated Boxes, *The Wiley Encyclopedia of Packaging Technology,* pp. 66–76, (1986).

Swientek, Formidable Films, *Prepared Foods,* 118–121 (Sep. 1993).

Unwalla, et al., Recycled Materials for Making Concrete, *The Concrete Journal,* vol. 53, No. 9 (Sep. 1979).

Verbeck, Carbonation of Hydrated Portland Cement, Cement and Concrete, *Special Technical Publication No. 203,* American Society for Testing Materials, (1958).

Vrana, Khashoggi Kin Reported Planning Private Placement of Shares in New Container Firm, *Los Angeles Business Journal,* (Mar. 28, 1993).

Wagner, Polymer Modification of Portland Cement Systems, *Chemtech* (Feb. 1973).

Weinrich, *German Comes Up With Recycled Product to Replace Foam Chips.* (no date).

Weiss, et al., *High Tensile Cement Pastes as a Low–Energy Substitute for Metals, Plastics, Ceramics, and Wood. Phase I: Preliminary Technological Evaluation,* CTL Project CR7851–4330, Final Report Prepared for U.S. Dept. of Energy (Nov. 1984).

Westman and Hugill, *The Packing of Particles* (1930).

Young, Macro–Defect–Free Cement: A Review, *Materials Research Society Symposium Proc.,* vol. 179, (1991).

Yudenfreund, et al., Hardened Portland Cement Pastes of Low Porosity II: Exploratory Studies, Dimensional Changes, *Cement and Concrete Research,* vol. 2, 331–348 (1972).

Yudenfreund, et al., Hardened Portland Cement Pastes of Low Porosity, V: Compressive Strength, *Cement and Concrete Research,* vol. 2, 731–743 (1972).

Zeneca.,*Biopol, Nature's Plastic–Born from Nature, Back to Nature* (no date).

Zukoski and Struble, Rheology of Cementitious Systems, *MRS Bulletin* (Mar. 1993).

Cementing the Future: A New Extrusion Technology, *ACBM,* vol. 6, No. 1 (Spring 1994).

Doing More With Less: Optimizing Concrete Mix, *Better Roads,* (Aug. 1990).

*Fiberbeton—nyt,* Teknologisk Institut, Byggeteknik, Blad nr. 1 (Oct. 1987).

English translation—*Fiber Concrete News,* The Technological Institute of Denmark, Department of Building Technology, Pamphlet No. 1 (Oct. 1987).

*Nye Metoder i Beton Kan Betyde Teknisk Knock–out For Plast* (no date).

English Translation—*New Method for Concrete May Mean Technical Knock–Out for Plastic,* The Engineer, No. 14 (1986).

*Plastic–Forming Processes.* (no date).

*Report of the Panel on Solids Processing.* (no date).

*Space–Age Concrete That May Sub for Steel.* (no date).

*Starch Foam Dishes at Burger King's,* Biomat 32–Production Unit for Natural Packaging. (no date).

*The Coating Process for Paper* (1993).

*The Colcrete Process: Its History, Advantages, and Applications,* Undated Publication.

*Zien In The Food Industry,* Freeman Industries, Inc. (no date).

100 μm

100 μm

100 μm

⊢⊣
100 μm

⊢⊣
100 μm

100 μm

100 μm

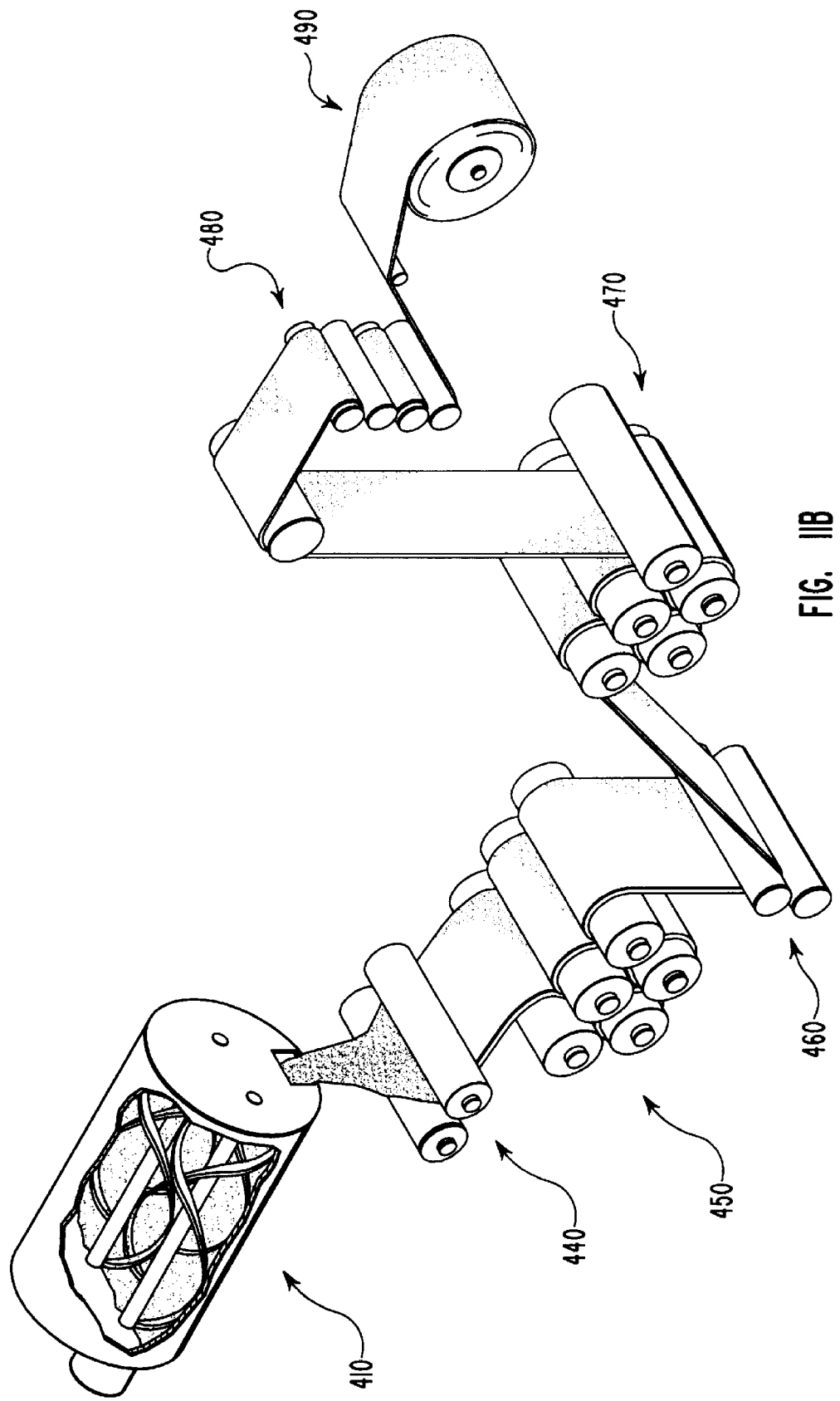

ARTICLES OF MANUFACTURE AND METHODS FOR MANUFACTURING LAMINATE STRUCTURES INCLUDING INORGANICALLY FILLED SHEETS

1. Related Applications

This application is a continuation-in-part of copending U.S. application Ser. No. 08/631,676, entitled "Methods for Manufacturing Molded Sheets Having a High Starch Content", and filed Apr. 9, 1996, in the names of Per Just Andersen, Ph.D., Shaode Ong, Ph.D., Bruce J. Christensen, Ph.D., and Simon K. Hodson (pending); and also a continuation-in-part of copending U.S. application Ser. No. 08/027,451, entitled "Laminate Insulation Barriers Having a Cementitious Core Structural Matrix and Methods for Their Manufacture", and filed on Mar. 8, 1993, in the name of Per Just Andersen, Ph.D., and Simon K. Hodson, abandoned; and also a continuation-in-part of copending U.S. application Ser. No. 08/101,500, entitled "Methods and Apparatus for Manufacturing Moldable Hydraulically Settable Sheets Used in Making Containers, Printed Materials, and Other Objects," and filed Aug. 3, 1993 in the names of Per Just Andersen, Ph.D. and Simon K. Hodson, abandoned; and also a continuation-in-part of copending U.S. application Ser. No. 08/378,880, entitled "Design Optimized Concrete Manufacturing Process," and filed Jan. 26, 1995, in the names of Per Just Anderson, Ph.D. and Simon K. Hodson, abandoned; and also a continuation-in-part of copending U.S. application Ser. No. 08/154,436, filed Nov. 19, 1993, issued as U.S. Pat. No. 5,582,670; and also a continuation-in-part of copending U.S. application Ser. No. 08/157,695, entitled "Methods and Apparatus for Manufacturing Articles of Manufacture from Sheets Having a Highly Inorganically Filled Organic Polymer Matrix," and filed Nov. 24, 1993, in the names of Per Just Anderson, Ph.D. and Simon K. Hodson (pending); and also a continuation-in-part of copending U.S. application Ser. No. 08/218,971, entitled "Methods of Molding Articles from Inorganically Filled Compositions," and filed Mar. 25, 1994, in the names of Per Just Anderson, Ph.D. and Simon K. Hodson (pending). Each of these applications is also a continuation-in-part of copending U.S. application Ser. No. 07/929,898, entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson, abandoned. For purposes of disclosure, the foregoing patents and applications are incorporated herein by specific reference.

BACKGROUND OF THE INVENTION

2. The Field of the Invention

The present invention relates to layers, sheets, or continuous sheets of materials which are incorporated into composite laminate structures and articles of manufacture; it also relates to methods and apparatus for manufacturing composite laminate structures and articles of manufacture which incorporate such materials in the form of layers, sheets, or continuous sheets. More particularly, inorganically filled layers, sheets, or continuous sheets (hereinafter collectively referred to as "sheets," "continuous sheets," or "inorganically filled sheets") can be used in laminate composite structures in much the same manner as paper, paperboard, cardboard, fabric, plastic, polystyrene, or metals would be used in conventional laminate composite structures.

3. The Relevant Technology a. Engineering Analysis of Laminate Composite Structures Laminating to improve the properties of materials or to combine several materials into a single material is not a new concept. The Twentieth Century has experienced the rapid expansion of the lamination principle into a great variety of different applications, which expansion is accelerating at an increasingly rapid pace. To a large degree, therefore, it represents something new in the field of material science.

Material scientists and materials engineers find use for laminate composite materials in increasing volume and in more and more diverse fields because:

1. They combine the properties of their component parts to obtain composite properties which may be new or unique; and/or
2. They make it easier or less costly to obtain certain properties than is possible with "solid," homogeneous, single materials.

Examples of the beneficial results of laminates are replete: plastics-based laminates combining strength, flexibility, chemical and electrical properties, and abrasion resistance; structural sandwiches possessing high weight-strength ratios; laminated timbers made in sizes and shapes unattainable in solid timber; safety glass owing its value to the combination of quite different materials; the behavior of thermostat metals depending on the combination of dissimilar metals; and clad metals combining strong or inexpensive cores with highly corrosion-resistant faces. The list can be greatly extended.

Because composite materials are nonhomogeneous, anisotropic, and difficult to characterize, a sophisticated approach is required to analyze and design with them. A basic ply or lamina of a composite structure can be considered as orthotopic with two principal material directions or natural axes—parallel and perpendicular to the direction of the filaments. By bonding these laminas together to form a multi-lamina composite laminate, the designer has a material in which he can change the directional properties by changing the orientations of the various laminas. Thus, the designer is able to design a structure with a material that precisely matches the directional loading requirements at the considered point of the structure.

Unlike bulk metals, bulk ceramics, or bulk polymers, which must be sized by the maximum design load and direction (and, hence, are overdesigned when considering the smaller loads in other directions), composite materials can be made to fit precisely the design requirements. The result is more efficient utilization of the material and also reduced weight if the strength-to-weight ratio of the composite material is comparable with that of the metal. Since the strength-to-weight ratios of composites are actually greater than those of the commonly used structural metals, one possible effect of designing with composites is to lighten the resultant structure.

b. Evolution of Laminate Composite Structures

Early examples of laminates include glued wood, in the form of parallel-laminated members and plywood, which laminates are often considered to be relatively new. Ancient Egyptian laminated wood, now in the possession of The Metropolitan Museum of Art, New York, was found at Thebes and belongs to the Eighteenth Dynasty (about 1500 B.C.). Many combinations of several layers of wood are found in a variety of ancient Egyptian items. The Romans used plywood for fine furniture. The greatly increased use of plywood and its application to engineering structures is, however, a recent phenomenon, largely made possible by improved synthetic adhesives and manufacturing techniques.

The makers of arms and armor, in the Near and Far East as well as in Europe, understood the value of laminated metal as early as the fifteenth century. Typical laminated structures in armor utilized alternating layers of steel and iron. These craftsmen understood intuitively and by experience the subtle principles of blunting and arresting fracture, a subject of fundamental research by present-day investigators.

Modern composite engineering laminates, of course, are not generally made by such painstaking hand processes as are employed in fabricating fine pieces of armor. The basic principles—orientation of structure and strength properties, combinations of hardness, toughness, lightness, strength, durability, and other desirable engineering attributes—are essentially the same. Because no one material is adequate to the task, materials are combined—laminated—in order to obtain the combined properties or unique new properties necessary to fulfill the requirements of a particular engineering application.

While laminates are found in a great variety of shapes and forms, such as those mentioned above, a principle interest in the present application is the process of laminating layers, such as sheets. This generally involves the layering of sheets to produce a composite structure, which structure is preferably engineered to possess a type and kind of beneficial material properties. The means of so producing, as well as the choices of materials therefor, are quite varied.

Processing of sheets is an old technology which started with textile treatment and paper coating for wall covering application. These materials were joined by plastic films and by metal foils, all requiring surface treatment for one or another purpose. The combination of various substrates by lamination has since become an important technology.

The equipment used for combining continuous webs, often called "web converting and treatment equipment," has evolved gradually. Invention of continuous paper manufacturing also created a need for continuous paper treatment, such as coating and printing. Equipment developed for one specific purpose found applications in other fields. Materials which were introduced later (e.g., plastic films) benefited by the web handling technology developed for paper and textiles.

While the general concept of web coating technology is old, new equipment development continues. By way of example, increased use of hot melt coatings created a need for different application equipment, and the introduction of radiation curable coatings based on reactive monomers and oligomers created a need for new application and curing equipment.

Continuous webs of nearly every type are considered candidates for lamination processing. Films, papers, glassines, and metal foils, and nearly every material which can be manufactured in roll or sheet form are combined in the laminating process. The resulting multiple laminates have physical and chemical properties that would be unobtainable from any single component. Moisture vapor and gas transmission rate, abrasion resistance, stiffness, gloss and tensile strength are only a few of the properties which can be manipulated through the proper choice of material and adhesive system. Flexible packaging, health care, and electrical and energy conservation industries have long made use of the laminating process. Such uses are described below.

c. Commercial Uses for Composite Laminate Structure (1) Packaging Containers Made From Laminates With few exceptions, advanced processing and packaging techniques utilize coated or laminated container and wrapping materials. Such advanced processing and packaging techniques presently allow an enormous variety of liquid and solid goods to be stored, packaged, or shipped while being protected from harmful elements. Packaging protects goods from environmental influences and distribution damage, particularly chemical and physical influence and damage.

Packaging helps protect an enormous variety of goods from gases, moisture, light, microorganisms, vermin, physical shock, crushing forces, vibration, leaking, or spilling. In addition, food or beverage products may be dispensed using specific packaging aids, such as disposable cups, plates, or boxes (such as the "clam shell" frequently used in the fast food industry for burgers, sandwiches, and salads). Packaging also provides a medium for the dissemination of information to the consumer, such as the origin of manufacture, contents, advertising, instructions, regulatory notices, brand identification, and pricing.

Typically, most coated or laminated containers and cups (including disposable containers) include a substrate made from paper, cardboard, plastic, polystyrene, glass, and metal materials. Each year over one hundred billion aluminum cans, billions of glass bottles, and millions of tons of paper and plastic are used in storing and dispensing soft drinks, juices, and beer. Outside of the beverage industry, packaging containers, and especially disposable containers, made from such materials are ubiquitous.

In order to keep certain items hot, containers made from polystyrene have been used. Although paper or plastic coated or laminated containment products can be equipped with special handles, polystyrene containers have remained the superior disposable container of choice when insulation is required, because of insulation capabilities, cost, and stability.

In spite of the more recent attention that has been given to reduce the use of paper, cardboard, plastic, polystyrene, and metal materials, they continue to be used because of strength properties and mass produceability. Moreover, for any given use for which they are designed, such materials are relatively inexpensive, lightweight, easy to mold, strong, durable, and resistant to degradation during use.

(2) The Impact of Paper, Plastic, Glass and Metal.

Recently there has been a debate as to which of these materials (e.g., paper, cardboard, plastic, polystyrene, glass, or metal cans) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each has its own unique environmental weaknesses and disadvantageous properties.

For example, while polystyrene itself is a relatively inert substance, its manufacture involves the use of a variety of hazardous chemicals and starting materials. Unpolymerized styrene is very reactive and therefore presents a health problem to those who must handle it. Because the manufacture of styrene uses benzene (a known mutagen and considered to probably be a carcinogen), residual quantities of benzene can be found in styrene. Polystyrene is very slow to degrade and discarded containers can persist for a long time.

More potentially damaging has been the use of chlorofluorocarbons (or CFC's) in the manufacture of "blown" or "expanded" polystyrene products. This is because CFC's have been linked to the destruction of the ozone layer. In the manufacture of foams, including blown polystyrene, CFC's (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) are still significantly harmful and their elimination would be beneficial.

In light of these problems, some environmental groups have favored a temporary return to the use of natural products such as paper or wood, which are believed to be more biodegradable. Nevertheless, other environmental groups have taken the opposite view in order to minimize cutting trees and depleting the forests. By way of example, it takes over one-half million trees each week to make America's Sunday newspapers, most of which are thrown away. Almost half of the trash thrown away in landfills is paper of one sort or another. Every year in America alone, enough white office paper is thrown away to build a twelve foot wall of paper extending from Los Angeles to New York City.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. Products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is environmental contamination by dioxin, a harmful toxin. Dioxin, or more accurately, 2,3,7,8-tetrachlorodibenzo[b,e][1,4]-dioxin, is a highly toxic contaminant and is extremely dangerous even in very low quantities. The highest level of dioxin allowed in the discharge waters from paper mills is about 0.5 part per trillion. However, fish found downstream from paper pulp mills can contain amounts as high as 200 parts per trillion of dioxin, with levels of 50 parts per trillion being not uncommon.

The manufacturing processes of metal cans (particularly those made of aluminum and tin), glass bottles, and ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. Further, while glass can be recycled, that portion which ends up in landfills is essentially nonbiodegradable. Broken glass shreds are very dangerous and can persist for years.

Even paper or cardboard, believed by many to be biodegradable, can persist for years, even decades, within landfills where they are shielded from air, light, and water, all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, cardboard, polystyrene, and plastic is that each of these requires relatively expensive organic starting materials, some of which are nonrenewable, such as the use of petroleum in the manufacture of polystyrene and plastic. Although trees used in making paper and cardboard are renewable in the strict sense of the word, their large land requirements and rapid depletion in certain areas of the world undermines this notion. Hence, the use of huge amounts of essentially nonrenewable starting materials in making disposable containers cannot be sustained and is not wise from a long term perspective.

Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

d. Inorganic Materials

Man has made great use of essentially nondepletable inorganic materials such as clay, natural minerals, or stone for millennia. Clay has found extensive use because of its ready moldability into a variety of objects including containers, tiles, and other useful objects. However, some of the drawbacks of clay include the time it takes for clay to harden, the need to fire or sinter clay in order for it to achieve its optimum strength properties, and its generally large, heavy, and bulky nature. Unfired clay, in particular, has low tensile strength and is very brittle. Nevertheless, clay has found some use in the manufacture of other materials as a plentiful, inexhaustible, and low-cost filler; such as in paper or cardboard.

Man has also made extensive use of stone in the manufacture of buildings, tools, containers, and other large, bulky objects. An obvious drawback of stone, however, is that it is very hard, brittle, and heavy, which limits its use to large, bulky objects of relatively high mass. Nevertheless, smaller or crushed stone can be used as an aggregate material in the manufacture of other products, such as hydraulically settable, or cementitious materials.

Hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive.

For example, cement is a hydraulically settable binder derived from clay and limestone, and it is essentially nondepletable and very inexpensive compared to the other materials discussed above. Hydraulic cement can be mixed with water and an aggregate material such as crushed stone or pebbles in order to create concrete. However, due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and are molded into the final form by pouring the mixture into a space having externally supported boundaries or walls.

Moreover, hydraulically settable materials have historically been brittle, rigid, unable to be folded or bent, and having low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical cementitious materials have not been suitable for making small, lightweight objects, such as containers or thin sheets, which are better if made from materials with much higher tensile and flexural strengths per unit weight compared to typical hydraulically settable materials.

Some attempts have been made to fill paper with inorganic materials, such as kaolin and/or calcium carbonate, although there is a limit (about 20–35% by volume) to the amount of inorganics that can be incorporated into these products. In addition, there have been attempts to fill certain plastic packaging materials with clay in order to increase the breathability of the product and improve the ability of the packaging material to keep fruits or vegetables stored therein fresh. In addition, inorganic materials are routinely added to adhesives and coatings in order to impart certain properties of color or texture to the cured product.

Nevertheless, inorganic materials only comprise a fraction of the overall material used to make such products, rather than making up the majority of the packaging mass. Because highly inorganically filled materials essentially comprise such environmentally neutral components as rock, sand, clay, and water, they would be ideally suited from an ecological standpoint to replace paper, cardboard, plastic, polystyrene, or metal materials as the material of choice for such applications. Inorganic materials also enjoy a large advantage over synthetic or highly processes materials from the standpoint of cost.

Due to the more recent awareness of the tremendous environmental impacts of using paper, cardboard, plastic, polystyrene, and metals for a variety of single-use, mainly disposable, items such as printed sheets or containers made therefrom (not to mention the ever mounting political pressures), there has been an acute need (long since recognized by those skilled in the art) to find environmentally sound substitute materials. In particular, industry has sought to develop highly inorganically filled materials for these high waste volume items.

In spite of such economic and environmental pressures, extensive research, and the associated long-felt need, the technology simply has not existed for the economic and feasible production of highly inorganically filled, organic polymer bound materials which could be substituted for paper, cardboard, plastic, polystyrene, or metal sheets or container products made therefrom.

Such materials are not only made from nondepletable components, they do not impact the environment nearly as much as do paper, cardboard, plastic, polystyrene, glass, or metal. Another advantage of inorganic materials is that they are far less expensive than paper, cardboard, plastic, polystyrene, or metals.

While paper, cardboard, plastic, polystyrene, glass, and metal products might be comparably priced to each other, they are far more expensive than typical highly inorganically filled materials. Because no rational business would ignore the economic benefit which would necessarily accrue from the substitution of significantly less expensive materials for paper, cardboard, plastic, polystyrene, or metals, the failure to do so can only be explained by a marked absence of available technology to make such a substitution.

e. Summary

In light of the foregoing, what is needed are new materials other than paper, cardboard, plastic, polystyrene, or metal which can be used in the manufacture of laminates, and particularly in the manufacture therefrom of containers used in storing, dispensing, and packaging liquids or solids, including such food or beverage containers. Such materials would represent a significant advancement in the art if they could be made with a lessened degree of reliance on the use of trees, petroleum, or other essentially nonrenewable or slowly renewing resources as the source of the primary starting material.

It would be a significant improvement in the art to provide compositions and methods which yielded inorganically filled sheets and laminates made therefrom, which inorganically filled sheets have properties similar to paper, cardboard, polystyrene, plastic, or metal. It would yet be a tremendous improvement in the art if such inorganically filled sheets could be used in the formation and manufacture of commercially useful laminates. Another improvement in the art would be to provide methods of making laminates incorporating the aforesaid inorganically filled sheets as laminates which could in turn be formed into commercially useful containers and other articles.

It would also be an improvement in the art if such containers and other articles could be made using the same or similar manufacturing apparatus and techniques as those presently used to form containers and other articles conventionally made from laminates incorporating plies of paper, cardboard, polystyrene, plastic, or metal sheets. It would yet be an important advancement in the art if such laminates and the containers and other articles made therefrom resulted in the generation of less waste than that involved in the manufacture of laminates incorporating plies of paper, cardboard, plastic, polystyrene, or metals.

In addition, it would be a significant improvement in the art if such inorganically filled sheets and the laminates incorporating the same were more readily degradable into substances which are commonly found in the earth than the degradability of conventional laminates of paper, cardboard, plastic, polystyrene, or metal sheets.

From an economic point of view, it would be a significant improvement if the aforesaid compositions and methods made possible the manufacture of laminates at a cost comparable, or even superior to existing methods of manufacturing laminates from existing materials. Specifically, it would desirable to reduce the energy requirements and the initial capital investment costs for making products normally using laminates of paper, cardboard, polystyrene, plastic, or metal sheets.

From a manufacturing perspective, it would be a significant advancement in the art of sheet making to provide inorganically filled mixtures and methods for mass producing inorganically filled sheets which can rapidly be formed and substantially dried within a matter of minutes from the beginning of the manufacturing process, which sheets could then be incorporated into laminates for further processing into communally useful objects such as containers.

Such laminate structures incorporating inorganically filled sheets and methods for manufacturing such laminate structures are disclosed and claimed herein.

SUMMARY AND OBJECTS OF THE INVENTION

The present invention relates to novel compositions and methods for the manufacture of a wide variety of laminates formed, at least in part, from inorganically filled layers. Such layers can have properties similar to paper, cardboard, plastic, polystyrene, or thin-walled metals. The layers are formed from moldable inorganically filled materials and are generally in a dry or semi-dry state when incorporated into a composite laminate structure. Dry inorganically filled sheets can be remoistened in order to introduce additional flexibility and elongation to avoid splitting or cracking while the sheet layer is being formed into an object, before or after the sheet layer is incorporated into a composite laminate structure.

A variety of properties can be imparted to the inorganically filled sheet by laminating it. For the purposes of this specification and the appended claims, the terms "laminated sheet" or "laminate" (when used as a noun) shall refer to a sheet having at least two layers with at least one of the layers being an inorganically filled layer or sheet. The terms "laminating material" or "lamina" shall refer to any constituent layer of the laminated sheet, including both an inorganically filled sheet or other material. Laminates having any combination of layers are within the scope of this invention to the extent that one layer of the laminate is an inorganically filled sheet. The laminate can be formed by adding, bonding, or otherwise joining at least two layers together. The thickness of the laminate may vary depending on the nature of intended properties of the laminate.

The laminating material that is bonded, adhered, or otherwise joined to the layer of the laminate comprising an inorganically filled sheet may comprise another inorganically filled sheet, any material which imparts a desired property to the inorganically filled sheet when the two are laminated together, materials which are described below as coatings and adhesives, or combinations thereof. Examples of materials which enhance the properties of the inorganically filled sheets include foils, ionomers, elastomeric sheets, plastics, fibrous sheets or mats, papers, cellophanes, nylons, waxes, and metallized films.

Laminates within the scope of this invention can be formed using continuous inorganically filled sheets, individual inorganically filled sheets, blanks cut from inorganically filled sheets, and in some cases after one layer has been formed into a container. Conventional laminators can be utilized to combine an inorganically filled layer with another layer. Laminates can also be created by coextruding two or more inorganically filled sheets or an inorganically filled sheet with another material that is water compatible.

It is also within the scope of the present invention to create a laminate by foil stamping. Foil stamping involves the use of heat and pressure to transfer a thin metallic or pigmented coating from a carrier film to the inorganically filled layer to obtain patterned decorative effects. This technique can be utilized in combination with embossing to obtain a laminate with a reflective, glossy, raised surface.

Laminates within the scope of this invention can be formed by bonding an inorganically filled sheet and another layer or other layers with or without adhesives.

Prior to or during incorporation into a composite laminate structure, the inorganically filled sheets can be printed, coated, crimped, stamped, rolled, pressed, folded, fluted, corrugated, and glued much like paper or cardboard. In some cases, it may be advantageous during the manufacturing process to score, score cut, or perforate the inorganically filled sheet to aid in forming a bend or hinge at a predetermined location within the sheet. The score can be pressed into the surface of the sheet anytime after it is formed; that is, the score can be pressed into the sheet while in the green state, in a semi-hardened state, or after it has become fully dried. The time and location of the placement of a score, score cut, or perforation will depend upon the desired purpose of the score and the properties of the inorganically filled material in question.

The result is the ability to mass produce a wide variety of laminates, and articles made therefrom, which heretofore were manufactured from laminates incorporating plies of paper, cardboard, plastic, polystyrene, or metal, at a cost that is usually competitive with, and in most cases even superior to, the costs involved in using these other materials. By substituting inorganically filled layers for paper, cardboard, plastic, polystyrene or metal plies in a lamination, cost savings are realized not only from the reduced cost of the raw materials, but also from the manufacturing processes which requires less energy and lower initial capital investment.

Moreover, the inorganically filled layers of the present invention comprise an environmentally neutral component, such that the manufacture of laminates incorporating the same, impacts the environment to a much lesser extent than does the manufacture of laminates incorporating these other materials. The inorganically filled layers used to manufacture the laminates of the present invention preferably do not require the use of high concentrations of wood pulp, petroleum products, or other natural resources as do laminates incorporating sheets of paper, plastic, or metals.

Highly inorganically filled materials (also hereinafter referred to as moldable materials) comprise a mixture of a water-dispersible organic binder, water, fibers, and inorganic aggregates having a concentration in a range from about 20% to about 90% by weight of total solids in the mixture. To this mixture, other components can be selectively added such as organic aggregates, dispersants, and hydraulically settable binders. In inorganically filled materials, the organic binder functions as the primary binder, while the hydraulically settable binder is generally added (if at all) in smaller amounts to function as an inorganic fillers and to react with some of the water. Of course, a mixture having a binding quantity of both a hydraulically settable binder and an organic binder may satisfy the definitions of both a "hydraulically settable mixture" and an "inorganically filled mixture". The difference between the two often being only a matter of degree.

In contrast, hydraulically settable materials include a hydraulically settable binder and water to which components such as aggregates, fibers, dispersants, and a rheology-modifying agent can be selectively added to modify the properties of the mixture. The hydraulically settable binder functions as the primary binder for the selected components.

In a highly inorganically filled material, the organic components, such as cellulose-based fibers and/or rheology-modifying agents, will make up a small fraction of the overall mass of the material used to manufacture articles. Together, the organic components will make up usually less than about 60% by weight of the unhardened inorganically filled mixture; preferably, this fraction will be less than about 30% by weight.

In order to design the desired specific functional properties into the inorganically filled mixture (also hereinafter referred to as "moldable mixtures or mixture") and/or the hardened structural matrix for a specific article, a variety of additives can be included within the inorganically filled mixture, such as organic binders, dispersants, one or more aggregate materials, fibers, air entraining agents, blowing agents, or reactive metals. The identity and quantity of any additive will depend on the desired properties or performance criteria of both the inorganically filled mixture as well as the final hardened article made therefrom.

Organic binders are simply polymers that when added to water under certain conditions form long chains that intertwine and capture the components of the mixture. As water is removed from the mixture, these long chains solidify and bind the structural matrix. Because of the nature of these organic binders, however, they also function to modify the rheology of a composition.

Whether the organic material is a binder, or primarily affects the rheology is a matter of degree and is dependent on the concentration. In smaller amounts the organic material primarily affects the rheology. As the amount of organic material is increased, its ability to bind the particles together increases, although it also continues to affect the rheology.

Organic binders can also be added to increase the cohesive strength, "plastic-like" behavior, and the ability of the mixture to retain its shape when molded or extruded. They act as thickeners and increase the yield stress of the inorganically filled mixture, which is the amount of force necessary to deform the mixture. This creates high "green strength" in the molded or extruded product. Suitable organic binders include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual aggregates and binding particles. This allows for the use of less water while maintaining adequate levels of workability. Suitable dispersants include any material which can be adsorbed onto the surface of the binder particles or aggregates and which act to disperse the particles, usually by creating a charged area on the particle surface or in the near colloid double layer.

It may be preferable to include one or more aggregate materials within the inorganically filled mixture in order to add bulk and decrease the cost of the mixture. Aggregates often impart significant strength properties and improve workability. An example of one such aggregate is ordinary sand or clay, which is completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight, rocklike materials. These aggregates are likewise environmentally neutral and relatively inexpensive.

Fibers may be added to the moldable mixture in order to increase the compressive, tensile, flexural, and cohesive strengths of the wet material as well as the hardened articles made therefrom. Fiber should preferably have high tear and burst strengths (i. e., high tensile strength), examples of which include abaca, southern pine, flax, bagasse (sugar cane fiber), cotton, and hemp. Fibers with a high aspect ratio work best in imparting strength and toughness to the moldable material.

Unlike the manufacture of plastic or polystyrene, inorganically filled sheets utilize little or no petroleum-based products or derivatives as starting materials. Thus, although some amount of fossil fuel is necessary to generate the energy used in manufacturing the laminate incorporating the inorganically filled sheet containers, only a fraction of the petroleum used in the manufacture of polystyrene or plastic will be consumed overall. In addition, the energy requirements of producing inorganically filled sheets are much less than the energy requirements of paper manufacturing.

As compared to the manufacture of thin-metal sheets (such as aluminum and tin), the inorganically filled sheets, which are incorporated into the laminates of the present invention, do not result in the continued use of rapidly depleting natural resources. Further, the lower temperature and simplicity of processing conditions used to make inorganically filled sheets reduce the energy costs and the initial capital investment costs.

While laminates are generally comprised of layers of varying materials, some of which may not be environmentally neutral, the incorporation of inorganically filled sheets into at least a portion of the layers of a composite laminate structure is an environmentally positive materials design for reasons stated and to follow. Ideally, objects will be designed for manufacturing to maximize the percentage, types, and kinds of inorganically filled sheets that are incorporated into the laminates.

Another advantage of the inorganically filled sheets incorporated into the laminates of the present invention is that the disposal of such sheets and laminates therefrom impact the environment less harshly than paper and cardboard sheets, and much less than plastic, polystyrene, or metal sheets. The moldable materials of the present invention can be readily recycled. Nevertheless, even if not recycled, the moldable materials used in the present invention can be discarded and reduced to a fine granular powder that has a composition complementary to the components of the earth into which they will be placed.

This disintegration process is not dependent on biodegradation forces but will occur as a result of various forces which may be present, such as moisture and/or pressure. For example, the voids in the structural matrix of the inorganically filled matrix make the structural matrix easier to crush. In addition, the organic binders are subject to breakdown by microorganisms.

If containers and other objects made from laminates of the inorganically filled sheets are discarded into a landfill, the inorganically filled sheet can crumble into a fine powder under the weight of the other garbage present. If discarded onto the ground, the forces of water and wind, and even fortuitous compressive forces such as from cars or pedestrian traffic treading on them, will cause the inorganically filled sheets to be reduced to a largely inorganic, harmless granular powder in a short period of time relative to the normally required time for the typical disposable article made from sheets of paper or polystyrene to decompose under the same circumstances.

A can or cup made from laminated sheets of polystyrene, plastic, or metal which is thrown into a lake or stream will not decompose for decades, perhaps even centuries, while inorganically filled sheets in laminated portions of a like container will dissolve in a short period of time into essentially a dirt-like powder, the time of dissolution being dependent largely on the mix design of the moldable mixture used to manufacture the sheet that is incorporated as a layer into the laminated portion of the like container.

In general, the particular qualities of any embodiment of the moldable material of the present invention can be designed beforehand using a materials science and microstructural engineering approach in order to give the microstructure of the structural matrix the desired properties, while at the same time remaining cognizant of the costs and other complications involved in large scale manufacturing systems. This materials science and microstructural engineering approach, instead of the traditional trial-and-error, mix-and-test approach, allows for the design of inorganically filled sheets with the desired properties of high tensile and flexural strength, low weight, low cost, and low environmental impact, which sheets may then be incorporated into a great variety of composite laminate structures.

A preferred method of manufacturing the inorganically filled sheets within the scope of the lamination of the present invention includes the steps of (1) mixing a water dispersible binder and water to form an inorganically filled mixture; (2) adding other desired materials such as dispersants, aggregates, and fibers to create an inorganically filled mixture having the desired Theological as well as ultimate strength, weight, and low cost properties; (3) placing the moldable mixture into an extruder, such as an auger or piston extruder; (4) extruding the mixture through an appropriate die to form a flat sheet of a desired thickness or a pipe or other article that can be unfolded into a sheet; (5) improving the surface quality, and optionally, reducing the thickness of the sheet by passing it between at least one pair of forming rollers; (6) removing at least part of the water within the sheet to create a sheet having a structural matrix with sufficient strength and durability to be processed into a container (typically by heating the forming rollers through which the sheet is passed); and (7) further processing steps (such as calendaring, drying, surface finishing and coating) for fashioning at least a portion of a desired composite laminate structure from the dry or semi-dry inorganically filled sheet.

In addition, the inorganically filled sheet can be optionally compacted while still in a slightly moistened condition in order to eliminate unwanted voids created from the evaporation of water from within the structural matrix, increase the fiber adhesion, reduce porosity, and/or increase surface smoothness. This is carried out by passing the sheet through one or more separate sets of compaction rollers. By carefully controlling the water content, it will be possible to ensure that the compaction rollers only compress and increase the density of the sheet without further elongating the sheet. The compaction step improves the strength of the final hardened sheet by creating a more uniform structural matrix, while also leaving the sheet with a smoother finish. The optional compaction step is generally preferred in the case of thinner sheets where strength per unit of thickness should be maximized and where insulation ability is less important. Compaction is generally unnecessary or undesirable for thicker sheets intended to have high insulation and/or low weight characteristics.

The inorganically filled sheet can also be optionally scored, score cut, or perforated while in a slightly moistened or even in the dry condition in order to create a fold line within the structural matrix upon which the sheet can be bent. Optionally, the sheet could be passed through a set of corrugation rollers in order to produce a corrugated sheet and/or cardboard.

In addition, coatings can be applied to the surface of the inorganically filled sheet for a number of reasons, such as to make the sheet more waterproof, more flexible, or to give it a glossier surface. Coatings based upon materials such as soybean oil or methylcellulose, either alone or in combination with polyethylene glycol, can be applied to the surface in order to permanently soften the sheet or a hinge within the sheet. Adhesive coatings can be applied to aid in making a composite laminate structure from the inorganically filled sheets. Elastomer, plastic, or paper coatings can aid in preserving the integrity of the hinge whether or not the underlying hardened moldable matrix fractures upon bending at the hinge.

In the case of commercial packaging containers made from laminates incorporating inorganically filled sheets, it may be desirable to print on the sheets or otherwise attach indicia or logos on the surface thereof, such as by embossing or engraving the surface.

Finally, it may be desirable to pass the inorganically filled sheets between one or more pairs of finishing rollers consisting of a hard and soft roller, the hard roller leaving a glossy finish on one side while the soft roller provides friction so that the sheet can be pulled with some tension. The finishing rollers can also impart a textured or roughened finish to the sheets.

After the inorganically filled sheet has been dried and has been optionally treated using any of the other procedures set forth above, it can either be used immediately for incorporation into a composite laminate structure as would, e.g., a sheet of paper, cardboard, plastic, polystyrene, or metal, or it can be stored for later use by, for example, rolling the sheet onto a spool in a warping operation or by cutting and stacking the sheets onto a pallet in a sheeting operation.

During the subsequent process of forming the inorganically filled sheet into the desired shape or composite laminate structure, it is often advantageous to remoisten a hardened inorganically filled sheet in order to temporarily increase the flexibility, bendability, and resilience of the sheet. This is particularly true in the case where the sheet will be rolled or has been scored and is expected to make a particularly sharp bend during a sheet shaping or forming stage. After the sheets are rolled and/or bent into the desired configuration, before or after being incorporated into a composite laminate structure, it may be necessary to glue the ends or seams together using adhesive methods known to those skilled in the art of converting or container making. It may also be necessary in some cases to trim excess material from the final product using cutting means known to those in similar arts.

It will be understood that fibers are a preferred additive which increases the strength, flexibility, ductility, bursting strength, and bendability of the inorganically filled sheets. Fibers are particularly important where the sheet has been scored and is expected to bend over a larger angle. In addition, the properties imparted to the hardened inorganically filled sheets by the fibers can be increased by unidirectionally or bidirectionally orienting the fibers within the rolled sheet. Depending on the shape of the extruder die head, the extrusion process itself will tend to orient the fibers in the "Y" (or longitudinal) direction. The sheet thickness reduction process, during which the inorganically filled sheet is also elongated, further orients the fibers in the "Y" direction.

In addition, by using multiple pairs of rollers having different diameters, the sheet can be spread (increased in width) such that a percentage of the fibers will be oriented towards the "X" (or width-wise) direction. In this way an inorganically filled sheet having bidirectionally oriented fibers (or with cross-directional strength) can be manufactured. As a result, desired strength characteristics can be engineered into the resultant sheet, the sheet being in turn incorporated into a composite laminate structure. Such laminates may then be made into containers and other objects.

In the manufacture of a composite laminate structure from two or more sheets, at least one of which is an inorganically filled sheet, there are three basic laminating techniques. Each of these three techniques is discussed below.

The first basic lamination process is commonly termed a wet bond or a wet laminating process and involves combining two sheets before a solvent which is applied therebetween is removed or is cured. If an adhesive is applied to a substrate and immediately combined with a second web or sheet, reference is made to the process as wet laminating. The process name dates from the time when most adhesives were water-based modified caseins, hide glues, and silicates. After laminating, the composite laminate structure passes through a drying system where the water is evaporated.

This definition has now been expanded to include any adhesive product where combining occurs before solvent removal or curing. One hundred percent solids radiation curable adhesives as well and one-and two-component moisture and self-initiated types are included. If a solvent-based adhesive is used, one of the sheets must be permeable to the solvent so that removal strength in the drying system is not impeded.

The wet laminating method has traditionally been used to combine one impervious and one porous, or two porous sheets, with an aqueous, solvent, wax, or hot melt adhesive. Its contemporary use is wider, because it can also be used for 100% solid adhesives.

In wet laminating, the adhesive is applied to the impervious sheet in order to minimize the adhesive usage and combined with the second sheet as soon as possible thereafter, followed by drying, cooling, or curing. The practice of applying the adhesive to the impervious sheet does not necessarily have to be done with 100% solid adhesives, because little if any penetration takes place on a porous sheet before the curing process. Electron beam curable adhesives can be used with transparent or opaque webs. Ultraviolet curable adhesives can only be used if one sheet is transparent. Inorganically filled sheets are generally opaque but can be made somewhat transparent with increased pressure during the forming process so as to decrease air voids and porosity therein.

Some of the 100% solid adhesives are supplied as two component systems, and one has to be applied to each sheet, and then combined. Therefore, two gravure coasters, known to those of skill in the converting arts, are required.

The second basic lamination process is commonly termed a dry bond processes which means that two continuous sheets are combined after a solvent applied therebetween is removed. In dry bond laminating, adhesive is applied to a substrate, the solvent is removed in a drier, and the exposed adhesive is brought into contact with the receptive surface of the secondary sheet in a combining nip between a pair of rollers. In contrast to wet bond laminating, most dry bond combining is done at elevated pressures and temperatures. Adhesive coat weights may be very low (0.6 g/m$^2$) or high (15 g/m$^2$ or more). After solvent removal, the viscosities are so high, at least 50 Pa's, that flow from between the plies is virtually nonexistent. In fact, heat and pressure are intentionally used to level any residual application irregularities that might degrade laminate clarity. But this process is not always successful because thermal web distortion may occur before any appreciable flow takes place.

Dry bond lamination can be contrasted to wet bond lamination in that the former method is used to combine two impervious sheets. One sheet, preferably the easiest to handle and pass through a drying system, is coated, the volatiles removed, and then combined with the second sheet in a heated and pressurized nip rolling system.

The third basic lamination process is called a thermal bond process, meaning that two sheets are combined by heat and pressure only. Thermal laminating is more complex than either dry or wet bonding. The high temperatures and pressures normally encountered produce extreme sheet stresses which make outstanding controls mandatory for all variable factors desirable. Small changes in pressure and temperature will affect the bonding of sheets. Tiny tension variations may produce wrinkles.

Thermal laminating requires a heat activatable element which can serve as the adhesive. This adhesive component may take three forms:

(1) A coating preapplied to either or both sheets to be combined;

(2) A coating applied in-line on the machine which is heat activatable as contrasted to most dry bond adhesives; or (3) A thermoplastic sheet such as an ethylene-vinyl acetate modified low-density polyethylene. Adhesives of several types are available in sheet form.

Thermal laminating can be done with the two sheets brought together under pressure at the nip between two rollers, one of which may be heated. Thermal laminating with a single nip between the two rollers will be a slow process with top speed not much above 70 m/min. Making the heated roller very large will increase the top speed in some cases, since this will permit sheet contact (preheat) before the combining nip.

Difficulties exist with thermal laminating and such an approach presents some practical problems. For example, if the machine is stopped for any reason, plastic sheets will melt or adhere to the hot roll. In such an instance, the machine must be rethreaded before starting.

By using the foregoing methods for incorporating inorganically filled sheets into composite laminate structures, it is possible to use such laminates for the manufacture of a wide variety of containers, including, but not limited to the following: cartons, boxes, corrugated boxes, sandwich containers, "clam shell" containers (folded packages typically used with food, particularly sandwiches), frozen food boxes, milk cartons, fruit juice containers, beverage carriers, "six pack" holders for soda, beer, or other beverages, ice cream cartons, cups (including but not limited to disposable drinking cups, one piece pleated cups and two piece cold cups), french fry containers used by fast-food outlets, fast food carryout boxes, packaging, flexible packaging such as bags for snack foods, bags with an open end such as grocery bags and bags within cereal boxes, wraparound casing, support cards for products which are displayed with a cover, particularly plastic covers (including food products such as lunch meats, office products, cosmetics, hardware items, and toys), support trays (for supporting products such as cookies and candy bars), cans, yogurt containers, convoluted or spiral wound containers (for products such as frozen juice concentrate, oatmeal, potato chips, ice cream, salt, detergent, and motor oil), mailing tubes, tubes for rolling materials (such as wrapping paper, cloth materials, paper towels and toilet paper), sleeves, cigar boxes, confectionery boxes, boxes for cosmetics, plates, vending plates, pie plates, trays, baking trays, bowls, breakfast plates, microwave heating of food dinner trays, "TV" dinner trays, egg cartons, meat packaging platters, meat wraps, sausage wraps, food containers, substantially spherical objects, bottles, jars, cases, crates, dishes, lids, straws, envelopes, cutlery, three-ring binders, book covers, folders, toys, medicine vials, ampules, animal cages, barf bags, nonflammable firework shells, model rockets and engine shells, and an endless variety of other objects. Such other objects include pipe and electrical cable insulation, magazine and book covers, paper and paperboard substitute material, and pipe and electrical magnetic cards.

From the foregoing, an object of the present invention is to provide inorganically filled sheets which are in turn incorporated into composite laminate structures. These inorganically filled sheets are used in substitution for or in combination with sheets formed from, e.g., paper, cardboard, polystyrene, plastic, or metals.

Another object and feature of the present invention is to provide compositions and methods which yield inorganically filled sheets which are incorporated into laminates, which laminates are formed into containers which have properties similar to those of paper, cardboard, polystyrene, plastic, or metals. A further object of the present invention is to provide inorganically filled sheets incorporated into a composite laminate structure, which structure can be formed into a variety of containers using the same or similar manufacturing apparatus and techniques as those conventionally used to form such objects from, e.g., paper, cardboard, plastic, polystyrene, or metals.

Yet another object and feature of the present invention is to provide compositions and methods for manufacturing inorganically filled sheets and incorporation of same into composite laminate structures, which structures result in a lesser degree of the generation of wastes involved in the manufacture of paper, plastic, polystyrene, or metal materials. Still a further object and feature of the present invention is to provide inorganically filled sheets in laminates, which sheets are readily degradable into substances which are commonly found in the earth.

Another object of the present invention is to provide compositions and methods which make possible the manufacture of laminates having inorganically filled sheets incorporated therein at a cost comparable to and even superior to existing methods of manufacturing laminates from existing materials.

Still another object and feature of the present invention is to provide methods of manufacture of laminates which are less energy intensive, conserve valuable natural resources, and require lower initial capital investments compared to those used in making laminates from existing materials.

A further object of the present invention is to provide compositions which contain less water which has to be removed during the manufacturing process (as compared to paper manufacturing) in order to shorten the processing time and reduce the initial capital equipment investment.

Finally, an additional object and feature of the present invention is to provide compositions and methods for mass producing inorganically filled sheets incorporated into composite laminate structures (and objects such as containers therefrom) which can rapidly be formed and substantially dried within a matter of minutes from the beginning of the manufacturing process.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 7b is a view of the tree paper on top of the laminate shown in FIG. 7a.

FIG. 7c is a view of the bottom side of the inorganically filled sheet in the laminate shown in FIG. 7a.

FIG. 9c is a view of the bottom side of the inorganically filled sheet of the laminate shown in FIG. 9a.

FIG. 11b is a schematic view of a second preferred system used to manufacture an inorganically filled sheet, including a mixer, extruding rollers, drying rollers, compaction rollers, finishing rollers, and spooler.

DETAILED DESCRIPTION OF THE PREFERRED EMBODIMENTS

The present invention utilizes novel inorganically filled compositions (also hereinafter referred to collectively as "moldable materials", "mixtures" or "compositions") and methods to mold inorganically filled sheets that can be utilized in a manner comparable to conventional paper, cardboard, plastic, polystyrene, or metal sheets in the making of composite laminate structures, which structures are in turn used to make articles such as containers. Such sheets can be cut, incorporated into laminates, and the laminates formed (such as by rollers or folding) into a variety of containers conventionally made using materials other than laminates of inorganically filled materials sheets. The compositions and methods of the present invention are particularly useful in the mass production of disposable food or beverage packaging containers, although not particularly limited thereto.

The present invention is broadly described as a laminate structure comprising first and second sheets laminated together. At least the first layer has an inorganically filled matrix. The highly inorganically filled matrix comprises the reaction products of a water-dispersible organic binder, water, fibers, and inorganic aggregates.

Figure 1:
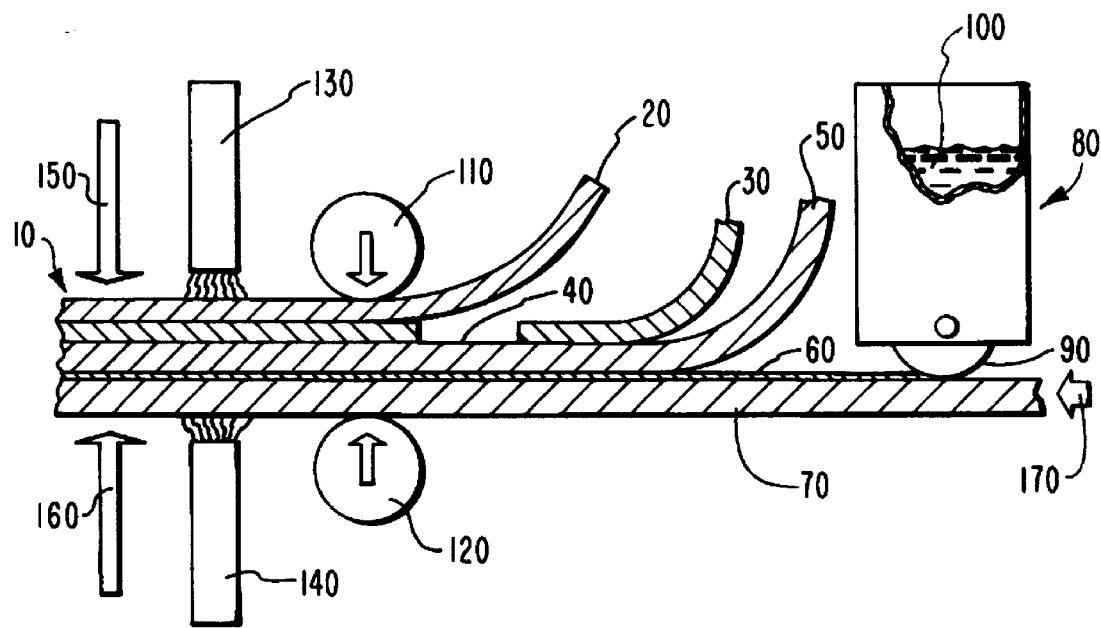
FIG. 1 is a sectional view of the system used to manufacture a laminate incorporating one or more inorganically filled sheets, including a coating roller with heater, compaction rollers with a nip therebetween (optionally heated), drying apparatus, and showing exposure of the laminate to external forces.

In a presently preferred embodiment of the invention, as shown in FIG. 1, a composite laminate structure 10 is shown as being composed of a first sheet layer 20, a second layer 30, a pocket or void 40 for containing substances therein, an intermediate sheet layer 50, a coating layer 60, and a second sheet layer 70. A coating and heating device 80 is shown having a coating roller 90 and a coating substance 100 within coating and heating apparatus 80.

Lamination rollers 110 and 120 have a nip therebetween for the purpose of applying inwardly directed forces upon the layers therebetween so as to combine the layers into a lamination. Heating apparatus 130, 140 supplies heat to laminate structure 10. Directional arrow 170 shows the movement direction of laminate structure 10 through lamination roller 110, 120. Force arrows 150 and 160 represent external forces being applied to laminate structure 10. Such forces (arrows 150 and 160) include force from fluids such as gases and liquids, and also include electromagnetic radiation including light. Force arrows 150 and 160 also contemplate exposure of laminate structure i0 to sound, heat, flames or combustion, abrasive forces, and perpendicular mechanically applied forces. Force arrows 150 and 160 are intended to depict those forces against which one or more layers or coatings in laminate structure 10 forms a barrier. Thus, the layers and coatings serve as an example of a means for providing a physical barrier to laminate structure 10.

It is intended that the physical barrier formed by the layers, coatings, or combinations thereof encompass the types of materials capable of forming a wide variety of physical barriers. These physical barriers include barriers to fluids, electromagnetic radiation, sound, heat and fire, abrasion, and tearing.

Barriers to electromagnetic radiation include barriers that reflect, polarize, or absorb electromagnetic radiation, including visible-light, invisible-light, microwave radiation, between infrared and radiowaves including microwave radiation susceptors, radio frequencies in the range of 3 kilohertz to 300 gigahertz, and magnetic waves and fields.

Physical barriers to electricity, including electrical insulators and semiconductor barriers are also intended. Additionally, the layers, coatings, or combinations thereof, are intended to include those which function as electrical conductors, those which are photosensitive, non-opaque with respect to visible light, translucent, or are transparent.

It is also intended that the physical barrier formed by the layers, coatings, or combinations thereof, include barriers to fluids including liquids, water-proof barriers, oil resistant barriers, flavor barriers, and gas and odor barriers such as carbon dioxide and/or oxygen barriers, where the fluid may be absorbed by such barriers.

Other intended physical barriers include barriers to sound, both absorbing and reflecting, and thermal insulation barriers that reflect heat such as metallic materials as do metallic foils. Fire retardant barriers and noncombustible barriers are also contemplated.

The layers, coatings, or combinations thereof, can also be abrasion resistant barriers, and tearing resistance barriers where one layer has a greater resistance to tearing than does another layer in the laminate. Alternatively, it is contemplated that a laminate structure within the scope of the invention incorporates a layer that is more elastic than another layer in the laminate such that the laminate itself will be more elastic than the least elastic layer within the laminate.

Other types of physical barriers within the scope of the inventive laminate include barriers to biological agents including viruses, bacteria, and microorganisms.

A further type of physical barrier which may be incorporated into the inventive laminate is a barrier where two or more layers of sheets composed of a fibrous material have fibers therein that are oriented, the orientation of the fibers in juxtaposed sheets being essentially non-parallel or perpendicular one to the other. Such cross-grain direction of the fibers in juxtaposed sheets forms a physical barrier to bending moments applied to the laminate structure, whereby the laminate is strengthened.

It is intended that layers 20, 30, 50, 60, and 70 in laminate structure 10 shown in FIG. 1, represent a variety of different materials which may be used to form each said layer. Similarly, coating layer 60 may represent any of the coating materials which have been described herein. At least one of layers 20, 30, 50, or 70 is intended to represent and has been provided as an example of a layer having an inorganically filled matrix, wherein the matrix comprises either the reaction products of a water-dispensable organic binder, water, fibers, and inorganic aggregates where the moldable matrix has an average thickness of less than of about 1 cm.

In addition to the requirement that at least one of layers 20, 30, 50, and 70 be composed of a structural matrix of an inorganically filled mixture (hereinafter referred to as "structural matrix"), the other of layers 20, 30, 50, and 70, as well as coating 60, are intended to be composed of materials known to those of ordinary skill in materials science which can be used to form the aforementioned physical barriers and the desired properties thereof. Thus, the materials chosen for a layer of a sheet could be, by way of illustration and not by way of limitation, a plastic or polymer material, a metallic foil or other metallic material, a paper or paper board-like material, a resin impregnated material, a porous or an impervious material, a fibrous material that is oriented or non-oriented, or any other material that will achieve the desired property.

With respect to coating layer 60, it is intended that coating layer 60 be either a single layer or plural coating layers as applied by coating and heating apparatus 80. Coating layer 60 may be, again by way of illustration and not by way of limitation, a microwave susceptor coating, an adhesive coating of any of the adhesive types described herein or equivalents thereof, a wax or oil, a thermal setting resin or epoxy, an organic or an inorganic liquid, or any other substance defined herein as a coating, equivalents thereof, or other material that will achieve the desired properties of a physical barrier stated above. Further, when coating layer 60 is intended to be an adhesive between two layers, then coating layer 60 serves as an example of a means for adhering two layers together.

Heat and roller coating apparatus 80 is intended to apply coating layer 60 of a coating substance 100 upon second sheet layer 70 by means of a roller 90. Also included within coating and heating device 80 is a means for heating coating layer 60 immediately after application of coating layer 60 to second sheet layer 70. Such heating capability of coating and heating device 80 is intended to achieve the thermal bonding lamination technique described above. Heating is supplied by coating and heating device 80 through conventional means.

Lamination rollers 110 and 120 may be heated to accomplish the dry bonding technique described above. Alternatively, they can also be nonheated and merely serve as a nip within which the layers of laminate structure 10 are pressed.

Heating apparatus 130, 140 apply heat through conventional means, including microwave, infrared lamps, or any other known means to heat laminate structure 10 after passing through the nip of lamination rollers 110 and 120. Heaters 130, 140 enable the dry bonding process described above.

When first sheet layer 20 is an inorganically filled mixture (moldable) sheet, and second layer 30 is a porous or fibrous sheet, first sheet layer 20 will form an adhesive bond with second layer 30. Alternatively, if second layer 30 is a plastic or other heat settable polymer, then the composition of first inorganically filled sheet layer 20 will be bonded with second layer 30 when heating apparatus 130, 140 cause the plastic of second layer 30 to heatset in a bond with the inorganically filled sheet of first sheet layer 20.

Figure 2:
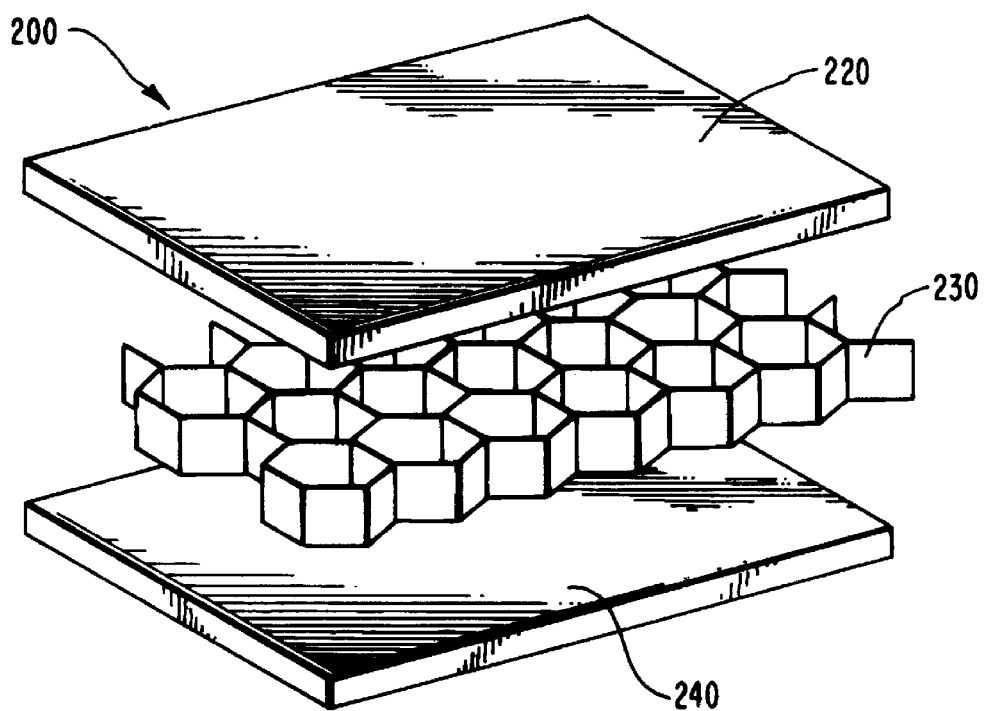
FIG. 2 is a perspective view showing a laminate having two layers laminated to a sheet that is formed into a honeycomb structure.
Figure 3:
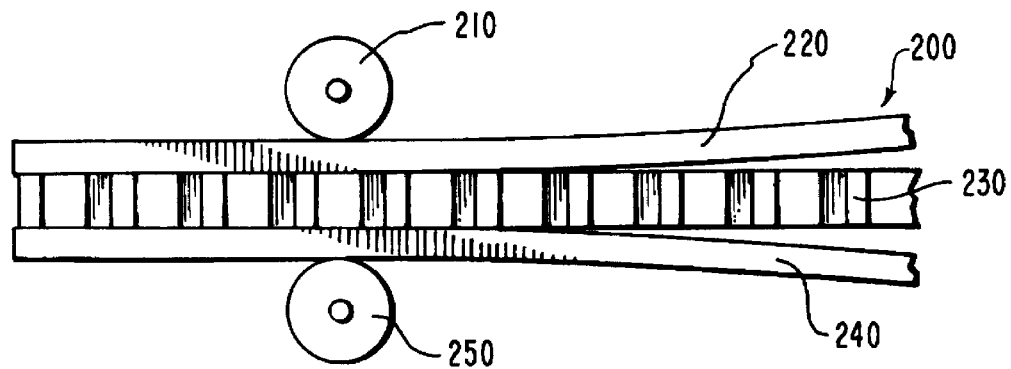
FIG. 3 is a side view of the honeycomb laminate of FIG. 2.

FIGS. 2 and 3 show a sheet 230 formed into a honeycomb shape which honeycomb shape is pressed into a lamination between two lamination rollers 210, 250 and in between a top sheet 220 and a bottom sheet 240. Honeycomb shaped sheet 230 can be formed from an inorganically filled sheet having a resin impregnated composition. Alternatively, top and bottom sheets 220, 240 can also be inorganically filled sheets. Honeycomb shaped sheet 230 is placed in between top sheet 220 and bottom sheet 240 prior to being subjected to pressure at the nip between lamination rollers 210, 250. The resultant laminate 200 is a strong structural laminate which resists bending and elasticity due to the honeycomb structure thereby.

Figure 4:
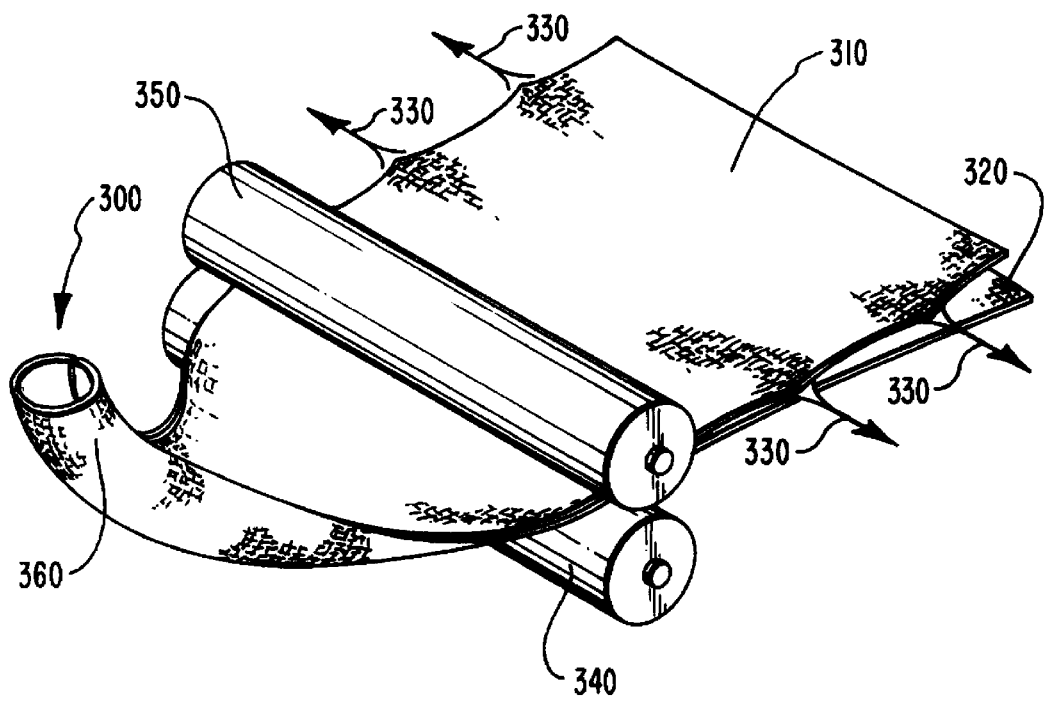
FIG. 4 is a perspective view of a pair of rollers laminating together a sheet under tension to a sheet that is not under tension.

FIG. 4 shows generally at 300 a stretched sheet 310 being subjected to forces 330 prior to lamination to an unstretched sheet 320 at the nip between lamination rollers 340 and 350. Subsequent to the nip point of lamination rollers 340 and 350, the resultant laminant assumes an arcuate or tubular shape as shown at 360. The resultant curl in the shape is due to the lamination of a stretched sheet to an unstretched sheet and the lesser relaxation forces of the two sheets as compared to the bond therebetween. Stretched sheet 310 or unstretched sheet 320 can be inorganically filled sheets as described herein, or any other material, given that at least one of the two sheets is an inorganically filled sheet.

Figure 5:
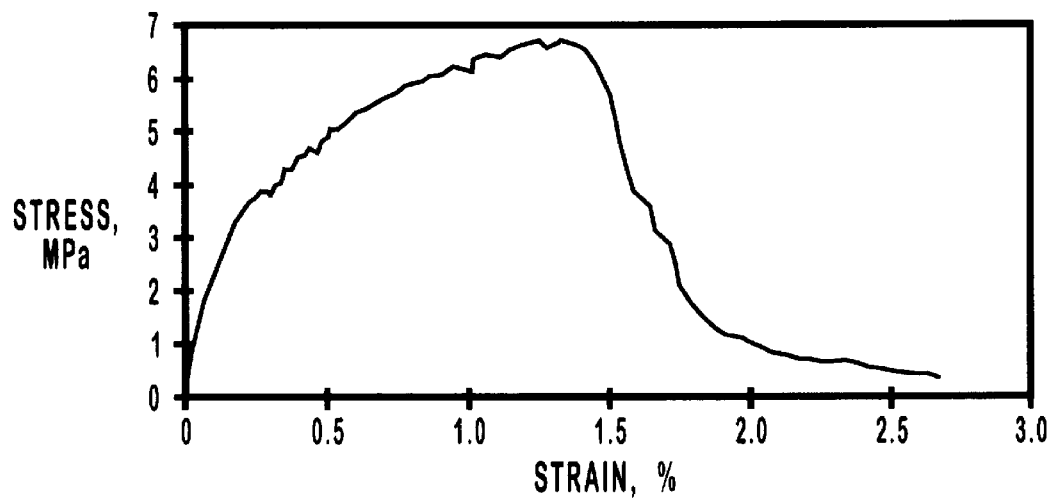
FIG. 5 is a graph plotting stress, as measured in MPa, versus percentage of strain for an inorganically filled sheet.

FIG. 5 shows the physical relationship between stress and strain for a sheet of moldable material. The moldable material upon which the graph in FIG. 5 is directed is composed of the following composition: 150 grams Tylose®, 1,000 white cement, fibers having a length of 0.2 mm–0.5 mm in the amount of 200 grams federal hardwood fiber and 50 grams federal softwood fiber, 500 grams 3M glass spheres and 1,650 grams water. As can be seen from the graph, stress is at a maximum of 6.7 MPa at a 1.4 percent strain for the sheet of moldable material.

FIGS. 5, 6, 7a, 7b, and 7c are related in that they describe and are used to illustrate a composite laminate structure having moldable material therein.

Figure 6:
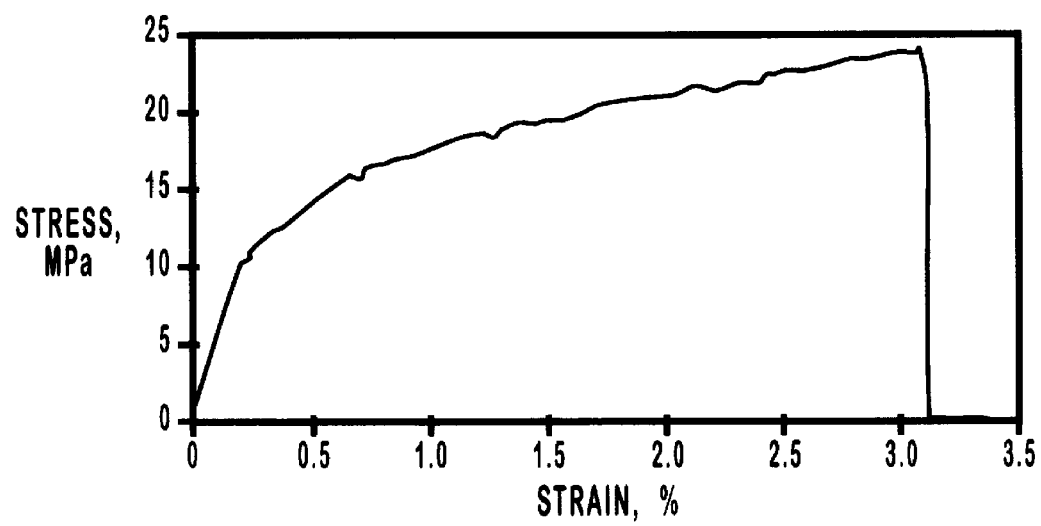
FIG. 6 is a graph plotting stress, measured in MPa, versus percentage of strain for a laminate comprised of two sheets of tree paper on both sides of the sheet of moldable material used for the graph shown in FIG. 5.

FIG. 6 shows the graph of stress to strain for a composite laminate structure having a sheet of the moldable material that was used to construct the graph of FIG. 5. A sheet of tree paper is laminated in between two sheets of the moldable material set forth in the above description of FIG. 5. The tree paper used in this laminate is a non-woven fabric made from cellulosic fiber. This tree paper is available as Model No. WW84 from Thomas West, Inc.

Figure 7A:
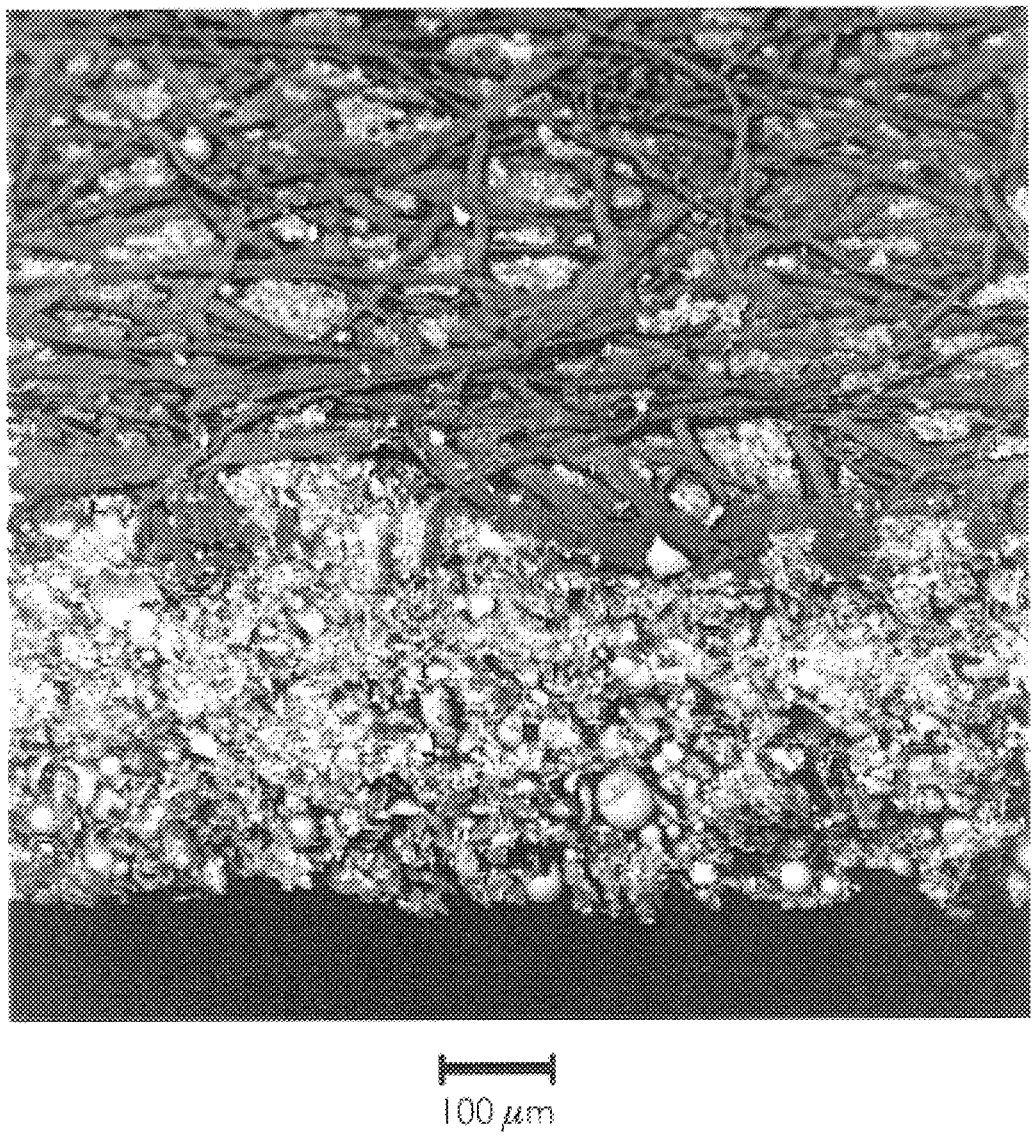
FIG. 7a is a 60° angle photomicrograph of the laminate referenced in FIG. 6 showing the materials of a sheet of tree paper infused within the moldable matrix of the inorganically filled sheet, prior to the lamination of a second sheet of tree paper to the bottom side of the inorganically filled sheet.
Figure 7B:
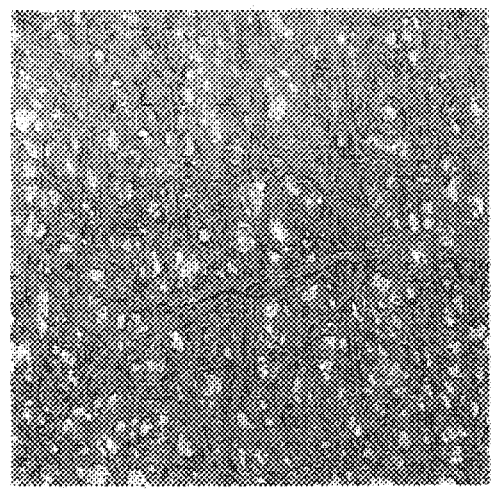
Figure 7C:
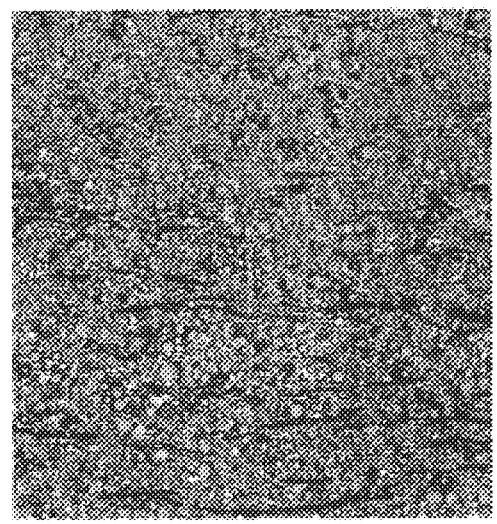

FIGS. 7a, 7b, and 7c show the laminate for which the physical data is given in FIG. 6, with one of the layers of the inorganically filled sheet removed therefrom. Thus, FIG. 7a shows one inorganically filled sheet at the bottom thereof laminated to the aforementioned sheet of tree paper at the top thereof. The top of the laminate showing the best view of the tree paper sheet is seen in FIG. 7b and the bottom of the laminate showing the best view of the inorganically filled sheet is seen in FIG. 7c. The total laminate has a thickness of 0.38 mm, which includes a layer of 0.32 mm inorganically filled sheet and two layers of 0.3 mm tree paper sheets. The photomicrograph shown in FIGS. 7a–7c shows a sheet of tree paper laminated to a sheet of inorganically filled material. Fibers in the tree paper are pressed into the underlying matrix of the moldable material as both sheets are fed into the nip between a pair of forming rollers while the sheet of moldable material is in a green state. Fibers in the tree paper become part of the matrix in the inorganically filled sheet. The bonding forces are formed in the laminate by a combination of the white cement in the moldable matrix, the Tylose®, and the physical forces which exist due to the entangling of fibers in the tree paper that are squeezed into and become a part of the moldable matrix of the mix design of the inorganically filled sheet. The tree paper is quite porous, which porosity lends itself to a better laminate bond when the moldable material squeezes into the pores of the tree paper.

The physical properties of the individual layers and of the laminate structure, itself, are set forth in Table A below.

TABLE A

|  | Tree Paper | Inorganically Filled Paper | Laminate Paper |
|---|---|---|---|
| I. Machine Direction (MD) Properties | | | |
| A. Elongation (%) | 5.0 | 1.4 | 3.1 |
| B. Tensile Strength (MPa) | 59.55 | 6.7 | 23.6 |
| C. Young's Modulus (MPa) | 6500 | 2905 | 5881 |
| D. Elongation at Peak Load (%) | — | 1.4 | 3.1 |

TABLE A-continued

|  | Tree Paper | Inorganically Filled Paper | Laminate Paper |
|---|---|---|---|
| E. Elongation at Rupture (%) | — | 2.7 | 3.1 |
| II. Cross-MD Properties |  |  |  |
| A. Elongation (%) | 6.2 | 0.47 | 3.6 |
| B. Tensile Strength (MPa) | 25.89 | 4 | 12.9 |
| III. Ratio of MD to CD |  |  |  |
| A. Tensile Strength | 2.3 | 1.7 | 1.8 |

Figure 8:
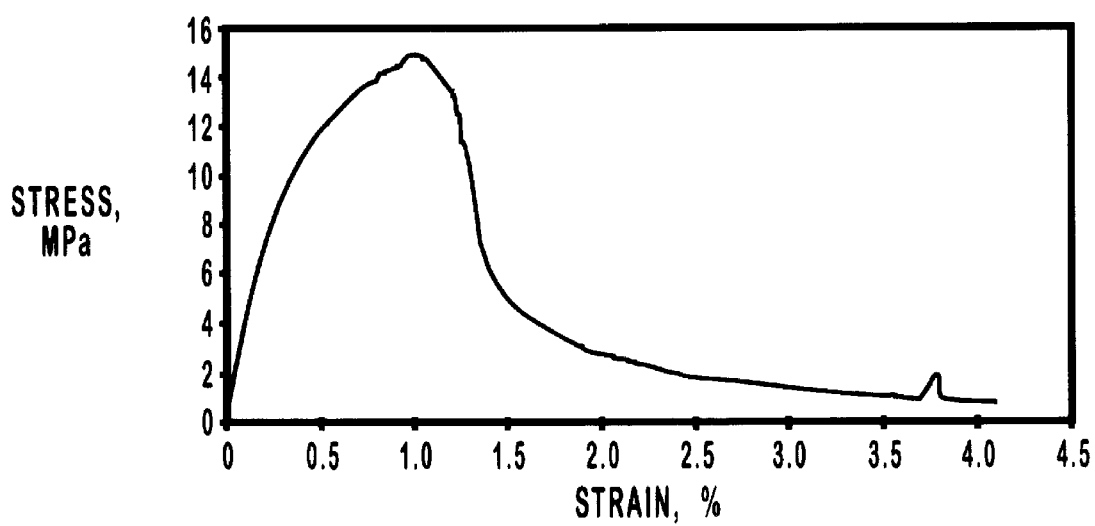
FIG. 8 is a graph showing stress, measured in MPa, versus percentage of strain for a sheet of hydraulically material having no fiber therein.

FIGS. 8, 9a, 9b, and 9c are related in that they all depict information relevant to a composite laminate structure that is composed of a sheet of a moldable material and a layer of cotton mesh gauze. FIG. 8 depicts physical data derived for the sheet of moldable material which has a composition of 300g METHOCEL 240®, 500g white cement, 500g CaCO₃, 500g Perlite®, and 1200g water. This moldable material does not contain fiber. FIG. 8 shows that stress is at a maximum of 14.36 MPa when strain is at 1.1% at peak load. The cotton gauze mesh is easy to stretch relative to the stretching capability of the inorganically filled sheets.

Figure 9A:
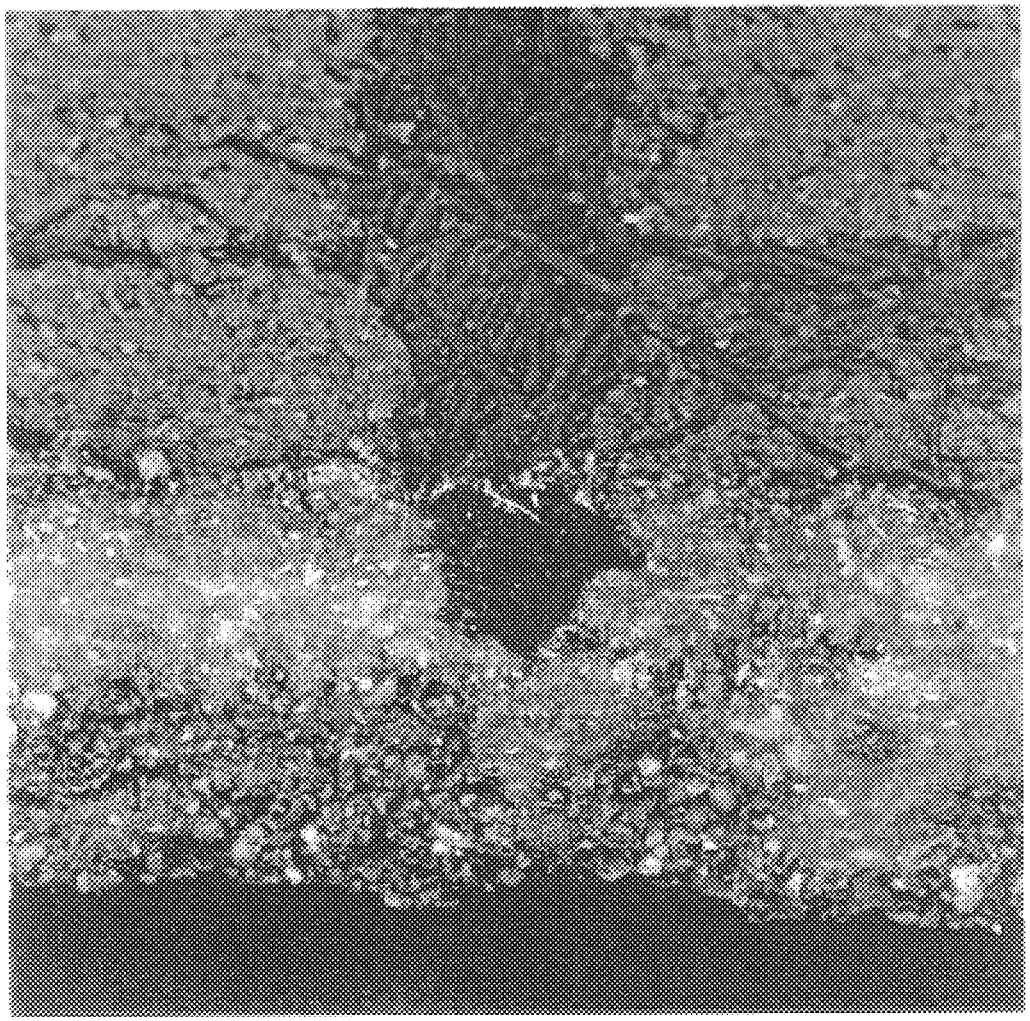
FIG. 9a is a photomicrograph showing a laminate composed of the inorganically filled sheet used for the graph in FIG. 8 and a cotton mesh gauze, which photomicrograph shows the top and side of the laminate from a 60° angle.
Figure 9B:
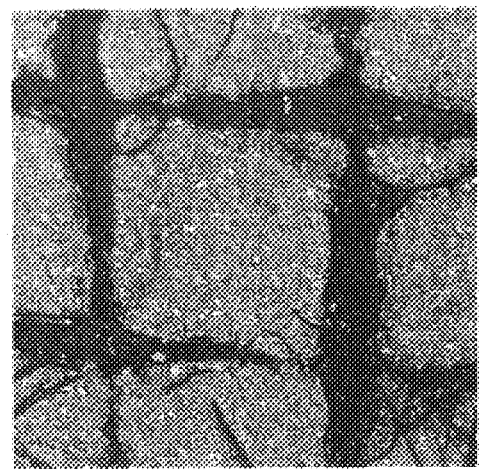
FIG. 9b shows the top of the laminate of FIG. 9a, and more particularly shows the cotton mesh gauze making a rectangular shape that is infused within the moldable matrix of the inorganically filled sheet.
Figure 9C:
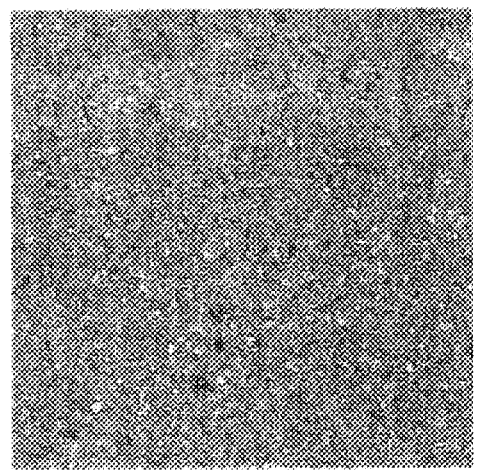

FIG. 9a is a microphotograph showing a cotton mesh laminated to the sheet of moldable material for which the data is shown in FIG. 8. FIG. 9a shows the top of the laminate and the side of the laminate. FIG. 9b shows the top of the laminate and particularly illustrates the cotton mesh surrounded by the moldable material in the laminate. FIG. 9c shows the bottom of the laminate and particularly illustrates the moldable material surface that has not been contacted by the cotton gauze.

While the moldable matrix is lacking in fiber and is therefore quite weak, the cotton gauze has strands incorporated therein which tend to reinforce the moldable matrix in the laminate similar to reinforcing bars in concrete. These strands in the cotton gauze act as fibers in the laminate. The cotton gauze is bonded to the moldable material in the laminate via an adhesive bond formed by a white cement, and the METHOCEL 240®. The specific gravity of the laminate structure is 1.3 g/cm³ and the thickness of the laminate is 0.38 mm.

The physical properties for this laminate in the machine direction and in the cross machine direction are given in Table B below.

TABLE B

|  | Laminate Paper |
|---|---|
| I. Machine Direction (MD) Properties |  |
| A. Elongation (%) | 0.92 |
| B. Tensile Strength (MPa) | 12.0 |
| C. Young's Modulus (MPa) | 2507 |
| D. Elongation at Peak Load (%) | — |
| E. Elongation at Rupture (%) | — |
| II. Cross-MD Properties |  |
| A. Elongation (%) | 1.20 |
| B. Tensile Strength (MPa) | 10.4 |
| C. Young's Modulus (MPa) | 1825 |
| III. MD-to-CD Ration Properties |  |
| A. Elongation | 0.77 |

TABLE B-continued

|  | Laminate Paper |
|---|---|
| B. Tensile Strength | 1.1 |
| C. Young's Modulus | 1.37 |

An example of another composite laminate structure having the same cotton gauze material as listed above, in combination with a moldable material is set forth below in Table C. Table C shows the laminate of a moldable material containing a mix design as follows: 500 g glass balls, 150 g METHOCEL 240®, 500 g CaCO₃, 1600 g water and no fiber. As the example shown above of laminates containing cotton gauze, the strands in the cotton gauze act to reinforce the moldable matrix with resultant properties shown below in Table C.

TABLE C

|  | Laminate Paper |
|---|---|
| I. Machine Direction (MD) Properties |  |
| A. Elongation (%) | 2.89 |
| B. Tensile Strength (MPa) | 11.5 |
| C. Young's Modulus (MPa) | 1256 |
| II. Cross-MD Properties |  |
| A. Elongation (%) | 3.46 |
| B. Tensile Strength (MPa) | 11.9 |
| C. Young's Modulus (MPa) | 1095 |
| III. MD-to-CD Ration Properties |  |
| A. Elongation | 0.84 |
| B. Tensile Strength | 0.96 |
| C. Young's Modulus | 1.15 |

Another example of a cotton gauze laminated to an inorganically filled sheet is shown in Table D below. The moldable material of Table D is composed of the following mix design: 150 g METHOCEL 240®, 500 g white cement, 500 g CaCO₃, 500 g Perlite®, 250 g federal hardwood fiber, and 1600 g water. The specific gravity of the laminate for which the data is depicted in Table D is 1.39 g/cm³ and the thickness of the laminate structure is 0.79 mm.

TABLE D

|  | Laminate Paper |
|---|---|
| I. Machine Direction (MD) Properties |  |
| A. Elongation (%) | 1.15 |
| B. Tensile Strength (MPa) | 16.5 |
| C. Young's Modulus (MPa) | 2507 |
| II. Cross-MD Properties |  |
| A. Elongation (%) | 0.87 |
| B. Tensile Strength (MPa) | 14.5 |
| C. Young's Modulus (MPa) | 3198 |
| III. MD-to-CD Ration Properties |  |
| A. Elongation | 1.32 |
| B. Tensile Strength | 1.14 |
| C. Young's Modulus | 0.78 |

Figure 10A:
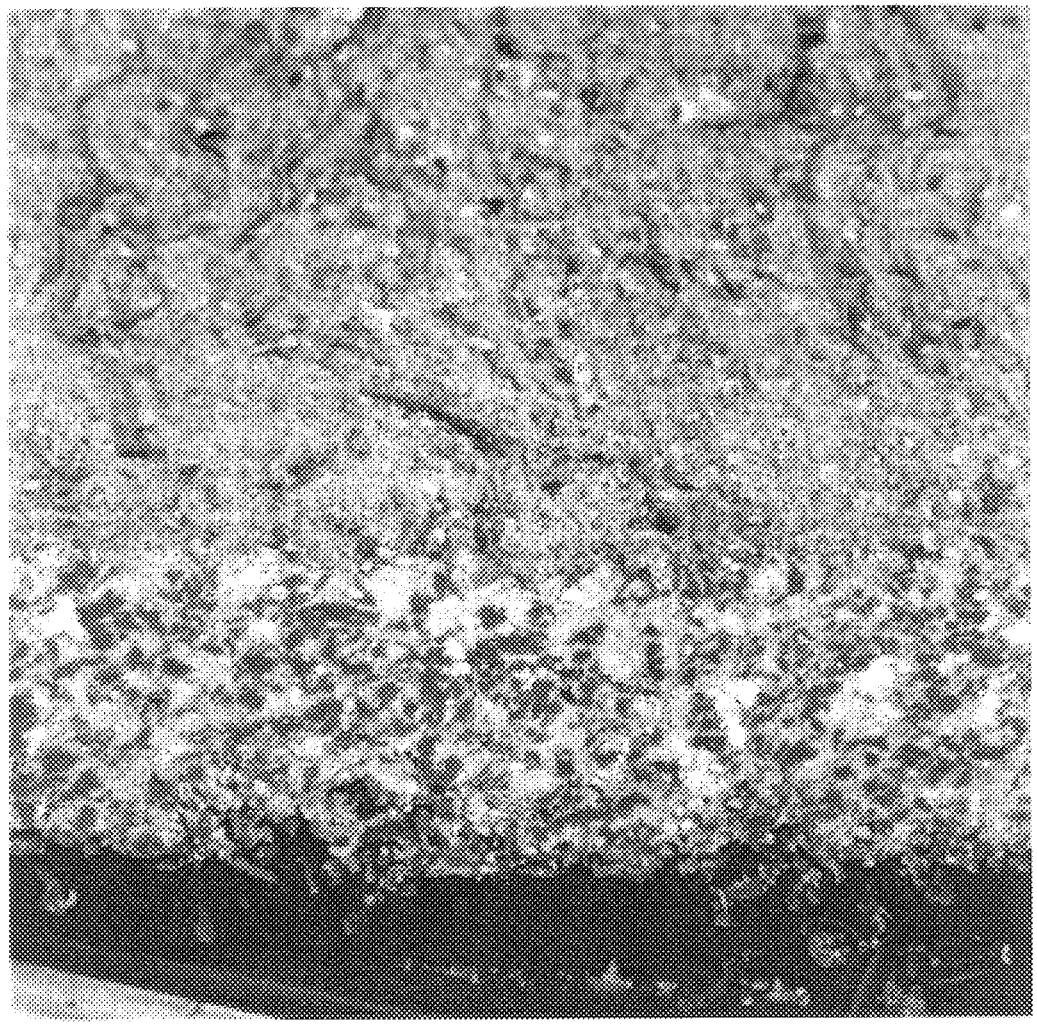
FIG. 10a is a view of a sheet of moldable material laminated to a sheet of felt material made up of individual spun fine yarns.
Figure 10B:
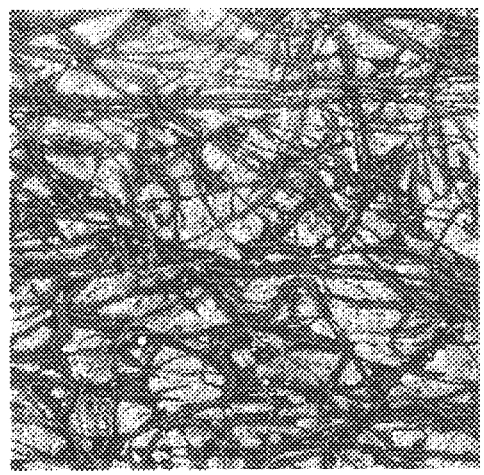
FIG. 10b is a top side view of the felt sheet of the laminate shown in FIG. 10a, showing fine spun yarns of the felt infused within the moldable matrix of the inorganically filled sheet.
Figure 10C:
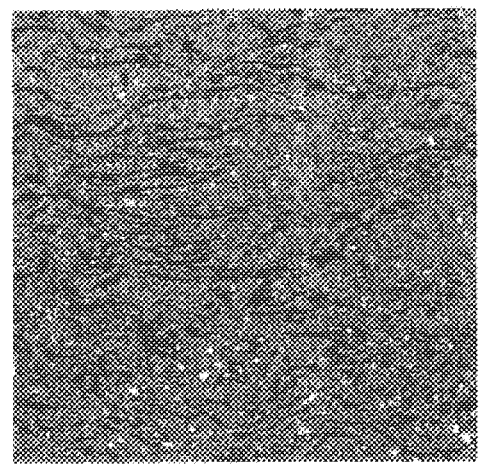
FIG. 10c is a view of the bottom side felt sheet of the laminate shown in FIG. 10c.

FIGS. 10a, 10b, and 10c show a felt material that is laminated to a sheet of moldable material. The moldable material is composed of a mix design as follows: 200 g METHOCEL 240®), 500 g white cement, 1,000 g CaCO₃, 340 g federal hardwood fiber, 60 g water and 1,600 g water. The felt is comprised of individual strands that are spun into fine yarns. The fine yarns make up the material that is the felt. The fine yarns are best seen in FIG. 10b. Strength in the depicted laminate in FIGS. 10a–10c is gained from the yarn being squeezed into the matrix of the inorganically filled sheet. Thus, the bond in the depicted laminate is due to the METHOCEL 240®, the white cement, and the physical effect of the fine yarns in the felt being incorporated into the matrix of the moldable material.

1. General Discussion of Inorganically Filled Sheets

A. Microstructural Engineering Design

Inorganically filled materials can generally be described as multi-component, multi-scale, fiber-reinforced, micro-composites. By carefully incorporating a variety of different materials capable of imparting discrete yet synergistically related properties, it is possible to create micro-composites having remarkable properties of strength, toughness, environmental soundness, mass-produceability, and low cost. One important aspect is that by carefully choosing the sizes of the aggregate particles a highly homogeneous material can be produced.

As mentioned above, the compositions used to make the inorganically filled sheet portion of the present invention have been developed from the perspective of microstructural engineering in order to build into the microstructure of the moldable material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design materials with those properties of strength, weight, insulation, cost, and environmental neutrality that are necessary for making sheets in a significantly more efficient manner.

Moldable materials have an advantage over other conventional materials in that they gain their properties under relatively gentle and nondamaging conditions. (Other materials require high energy, severe heat, or harsh chemical processing that significantly affects the material components.) Therefore, many different materials can be incorporated into, as well as laminated onto, moldable materials with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. For example, with respect to a sheet incorporated into the laminate structure which laminate structure is in turn used to make a container, those primary constraints include minimal weight, strength (both compressive and tensile), and toughness requirements, while simultaneously keeping the costs to those comparable to paper, cardboard, plastic, polystyrene, or metal counterparts.

One of the problems with moldable materials in the past has been the lengthy curing times before such materials would be demolded. An important feature of the present invention is that when the moldable mixture is inorganically filled into a sheet, it will maintain its shape (i.e., support its own weight subject to minor forces, such as gravity and movement through the processing equipment) in the green state without external support. Further, from a manufacturing perspective, in order for production to be economical, it is important that the molded sheet rapidly (in a matter of minutes or even seconds) achieve sufficient strength so that it can be handled using ordinary manufacturing procedures, even though the material may still be in a green state and not fully hardened.

In its simplest form, the process of using materials science in microstructurally engineering and designing a moldable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the actual particle sizes) is determined, and the strength of the particles is ascertained. (Unreacted hydraulic binder particles may be considered to be an aggregate.)

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed, angular, granular, hydrated binder particles will interact with the lubricants differently.

The concept of microstructural engineering is further discussed in U.S. patent application Ser. No. 08/378,880, entitled "Design Optimized Concrete Manufacturing Process," filed Jan. 26, 1995, in the names of Per Just Andersen and Simon K. Hodson, now abandoned, which is incorporated herein by specific reference.

From the following discussion, it will be appreciated how each of the component materials within the moldable mixture, as well as the processing parameters, contributes to the primary design constraints of food and beverage containers so that they can be economically mass produced. Specific compositions are set forth in the examples given later in order to demonstrate how the maximization of the performance of each component accomplishes the combination of desired properties.

B. Terminology

A sheet or a coating is defined herein to be a type of layer in a laminate structure. The terms "inorganically filled sheet," "inorganically filled sheets," "inorganically filled sheet," or "sheet" as used in this specification and the appended claims are intended to include any substantially flat, scored, cut, perforated, laminated, corrugated, curved, bent, printed, coated, or textured sheet, using the methods described herein and useful for stock in forming containers or other articles. The only essential limitation is that the sheet include a matrix formed from a moldable material as defined herein. It is also within the scope of this invention to incorporate other materials onto the sheet by laminating the sheet with sheets formed from other materials such as paper, plastics, or other metals, by coating the sheet, by applying printing indicia to the sheet, by utilizing continuous fibers as an external support for the sheet, and by applying other materials. The term "matrix" or "structural matrix" as used in this specification and the appended claims is intended to refer to an inorganically filled mixture that has been molded or formed into a desired shape. This term shall include all such matrices without regard to the extent of hydration and/or drying of the matrix. Hence, a matrix may comprise an inorganically filled mixture in a green, hard, dry, set, or cured state.

The term "blank" as used in the specification and the appended claims is intended to include a sheet ready for formation into an article. A blank is a sheet that has been cut into the appropriate shape, having the appropriate dimensions, with any appropriate scores, perforations, holes or slots which might facilitate its formation or assembly into the appropriate sheet.

The phrases "mass producible" or manufactured in a "commercial" or "economic" manner are intended in the specification and the appended claims to refer to a capability of the sheets described herein to be rapidly produced at a rate that make their manufacture economically comparable to sheets made from other materials such as paper, cardboard, plastics, polystyrene, or metal. The present invention is directed to innovative compositions which solve the prior art problems involved in molding moldable materials in an economic or cost-effective manner. Sheets made from moldable materials are intended to be competitive in the marketplace with sheets currently made of other standard materials, such as paper, cardboard, plastic, polystyrene, glass, or metal.

C. Inorganically Filled Materials.

As previously defined, the terms "inorganically filled material" or "moldable material" as used in the specification and appended claims is intended to include "inorganically filled mixtures, materials, or compositions." The term "inorganically filled materials" as used in the specification and appended claims is intended to broadly define materials and compositions characterized by having a high concentration of inorganic filler or aggregate (at least about 20% by weight of total solids in the dried article), water, and a structural matrix with strength properties that are predominately derived from a drying or hardening water-dispersible organic binder.

The terms "inorganically filled and moldable mixture, material, or composition" shall refer to the mixture regardless of the extent of drying or curing that has taken place. These mixtures shall include mixtures that are highly workable, which are partially dried or cured, and which have been completely dried or cured (although a certain amount of water will usually remain within the article as bound water within the organic binder).

As a moldable mixture, the hydraulic binder is added in sufficient concentrations to function as the predominate binder for the mixture while the organic binder, although perhaps assisting as a binder, primarily functions as a rheology-modifying agent. In contrast, in an inorganically filled mixture, the hydraulic binder is added in such minimal concentrations that it primarily functions as an aggregate while the organic binder functions as the primary binder. The above discussed inorganically mixtures may also include other admixtures such as plasticizers, lubricants, dispersants, and air void forming agents.

Detailed examples of compositions that can be used to manufacture inorganically filled sheets are set forth in the following applications, which have been incorporated by specific reference: application Ser. No. 08/154,436, filed Nov. 19, 1993, now U.S. Pat. No. 5,582,670,; application Ser. No. 08/157,695, filed Nov. 24, 1993, pending; and application Ser. No. 08/631,676, entitled "Methods for Manufacturing Molded Sheets Having a High Starch Content," and filed Apr. 9, 1996, in the names of Per Just Andersen, Ph.D., Shaode Ong, Ph.D., Bruce J. Christensen, Ph.D., and Simon K. Hodson, pending. The latter reference also discloses the manufacture of high starch-containing sheets having increased strength and flexibility.

1. Organic Binders.

The moldable mixtures first develop workability and flow properties by adding an amount of water to the mixture sufficient to lubricate the solid inorganic aggregate particles and fibers, and to solvate, or at least disperse, the water-dispersible organic binder. Thereafter, the removal of water, such as by evaporation, allows the water-dispersible organic binder to develop its maximum strength properties.

For example, certain starch-based materials can be purchased as tiny granules which are in a powder-like form. The starch based binder is "activated" by dissolving and gelating the starch binder in water by heating the dispersion above the gelation temperature. After the water has been removed, such starch based materials can, by themselves, have tensile strengths of up to about 40–50 MPa. Through careful microstructural engineering, the highly inorganically filled sheets can have varying tensile strengths, even approaching 40 MPa in some cases.

The water-dispersible organic binder not only binds the individual aggregate particles and fibers together within the mixture upon drying or hardening (thereby forming a structural or highly inorganically filled matrix), but they also have the general tendency of affecting the rheology of the moldable mixture. In fact, the water-dispersible binders disclosed herein have been used in cementitious and other hydraulically settable mixtures as rheology modifying agents, although it has been understood that they also impart a degree of binding to the final hardened material if included in large enough amounts.

The various rheology-modifying agents or organic binders contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based material, for example, methylhydroxyethylcellulose, hydroxymethylethylcellulose, carboxymethylcellulose, methylcellulose, ethylcellulose, hydroxyethylcellulose, hydroxyethylpropylcellulose, and the like. The entire range of possible permutations is enormous and cannot be listed here, but other cellulose materials which have the same or similar properties as these would also work well.

Suitable starch-based materials include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide based materials include, for example, alginic acid, phycocolloids, agar, gum arabic, guar gum, locust bean gum, gum karaya, and gum tragacanth.

Suitable protein-based materials include, for example, Zein®(a prolamine derived from corn), collagen derivatives extracted from animal connective tissue such as gelatin and glue, and casein (the principal protein in cow's milk).

Suitable synthetic organic materials include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex, which is a styrene-butadiene copolymer.

The water-dispersible organic binders within the moldable mixtures of the present invention are preferably included in an amount such that a substantially hardened sheet manufactured therefrom will contain from about 1% to about 60% organic binder by weight of the total solids within the hardened sheet, more preferably from about 2% to about 40%, and most preferably from about 5% to about 30%.

2. Water.

With regard to inorganically filled materials, water is added to the moldable mixture in order to solvate, or at least disperse, the water-dispersible organic binder within the mixture. In many cases, some of the water actually reacts with and becomes chemically bound within the organic binder. In other cases it may be more loosely bound to the organic binder, often by means of hydrogen bonding. Certain amounts of water may also react with other admixtures within the mixture, such as hydraulically settable binders or other materials which chemically react with water. The hydration reaction between the organic binder and water yields reaction products which give the moldable materials the ability to set up and develop strength properties.

The water also serves the function of creating a moldable mixture having the desired rheological properties, including viscosity and yield stress. These properties are general ways of approximating the "workability" or flow properties of the moldable mixture.

In order for the moldable mixture to have adequate workability, water must generally be included in quantities sufficient to solvate or at least disperse the organic binder in the inorganically filled mixtures and to initially react with the organic binder. Furthermore, sufficient water should be added to wet each of the aggregate particles, fibers, or other solid particles and to at least partially fill the interstices or voids between the particles. In some cases, such as where a dispersant or a lubricant is added, adequate workability can be maintained while using less water initially.

The amount of water that is added to the moldable mixture must be carefully balanced so that the mixture is sufficiently workable, while at the same time recognizing that lowering the initial water content increases both the green strength and the final strength of the hardened product. Less water results in a stronger final product because the total porosity is reduced during the molding processes. Moreover, if less water is initially included in the moldable mixture, less water must be removed in order to cause the inorganically filled sheet to be incorporated into a laminate to harden. In some cases, however, it may be desirable to initially include a relatively high amount of water in light of the fact that excess water can later be removed by heating the sheet or laminate during or shortly after the molding process.

The appropriate rheology to meet these needs can be defined in terms of yield stress. The yield stress of the moldable mixture will preferably be in the range from about 2 kPa to about 5 MPa, more preferably in the range from about 100 kPa to about 1 MPa, and most preferably in the range from about 200 kPa to about 700 kPa. The desired level of yield stress can be adjusted and optimized to the particular molding process being used to form the sheets made therefrom.

As set forth more fully below, the sizes of the individual aggregate particles and fibers can be selected in order to increase the particle packing density of the resulting moldable mixture. The amount of water that must be added in order to obtain a moldable mixture having a particular rheology or yield stress will, to a large extent, depend on the particle-packing density. For example, if the particle-packing density of the moldable mixture is 0.65, water will be included in an amount of roughly 35% by volume in order to substantially fill the interstitial voids between the particles. On the other hand, a moldable mixture having a particle-packing density of 0.95 will only require water in an amount of about 5% by volume in order to substantially fill the interstitial voids. This is a seven-fold decrease in the amount of water which must be added in order to substantially fill the interstitial voids, which influences the rheology and workability of the moldable mixture.

In light of the foregoing, the amount of water which should be added to the mixture will depend to a large extent on the level of particle packing density within the mixture, the amount of water-dispersible binder that is added, the amount of organic binder that is added, and the desired rheology of the resultant moldable mixture. Hence, the amount of water that will be added to form the moldable mixture will range from as little as 5% to as high as 80% by weight of the moldable mixture. The exact amount of water will greatly vary depending on the concentration and identity of other components and admixtures within the mixture. One skilled in the art will be able to adjust the level of water to obtain adequate workability for any given manufacturing process.

It is preferable in most cases to include the minimum amount of water that is required to give the moldable mixture the desired level of workability, and thereby reduce the amount of water that must be removed from the processed sheet. Decreasing the amount of water that must be removed generally reduces the cost of manufacture since removing water requires energy. Nevertheless, the compositions of the present invention include far less water, even at the upper ranges of water inclusion, compared to slurries used to make paper sheets, which generally contain more than 95% water by volume.

Nevertheless, upon removing the water from the sheet to be incorporated into a laminate, the total amount of water remaining after the drying process will range up to about 10% by weight.

3. Aggregates.

Inorganic materials commonly used in the paper industry, as well as more finely ground aggregate materials used in the concrete industry, may be used in the moldable mixtures of the present invention. Nevertheless, the size of the aggregate or inorganic filler materials will often be many times larger than inorganic filler materials used in the paper industry. While the average diameter of the particles within the inorganic fillers used in the paper industry will usually be less than 2 microns, the average particle diameter of the aggregate materials used in the present invention will typically be up to 100 microns or larger depending on the wall thickness of the resulting sheet and, hence, be less expensive in general.

The large variety of inorganic aggregate materials that may be added to the moldable mixtures of the present invention allow a variety of properties to be added to the final sheet. The aggregate materials employed in the present invention can be added to increase the strength (tensile and, especially, compressive strength), increase the modulus of elasticity and elongation, decrease the cost by acting as an inexpensive filler, decrease the weight, and/or increase the insulation ability of the resultant article of manufacture. In addition, plate-like aggregates, such as mica and kaolin, can be used in order to create a smooth surface finish in the articles of the present invention. Typically, larger aggregates, such as calcium carbonate, give a matte surface, while smaller particles give a glass surface.

Examples of useful inorganic aggregates include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed sheet.

Even discarded inorganically filled materials, such as discarded sheets, laminates or other articles of the present invention can be employed as aggregate fillers and strengtheners. It will also be appreciated that the sheets and other objects of the present invention can be easily and effectively recycled by simply adding them to fresh moldable mixtures as an aggregate filler.

Both clay and gypsum are particularly important aggregate materials because of their ready availability, extreme low cost, workability, ease of formation, and because they can also provide a degree of binding and strength if added in high enough amounts. "Clay" is a term that refers to materials found in the earth that have certain chemical compositions and properties. The predominant clays include silica and alumina (used for making pottery, tiles, brick, and pipes) and kaolinite. The kaolinic clays are anauxite, which has the chemical formula $Al_2O_3 \cdot SiO_2 \cdot H_2O$, and montmorilonite, which has the chemical formula $Al_2O_3 \cdot SiO_2 \cdot H_2O$. However, clays may contain a wide variety of other substances, such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the moldable materials of the present invention.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a moldable mixture.

Even hydraulic cement, such as portland cement, can be added as an inorganic filler material within the moldable mixtures of the present invention. Not only are hydraulic cements relatively inexpensive and plentiful, but they also can impart a degree of binding to the inorganically filled matrix if included in high enough amounts. The reaction between hydraulic binders and water causes an internal drying effect within the moldable mixture which effectively removes at least some of the water within the mixture without the need for evaporation.

Prehydrated hydraulic cement particles may also be added as an aggregate filler. One difference between unhydrated and prehydrated cement is that the latter has a definable morphology of plates and platelets.

In addition, the hydraulic cement can effect the rheology of the moldable mixture, at least in part by chemically reacting with the water, thereby diminishing the amount of water available to lubricate the aggregate particles and fibers. In addition, it has been found that portland grey cement increases the internal cohesion of the moldable mixture. Finally, although it is not known for sure, it is possible that hydraulic cement may interact to some degree with the large number of hydroxyl groups present on many organic polymer binders. The hydroxyl groups of such binders will, at a minimum, have hydrogen bonding-like interactions with the highly polar hydraulic cement gel products, being known to adsorb onto the surface of cement particles.

Because of the nature of the moldable mixtures and articles made therefrom, it is possible to include lightweight aggregates having a high amount of interstitial space in order to impart an insulation effect with the inorganically filled sheets. Examples of aggregates which can add a lightweight characteristic to the moldable mixture include perlite, vermiculite, glass beads, hollow glass spheres, calcium carbonate, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the paper and cement industries, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be added to the moldable mixtures.

In addition to these inorganic aggregates, certain organic, polymeric, or elastomeric aggregates such as seeds, starches, gelatins, agar-type materials, cork or plastic spheres can be used as an aggregate material to impart varying properties such as flexibility into the finished product. Lightweight plastic spheres are especially useful where a combination of low weight, high flexibility and resilience is desired, such as in materials used to cushion, partition, separate, wrap, line or space.

A preferred polymeric sphere is made from lightweight polyethylene, with a density of 0.01 to 0.3 g/cm$^3$ and a particle size of less than 100 microns, although larger spheres may be preferred in larger packaging materials.

In those products where lightweight plastic spheres are used, such as in lightweight and flexible containers, partitions, or lining materials, the amount of plastic spheres will preferably be within the range from about 1% to about 10% by weight, and most preferably within the range from about 3% to about 6%. Hence, cushioning materials made according to the present invention that contain plastic spheres are far more environmentally neutral than those made from polystyrene, the almost universal cushioning material of choice, the contains 100% polystyrene. Pound for pound, the cushioning materials of the present invention impart far less plastic into the environment than their polystyrene counterparts. If water degradable flexible aggregates such as, for example, agar or amylopectin granules are used instead of plastic balls, the cushioning materials will be essentially nonpolluting.

It may be advantageous to concentrate the majority of plastic balls near the surface of the sheet where the need for flexibility is the greatest. Similarly, near the core of the sheet where durability and rigidity are more important there might be few or no plastic balls. This concentration of plastic balls near the surface of the sheet increases their effectiveness while allowing a decrease in their amount, thus making the sheet of the present invention even more environmentally sound. Such sheets might contain as little as 1% plastic balls by weight.

It is often preferable, according to the present invention, to include a plurality of differently sized and graded aggregates capable of more completely filling the interstices between the aggregate particles and fibers within the moldable mixture. Optimizing the particle packing density reduces the amount of water that is required to obtain the desired level of workability by eliminating spaces which would otherwise be filled with interstitial water, often referred to as "capillary water."

In order to optimize the packing density, differently sized aggregates with particle sizes ranging from as small as about 0.05 microns to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired Theological properties of the green moldable mixtures, as well as the final strength and weight properties of the final hardened inorganically filled composite.

In certain embodiments, it may be desirable to maximize the concentration of aggregates within the moldable mixture in order to maximize the properties and characteristics of the aggregates (such as qualities of strength, low density, or high insulation). Depending upon the natural packing density of each aggregate material and the relative sizes of the particles the resulting volume of the combined aggregates may be less than the sum of the volumes of the aggregates before they were mixed.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Andersen, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference. The advantages of such packing of the aggregates can be further understood by reference to the examples which follow in which hollow glass spheres of varying sizes are mixed in order to maximize the amount of the insulating spheres within the moldable mixture.

In embodiments in which it is desirable to obtain an sheet having high insulation capability, it may be preferable to incorporate into the highly inorganically filled matrix a lightweight aggregate which has a low thermal conductivity, or "k-factor" (defined as W/m•K). The k-factor is roughly the reciprocal of the expression commonly used in the United States to describe the overall thermal resistance of a given material, or "R-factor," which is generally defined as having units of hr•ft$^2$°F/BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr•ft$^2$°F/BTU•in.

For purposes of this specification, the insulation ability of a given material will hereinafter be expressed only in terms of the IUPAC method of describing thermal conductivity, i.e., "k-factor." (The conversion of thermal resistance expressed in British units (hr•ft$^2$°F/BTU•in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres, all of which tend to contain large amounts of incorporated interstitial space. However, this list is in no way intended to be exhaustive, these aggregates being chosen because of their low cost and ready availability. Any aggregate with a low k-factor, which is able to impart sufficient insulation properties to the sheet made therefrom, is within the scope of the present invention.

In light of the foregoing, the inorganic aggregate will preferably be included in an amount as low as about 20% by weight of the total solids content of the hardened sheet, and as high as about 90%, more preferably in a range from about 30% to about 80%, and most preferably in a range from about 40% to about 70% by weight of total solids.

4. Fibers

As used in the specifications and appended claims, the terms "fibers" and "fibrous materials" include both inorganic fibers and organic fibers. Fibers are a particular kind of aggregate which may be added to the moldable mixtures to increase the elongation ability, deflection ability, toughness, fracture energy, and flexural and tensile strengths of the sheet and laminates incorporating the same. Fibrous materials reduce the likelihood that the sheets and laminates incorporating the sheets will shatter when a strong cross-sectional force is applied.

Fibers which may be incorporated into the moldable materials are preferably naturally occurring fibers, such as cellulosic fibers extracted from hemp, cotton, plant leaves, wood or stems, or fibers made from glass, silica, graphite, ceramic, or metal. Glass fibers are preferably pretreated to be alkali resistant.

Preferred fibers of choice include glass fibers, abaca, bagasse, wood fibers (both hardwood or softwood such as southern pine), ceramic fibers (such as alumina, silica nitride, silica carbide, graphite) and cotton. Recycled paper fibers can be used, but they are somewhat less desirable because of the fiber degradation that occurs during the original paper manufacturing process, as well as in the recycling process. Any equivalent fiber, however, which imparts strength and flexibility is also within the scope of the present invention. Abaca fibers are available from Isarog Inc. in the Philippines. Glass fibers such as Cemfill® are available from Pilkington Corp, in England.

These fibers are preferably used in the present invention due to their low cost, high strength, and ready availability. Nevertheless, any equivalent fiber which imparts the compressive and tensile strength needed, as well as toughness and flexibility is certainly within the scope of the present invention. The only limiting criteria is that the fiber impart the desired properties without adversely reacting with the other constituents of the moldable material and without contaminating the materials (such as food) stored or dispensed in sheets made from materials containing the fibers.

The fibers used to make the sheets, laminates and articles of manufacture of the present invention preferably have a high length to width ratio (or "aspect ratio"). Longer, narrower fibers can impart more strength to the structural matrix without significantly adding bulk and mass to the composite materials. The fibers should have an average aspect ratio of at least about 10:1, preferably at least about 100:1, and most preferably at least about 200:1.

The amount of fibers added to the moldable material will vary depending upon the desired properties of the final product, with strength, toughness, flexibility, and cost being the principal criteria for determining the amount of fiber to be added in any mix design. In most cases, fibers will be added in an amount within the range from about 0.2% to about 60% by weight of total solids of the moldable mixture, more preferably within the range from about 1% to about 40%, and most preferably within the range from about 5% to about 20% of total solids of the moldable mixture.

It has been found that slight increases of fiber concentration below about 20% fiber by volume tend to dramatically increase the strength, toughness, and bending endurance of the finished sheet. Adding fibers above about 20% by weight will produce a less dramatic increase in the strength and flexibility of the sheet, although such increases may be economically justified in individual circumstances.

It will be appreciated, however, that the strength of the fiber is a very important feature in determining the amount of the fiber to be used. The stronger the tensile strength of the fiber, the less the amount that must be used to obtain the same level of tensile strength in the resulting product. Of course, while some fibers have a high tensile strength, other types of fibers with a lower tensile strength may be more elastic. Fibers with a smaller aspect ratio are more easily placed and yield a sheet with fewer defects, while a larger aspect ratio increases the strength-imparting effect of the fiber. Hence, a combination of two or more fibers may be desirable in order to obtain a resulting product that maximizes multiple characteristics, such as high tensile strength, high elasticity, and better fiber placement.

It should also be understood that some fibers, such as southern pine and abaca, have high tear and burst strengths. Others, such as cotton, have lower strength but greater flexibility. In the case where better placement, higher flexibility, and high tear and burst strength are desired, a mixture of fibers having the various properties can be added to the mixture.

Finally, certain fibers and inorganic fillers are known to chemically interact and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum ($Al_2(SO_4)_3$ or $NaAl(SO_4)_2$), the latter of which precipitates out the rosin onto the fiber surface, making it highly hydrophobic. The aluminum floe that is formed by the alum creates an anionic adsorption site on the fiber surface for a positively charged organic binder, such as a cationic starch.

5. Dispersants.

The term "dispersant" is hereinafter used to refer to the class of materials which can be added to reduce the viscosity and yield stress of the moldable mixture. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the aggregate particles, and/or into the near colloid double layer of the binder particles. This creates a negative charge around the surfaces of particles causing them to repel each other. This repulsion of the particles adds "lubrication" by reducing the "friction" or attractive forces that would otherwise cause the particles to have greater interaction. Because of this, less water can be added initially while maintaining the workability of the moldable mixture.

Greatly reducing the viscosity and yield stress may be desirable where plastic-like properties, cohesiveness, and/or form stability are less important. Adding a dispersant aids in keeping the moldable mixture workable even when very little water is added.

Nevertheless, due to the nature of the coating mechanism of the dispersant, the order in which the dispersant is added to the mixture can often be critical. If certain water-dispersible organic binders (such as Tylose®) are used, the dispersant should be added to a mixture containing water and at least part of the inorganic aggregates first and then the binder should be added second. Otherwise, the dispersant will be less able to become adsorbed onto the surface of the aggregate particles because the Tylose®) will first be irreversibly adsorbed, thereby forming a protective colloid on the surface and thereby preventing the dispersant from being adsorbed.

A preferred dispersant is sulfonated naphthalene-formaldehyde condensate, an example of which is marketed under the trademark WRDA 19, which is available from W. R. Grace, Inc. Other dispersants which can also work well include sulfonated melamine-formaldehyde condensate, lignosulfonate, and polyacrylic acid. The concentration of the dispersant will generally range up to about 5% by weight of the water, more preferably in the range from about 0.5% to about 4%, and most preferably within the range from about 1% to about 2%.

The dispersants contemplated within the present invention have sometimes been referred to in the concrete industry as "superplasticizers." In order to better distinguish dispersants from other rheology-modifying agents, which often act as plasticizers, the term "superplasticizer" will not be used in this specification.

2. Manufacturing Sheets From Moldable Mixtures

The first step in the manufacture of laminated structure according to the present invention is the manufacture of dry or semi-dry inorganically filled sheets from the moldable mixtures disclosed herein. Detailed descriptions of the sheet forming process can be found in co-pending U.S. patent application Ser. No. 08/152,354, entitled "Sheets Having A Highly Inorganically Filled Organic Polymer Matrix," filed Nov. 19, 1993, in the names of Per Just Andersen, Ph.D. and Simon K. Hodson, which issued as U.S. Pat. No. 5,508,072, and in co-pending U.S. patent application Ser. No. 08/101,500, entitled "Methods and Apparatus for Manufacturing Moldable Inorganically filled sheets Used in Making Containers, Printed Materials, and Other Objects," filed Aug. 3, 1993 in the names of Per Just Andersen, Ph.D., and Simon K. Hodson, now abandoned. For purposes of disclosure, including the manufacture of highly inorganically filled sheets, these applications are incorporated herein by specific reference.

A comprehensive production sequence used to manufacture inorganically filled sheets that are later formed into the laminated structures of the present invention are set forth in FIG. 1. The sheet forming process using this system can be summarized as follows: (1) mixing the moldable mixture; (2) extruding the mixture into a sheet or other shape through an appropriate die; (3) passing the extruded mixture through at least one pair of rollers in order to reduce the thickness and/or improve the surface qualities of the sheet; (4) at least partially drying the sheet by rolling it onto one or more drying rollers; (5) optionally compacting the sheet while in a slightly moist condition in order to eliminate unwanted spaces and increase the strength of the sheet; (6) optionally drying the sheet after it has been compacted; (7) optionally finishing the sheet by passing it between one or more pairs of finishing rollers; and (8) optionally rolling the substantially hardened and dried sheet onto a spool to form a roll which can be stored and used when needed.

A. Preparing The Moldable Mixture.

The first step in the manufacture of sheets involves the formation of a suitable moldable mixture having the desired properties of workability and green strength, as well as strength, flexibility, toughness, and degradability of the final hardened product. As mentioned above, the term "moldable mixture," as used herein, encompasses inorganically filled mixtures. Using a microstructural engineering approach, one skilled in the art can select the components, as well as their relative concentrations, in order to obtain a moldable mixture having the desired properties.

Some of the properties considered to be generally desirable with regard to the moldable mixture are adequate workability, plastic-like qualities, and green strength for a given extrusion, rolling, and/or molding process. As set forth above, with respect to the inorganically filled mixture, the level of water, water-dispersible organic polymer binder, and (optionally) dispersant will determine the level of workability and extrudability of the mixture, as will the other components within the mixture, such as aggregates, fibers, air entraining agents, etc. However, no one component will completely determine the rheology and other properties of the moldable mixture. Rather, each of the components work together in an interrelated fashion.

Based on the teachings of the copending applications that have been incorporated by reference, one skilled in the art will be able to adjust the identities and amounts of the various components in order to optimize the workability, plastic-like behavior, and green strength necessary to carry out any particular sheet forming process.

(1). Effect of Components on the Inorganically Filled Mixture Rheolog

The amount of water that should be added to obtain a mixture having adequate workability and flowability will depend on the concentration and particle packing density of the inorganic filler, the amount of fibers, the identity and quantity of the organic binder, and the identity and quantity of other admixtures (such as dispersants, plasticizers, or lubricants). In general, however, the addition of more water will decrease the viscosity and yield stress of the mixture, thereby increasing the flowability of the mixture and decreasing the form stability of an object molded therefrom.

The water-dispersible organic polymer binder can greatly affect the rheology of the mixture depending on the identity, concentration, and extent of gelation of the organic binder. As set forth above, preferred organic polymer binders can roughly be divided into the following categories: cellulose-based, starch-based, protein-based, polysaccharide-based, and synthetic organic. Within each of these broader categories are numerous subcategories and divisions. A unifying feature of each of these materials is that they will generally dissolve in, or at least be fairly thoroughly dispersed by, water. Hence, they require adequate levels of water for their dispersion and activation (including gelation) within the moldable mixture.

Nevertheless, the organic polymer binders have greatly varying levels of water solubility or dispersibility, as well as varying levels of viscosity and yield stress. Organic polymers within the same class may have greatly varying viscosities depending on the molecular weight. For example, a 2% solution of Tylose® FL 15002 at 20° C. has a viscosity of about 15000 cps, while a similar solution of Tylose® 4000 has a viscosity of about 4000 cps. The former greatly increases the yield stress and plastic-like properties of a moldable mixture, while the latter may act more as a lubricant or plasticizer.

Other organic polymers react at different rates and different temperatures within the water. Although many organic polymer binders such as Tylose® neither polymerize or depolymerize when added to the moldable mixture, but rather gelate and then dry out to form a bonding matrix, it is within the scope of the present invention to add water soluble or water-dispersible polymerizable units to the moldable mixture which will thereafter polymerize in situ over time. The rate of the polymerization reaction can be regulated by adjusting the temperature of the mixture and/or adding a catalyst or inhibitor. Examples of polymerizable units which may be added to a moldable mixture include Cellosize and latex forming monomers.

With regard to gelation, most cellulose-based polymers (such as Tylose®) will readily gelate in water at room temperature. Others, such as many starches, will only gelate in water at higher temperatures. Certain modified starches can, however, gelate at room temperature. Hence, cellulose-based and modified starch-based polymer binders are advantageous in that a moldable mixture can be formed therefrom at room temperature. Nevertheless, they are generally significantly more expensive than typical starch-based polymers which must be heated to gelate. A preferred starch-based polymer is National 51-6912, which may be purchased from National Starch.

Depending on the desired rheology of the moldable mixture, including where it is desired to affect the viscosity or yield stress as a function of time or temperature, it may be preferable to add a number of different organic polymer binders to the moldable mixture. Cellulose-based organic polymer binders will generally impart their maximum rheological effect almost immediately, while polymerizable binders will stiffen over time, and starch-based binders will stiffen as the temperature of the mixture is increased.

Other admixtures which may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. A corollary is that using a dispersant allows for the inclusion of less water while maintaining the same level of workability. A preferred plasticizer and lubricant is polyethylene glycol.

The amount, identity, and particle packing density of the inorganic aggregate filler can greatly affect the rheology and workability of the moldable mixture. Inorganic aggregates which are porous or which have a high specific surface area will tend to absorb more water than nonporous aggregates, thereby reducing the amount of water available to lubricate the particles. This results in a stiffer, more viscous mixture. Particle packing density can also have a tremendous impact on the rheology of the mixture by determining the amount of interstitial space which generally must be filled by water, lubricants, organic polymers, or other liquids in order for the mixture to flow.

By way of example, an aggregate system having a packing density of 0.65 will generally require about 35% liquids (including water) by volume in order to substantially fill the interstitial space between the particles. On the other hand, an aggregate system having a packing density of 0.95 will generally require only about 5% liquids by volume in order to substantially fill the voids. This represents a seven-fold decrease in the amount of water required to fill the interstitial space, which directly correlates to the rheological properties, including the level of workability, of the mixture. The actual particle packing density will generally range somewhere between these two extremes and should be calculated when determining how much water to add to the moldable mixture. The size and morphology of the aggregate particles can also affect the rheology and flow properties of the moldable mixture to some degree.

In situations where the moldable mixture will be subjected to high pressures, such as extrusion or other high pressure molding processes, it may be possible to take advantage of the interplay between the principles of particle packing and water deficiency in order to temporarily increase the workability and flowability while compressing the mixture. For purposes of this specification and the appended claims, the terms "water deficiency" or "deficiency of water" shall refer to a moldable mixture in which there is insufficient water (and other liquids) to fully occupy the interstitial space between the particles. Because of this, there is insufficient water to adequately lubricate the particles.

Nevertheless, upon applying a pressure that is great enough to temporarily increase the particle packing density, the amount of interstitial space between the particles will decrease. Because water is incompressible and maintains the same volume under pressure, the increased pressure increases the apparent amount of water that is available to lubricate the particles, thereby increasing the workability and flowability of the mixture. After the pressure is removed, usually after the molding process has ended, the aggregate particles will tend to return to their pre-compression density, thereby increasing the amount of interstitial space and creating an internal pressure. This results in an almost immediate increase in form stability and green strength.

Hydraulically settable inorganic aggregates such as hydraulic cement, gypsum hemihydrate, and calcium oxide can be utilized as a water absorption mechanism. These chemically react with the water, thereby reducing the effective level of water within the mixture without resorting to heating or drying techniques. Such materials can greatly affect the rheology of the mixtures as a function of the extent of hydration, which is a function of time. In addition, it has been found that hydraulic cement increases the cohesive strength of the green mixture and a fresh sheet made therefrom. It is the cohesion that holds the inorganically filled material together so that the sheet can be pulled through the rollers and yet maintain its form until it has dried sufficiently to obtain sufficient strength.

Finally, other solid components within the mixture, such as fibers, will affect the rheology of the mixture in similar fashion to the inorganic aggregates. Certain fibers may absorb water depending on their porosity and swelling capability. In addition, certain fibers can be treated to become ionically charged, which will allow them to chemically interact with ionically charged organic plasticizers, such as ionic starches. In this way the fibers may affect the rheology of the mixture to some degree.

(2). Effect of Components on Final Properties.

With regard to the final dried or hardened product, some of the properties considered generally desirable to design into the structural matrix of the sheet include high tensile strength (in general or along particular vectors), flexural strength, flexibility, and ability to elongate, deflect or bend. In some cases, it may be desirable to obtain sheets which substantially incorporate the properties of conventional paper or paperboard products. However, in other cases it may be desirable to obtain a structural matrix having properties not obtainable using ordinary wood pulp or other conventional paper-making starting materials. These may include increased toughness, higher modulus, water resistance, or lower bulk density.

In contrast to conventional paper or paperboard, in which the properties of the sheets are extremely dependent on the properties of the pulps used, the properties of the inorganically filled sheets of the present invention are substantially independent of the fibers will impart more flexibility to the sheet than shorter, stiffer fibers. However, properties that are largely pulp-dependent in conventional papers can be designed into the inorganically filled sheet by adjusting the concentrations of the nonfibrous components of the moldable mixture as well as the processing technique used. Such properties as stiffness, rigidity, surface finish, porosity, and the like are generally not dependent on the type of fibers used in the inorganically filled sheets.

The flexibility, tensile strength, flexural strength, or modulus can be tailored to the particular performance criteria of the sheet by altering the components and relative concentrations of the components within the moldable mixture. In some cases, higher tensile strength may be an important feature. In others, it may be less significant. Some sheets should preferably be more flexible, while others will be stiff. Some will be relatively dense, while others will be thicker, lighter, and more insulative. The important thing is to achieve a material which has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

In general, increasing the amount of organic polymer binder will increase the tensile and flexural strength of the final hardened sheet, while also greatly increasing the flexibility and resilience of the sheet. Adding more organic polymer also decreases the stiffness of the sheet. Similarly, increasing the concentration of fibers within the mixture also increases the tensile strength of the final sheet, particularly higher tensile strength fibers, such as ceramic fibers, although such fibers are stiff and will yield a relatively stiff hardened sheet. Conversely, adding flexible fibers, such as natural cellulosic fibers, will greatly increase the flexibility, as well as the tensile, tear, and burst strengths of the sheet.

Different fibers have greatly varying degrees of tear and burst strength, flexibility, tensile strength, ability to elongate without breaking, and stiffness. In order to obtain the advantageous properties of different types of fibers, it may be preferable in some cases to combine two or more different kinds of fibers within the moldable mixture.

It should also be understood that certain sheet forming processes, such as extrusion and rolling, will tend to orient the fibers in the direction of elongation of the mixture or sheet. This may be advantageous in order to maximize the tensile strength of the sheet in a certain direction. For example, where the sheet will be required to bend along a hinge, it is preferable for the fibers to be oriented in a way so as to more effectively bridge the two sides of the hinge or bend by being oriented perpendicular to the fold line. It may be desirable to concentrate more of the fibers in the area of a hinge or where the sheet requires increased toughness and strength.

The type of aggregate can also affect the properties of the final hardened sheet. Aggregates comprising generally hard, inflexible, small particles such as clay, kaolin, or chalk will generally result in a smoother sheet having an increased brittleness. Lightweight aggregates such as perlite or hollow glass spheres result in a sheet having lower density, lower brittleness, and greater insulating ability. Aggregates such as crushed sand, silica, gypsum, or clay are extremely inexpensive and can greatly reduce the cost of manufacturing a sheet therefrom. Any material with a high specific surface area gives increased drying shrinkage and shrinkage defects. Materials with lower specific surface areas are advantageous because they are less sticky, which allows the sheet to be processed by lower temperature rollers without sticking.

Hydraulically settable aggregates such as hydraulic cement, gypsum hemihydrate, and calcium oxide may provide small to significant degrees of binding within the hardened sheet, depending on the amount in which such hydraulically settable aggregates are added. These may increase the stiffness and compressive strength of the final sheet and, to some degree, the tensile strength. Hydraulic cement can also decrease the solubility of the sheet in water, thereby increasing the resistance of the sheet to water degradation.

Finally, other admixtures within the moldable mixtures can add a waterproofing property to the final product, such as by adding rosin and alum to the mixture. These interact to form a very water resistant component within the inorganically filled matrix. In the absence of significant quantities of such waterproofing agents, water can be used to remoisten the sheet and temporarily increase the flexibility, bendability, and elongation before rupture of the sheet, particularly where the sheet will be formed into another article of manufacture, such as a container. Of course, water can also facilitate the degradation of the sheet after it has been discarded. Water resistance can be introduced by treating the sheet surface with a 5–10% w/w starch solution in order to seal the surface porosity.

As a general rule, inorganically filled sheets which have lower concentrations of organic polymer binder and fiber will be more rigid, have a higher insulation ability, have lower cohesiveness, resist heat damage, have lower tensile strength, and resist water degradation (particularly as they contain more hydraulic cement, the inclusion of which can also increase the compressive strength of the final product).

Sheets which have lower concentrations of organic binder but higher fiber content will have higher tensile strength, have higher toughness, have lower compressive and flexural strengths, have lower stiffness and higher flexibility, and be fairly resistant to water degradation (particularly as the amount of hydraulic cement is increased).

Inorganically filled sheets which have higher concentrations of organic polymer binder and lower concentrations of fiber will be more water soluble and degradable, easier to mold (allowing for the manufacture of thinner sheets), have moderately high compressive and tensile strengths, higher toughness, moderate flexibility, and lower stiffness.

Finally, inorganically filled sheets which have higher concentrations of organic polymer binder and fiber will have properties that are most similar to conventional paper, will have higher tensile strength, toughness, and folding endurance, have moderately high compressive strength, have very low resistance to water degradation, will have lower resistance to heat (particularly those approaching ignition point of fibers or decomposition temperature of the binder), and have higher flexibility and lower stiffness.

The highly inorganically filled sheets formed using the compositions described herein will preferably have a tensile strength in the range from about 0.05 MPa to about 70 MPa, and more preferably in the range from about 5 MPa to about 40 MPa. In addition, the sheets will preferably have a bulk density less than about 2 g/cm$^3$, and more preferably in the range from about 0.4 g/cm$^3$ to about 1.5 g/cm$^3$. Whether a sheet will have a density at the lower, intermediate, or higher end of this range will generally depend on the desired performance criteria for a given usage. In light of the foregoing, the highly inorganically filled sheets of the present invention will preferably have a tensile strength to bulk density ratio in the range from about 2 MPa-cm$^3$/g to about 200 MPa-cm$^3$/g, and more preferably in the range from about 3 MPa-cm$^3$/g to about 50 MPa-cm$^3$/g.

The direction-specific strength properties of the highly inorganically filled sheets of the present invention should be contrasted with those of paper, which is known to have a strong and weak direction with regard to tensile and tearing strength. The strong direction in conventional paper is the machine direction, while the weak direction is the cross-machine direction. While the ratio of the strengths in the strong and weak direction is about 3:1 in conventional paper, in the present invention it is about 2:1, and can approach about 1:1 depending on the particular forming process used. In general, decreasing the differential forming speed tends to allow the fibers to remain in a more random orientation.

The term "elongate" or "elongation before failure" as used in the specification and appended claims with regard to the inorganically filled sheet means that the structural matrix of the sheet is capable of being stretched without rupturing and still have a finished surface. In other words, the structural matrix of the sheet is capable of moving or changing shape without rupture by application of a force such as pulling or stretching. The ability of the structural matrix of the sheet to elongate before rupture is measured by an Instron tensile test and a stress strain test.

By optimizing the mix design, it is possible to manufacture a sheet which has a structural matrix capable of elongating up to about 20% in the fresh sheet before tearing or rupturing occurs and from about 0.5% to 8% in the dry sheet. That is, the sheets are capable of elongating within this range without fracturing into two pieces. This is usually accomplished by optimizing the amounts of fiber and organic binder within the moldable mixture and resulting matrix. Producing a sheet which has a structural matrix capable of elongating within the specified range can be accomplished by including fibers within the moldable mixture such that the final hardened sheet will contain fibers in an amount of up to about 60% by weight. The greater the amount of fibers or binder added (organic binder or moldable binder), or the better the matrix to fiber interface, the more elongation that can generally be achieved without rupture of the sheet. In addition, the elongation of a dry sheet can be increased by adding steam or moisture to the sheet in the order of up to 10% by weight of the dry weight of the sheet. However, this remoistening temporarily reduces the strength of the sheet until it has been dried out again.

It should be understood that higher tensile strength, as well as greater elongation, will generally be obtained by increasing the amount of fibers within the inorganically filled matrix. This can be accomplished by adding more fibers to the moldable mixture or, alternatively, by attaching a layer of fibers (such as a sheet of paper) on the surface or within the interior of an inorganically filled sheet, or by combining fibers having varying properties of strength and flexibility.

The term "deflect" as used in the specification and appended claims with regard to the inorganically filled sheet means that the sheet has a structural matrix capable of bending and rolling without rupture and change in the finished surface. The ability of the sheet to deflect is measured by measuring the elasticity modulus and the fracture energy of the sheet using means known in the art. As with any material, the bending ability of a sheet manufactured according to the present invention is largely dependent upon the thickness of the sheet.

One way to measure deflection without regard to sheet thickness is to define deflection as the relative elongation of one side of the sheet compared to the other side of the sheet. As a sheet is rolled or bent around an axis, the length of the outer side of the sheet will elongate, while the inner side of sheet generally will not. Consequently, a thinner sheet can be bent a far greater degree even though the relative elongation of the outer side compared to the elongation of the inner side is about the same as in a thicker sheet which cannot bend nearly as far.

This ability of the sheet to deflect is related to the sheet's ability to be elastic, which is measured by Young's modulus; consequently, the optimal mix designs for achieving the desired deflection range can be optimized independently of elongation. Nevertheless, during the process of forming the sheet into an appropriate container or other object the bendability of the sheet can be temporarily increased by remoistening the sheet. The water is believed to be absorbed by the fibers, water-dispersible organic binder, and the interstices between the aggregate particles. Upon drying the formed sheet, the level of bendability will generally decrease while the toughness and hardness of the sheet will generally increase.

In order to obtain a sheet having the desired properties of strength, bendability, insulation, toughness, weight, or other performance criteria, the thickness of the sheet can be altered by adjusting the space between the rollers, as set forth more fully below. Depending on the thickness and desired performance criteria, the components and their relative concentrations can be adjusted in order to accommodate a particular sheet thickness. The sheets of the present invention may be designed to have greatly varying thicknesses; however, most products requiring a thin-walled material will generally have a thickness in the range from about 0.01 mm to about 3 mm. Nevertheless, in applications where insulation ability or higher strength or stiffness is more important, the sheet thickness may range up to about 1 cm.

The preferred thickness of the inorganically filled sheets incorporated into laminate structures of the present invention will vary depending on the intended use of the laminate. As a matter of example only, where high deflectability is desired, a thinner sheet will generally be preferred. Conversely, where strength, durability, and/or insulation and not delectability are the overriding concerns, a thicker sheet will generally be preferred. Nevertheless, where it is desired to bend the sheets along a score, or at least roll them into containers, the inorganically filled sheets will preferably have a thickness in the range from about 0.05 mm to about 2 mm or more, and more preferably in the range from about 0.15 mm to about 1 mm.

Another aspect of the present invention is the ability of the extruded and rolled material to have high green strength. This is achieved by adjusting the quantity and/or identity of the water-dispersible organic binder that is added to the inorganically filled mixture, as well as the amount of the water. Although adding a relatively low amount of water initially will greatly increase the green strength of the molded material, it is possible and often desirable to include a higher amount of water initially, because it will increase the workability and the ability of certain molding processes described herein to quickly remove excess water through the application of heat. As discussed more fully below, the moldable mixture is usually passed through a series of heated rollers which drive off a significant amount of water and aid in molding a sheet with high green strength. Nevertheless, one skilled in the art may adjust the water content so that the moldable mixture has an appropriate rheology so that it will be easily and effectively extruded through a particular die, and yet have sufficient form stability such that the integrity of the sheet is maintained as it is passed through a series of rollers during other processes.

As previously discussed, the moldable mixture is microstructurally engineered to have certain desired properties, both as to the mixture itself, and to the final hardened product. Consequently, it is important to accurately meter the amount of material that is added during any batch or continuous admixing of the components.

The currently preferred embodiment for preparing an appropriate moldable mixture in an industrial setting includes equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 10 minutes, and thereafter emptied from the mixer by extrusion for a maximum of about 3 minutes.

In certain circumstances, it may be desirable to mix some of the components together in a high shear mixture in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

Different mixers are capable of imparting differing shear to the moldable mixer. For example, a kneader imparts higher shear compared to a normal cement mixer, but is low compared to an Firich Intensive Mixer or a twin auger food extruder.

It should be understood however, that high shear, high speed mixing should not be used with materials that have a tendency to break down or disintegrate under such conditions. Certain lightweight aggregates, such as perlite or hollow glass spheres, will have a tendency to shatter or crush under high shear conditions. In addition, high shear mixing by propeller is generally efficacious only where the mixture has relatively low viscosity. In those cases where it is desirable to obtain a more cohesive plastic-like mixture, it may be desirable to blend some of the ingredients, including water, in the high shear mixer and thereafter increase the concentration of solids, such as fibers or aggregates, using a lower shear kneading mixer.

As stated above, high shear mixing is especially useful where it is desired to incorporate small, nonagglomerated air voids by adding an air entraining agent within the moldable mixture. In those cases where a moldable material, such as hydraulic cement or calcium oxide, has been added to the mixture, it may be advantageous to flood the atmosphere above the high shear mixer with carbon dioxide in order to cause the carbon dioxide to react with the mixture. It has been found that carbon dioxide can increase the form stability of a cementitious mixture and cause an early false setting of hydraulic cement. It is also the constituent which reacts with calcium oxide in order to create calcium carbonate as an insoluble binding precipitate.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. High shear mixers within the scope of these patents are available from E. Khashoggi Industries of Santa Barbara, California, the Assignee of the present invention.

B. Forming Sheets from the Moldable Mixture.

Figure 11A:
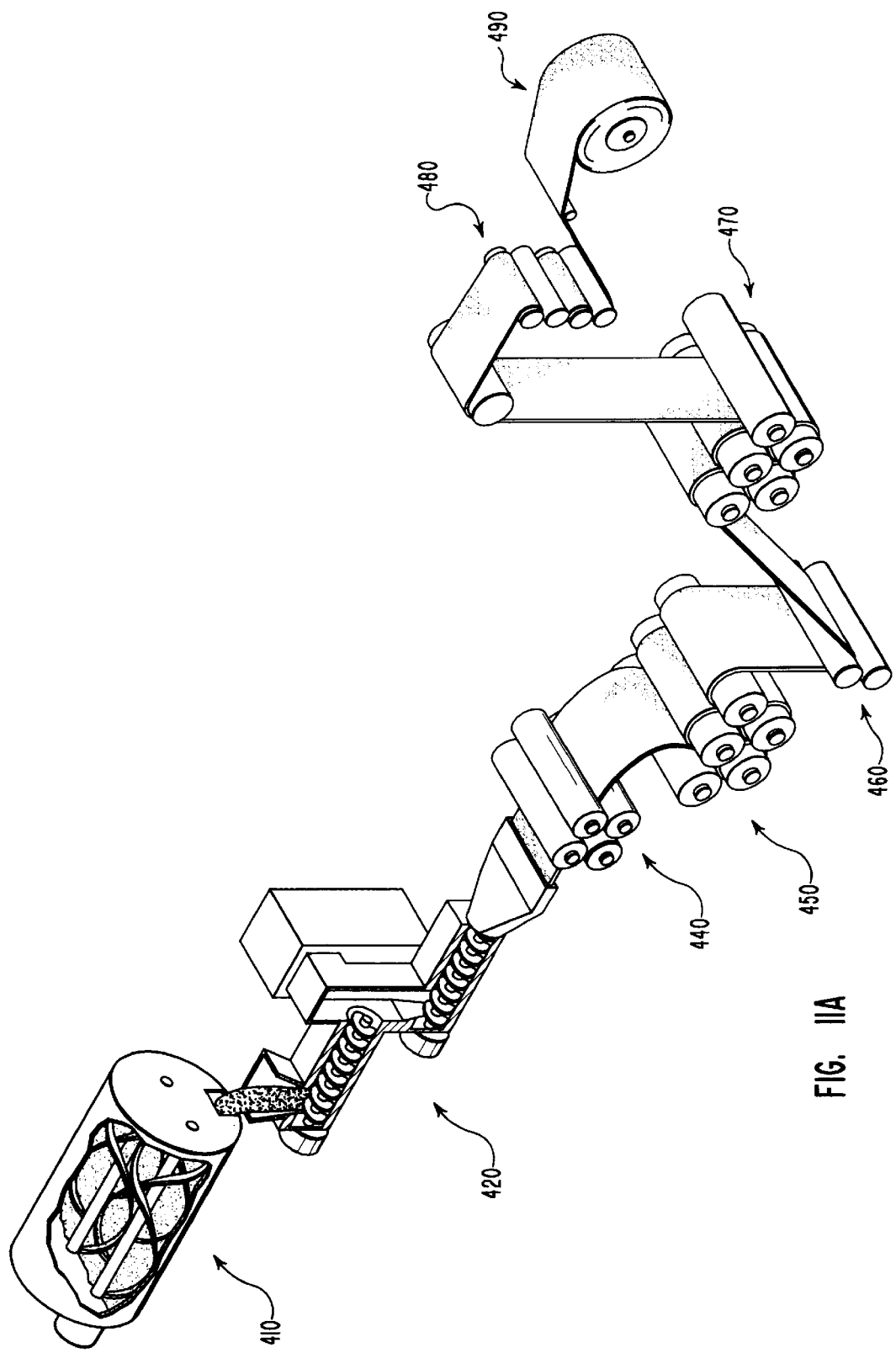
FIG. 11a is a schematic view of a preferred system used to manufacture an inorganically filled sheet, including a mixer, extruder, reduction rollers, drying rollers, compaction rollers (optional), finishing rollers (optional), and spooler (optional).

Once the moldable mixture has been properly blended, it is then transported to the sheet forming apparatus, which will typically comprise an extruder and/or a set or series of rollers. In some cases an apparatus capable of both mixing and extruding the moldable mixture may be used in order to streamline the operation and minimize the coordination of the various components within the system. Reference is now made to FIG. 11a, which illustrates a currently preferred system for manufacturing inorganically filled sheets from a moldable mixture. The system includes a mixing apparatus 410, an extruder 420, reduction rollers 440, drying rollers 450, optional compaction rollers 460, second drying rollers 470 (optional), optional finishing rollers 480, and optional spooler 490.

In the first currently preferred sheet forming step, the moldable mixture is formed into a sheet of precise thickness by first extruding the material through an appropriate extruder die and then passing the extruded material through at least one pair of reduction rollers, as shown in FIG. 11a.

Figures 12A, 12B:
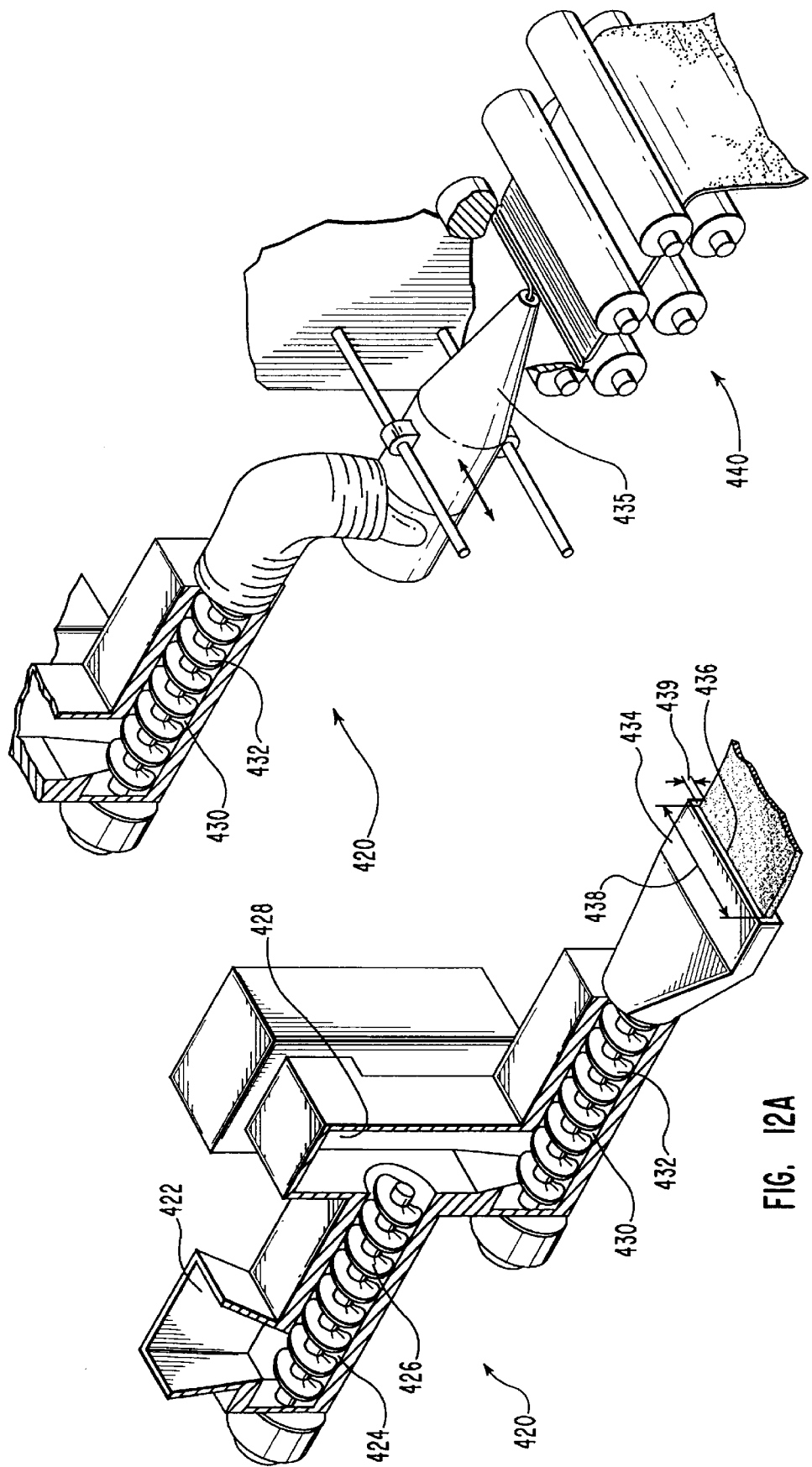
FIG. 12 is a perspective view with cutaway of an auger extruder with evacuation chamber and die head.

FIG. 12 is a closeup view of an auger extruder 420, which includes a feeder 422 that feeds the moldable mixture into a first interior chamber 424 within the extruder 420. Within the first interior chamber 424 is a first auger screw 426 which exerts forward pressure on, and advances the moldable mixture through, the first interior chamber 424 toward an evacuation chamber 428. Typically, a negative pressure or vacuum will be applied to the evacuation chamber 428 in order to remove unwanted air voids within the moldable mixture.

Thereafter, the moldable mixture will be fed into a second interior chamber 430. A second auger screw 432 will advance the mixture toward a die head 434 having a transverse slit 436 with a die width 438 and a die thickness 439. The cross-sectional shape of the die slit 436 is configured to create a sheet of a desired width and thickness that will generally correspond to the die width 438 and die thickness 439.

Figure 13:
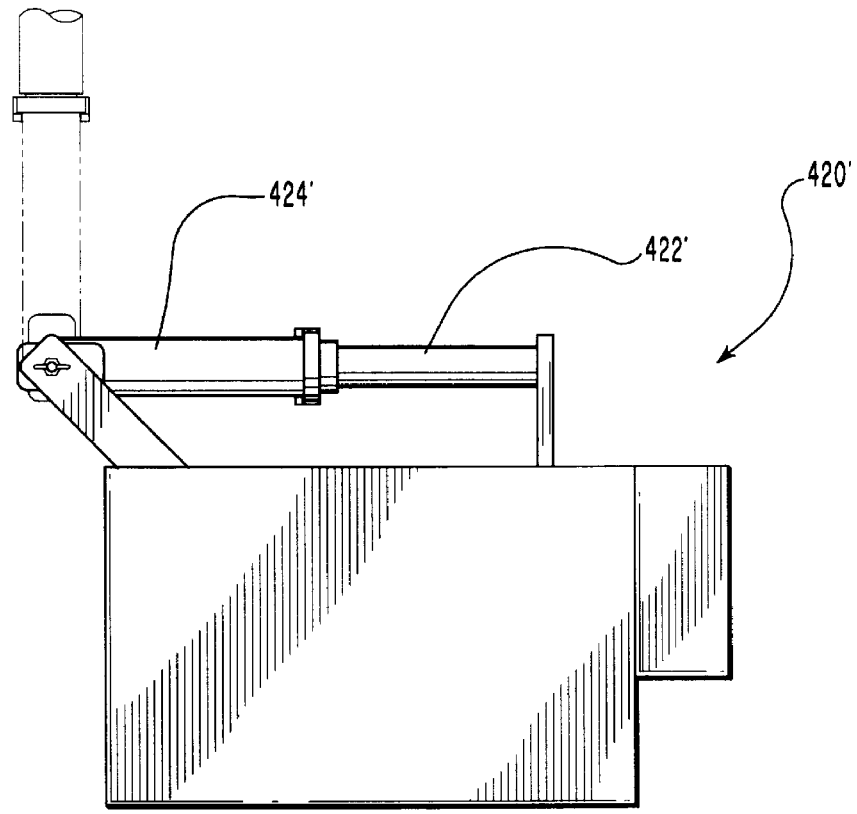
FIG. 13 is a side view of a piston extruder with die head.

Alternatively, as seen in FIG. 13, the extruder may comprise a piston extruder 420' instead of an auger extruder 420. A piston extruder utilizes a piston 422' instead of an auger screw 422 in order to exert forward pressure on, and advance the moldable mixture through, the interior chamber 424'. An advantage of using a piston extruder is the ability to exert much greater pressures upon the moldable mixture. Nevertheless, due to the highly plastic-like nature of mixtures typically employed in the present invention, it is not generally necessary, or even advantageous, to exert pressures greater than those achieved using an auger extruder.

Although the preferred width and thickness of the die will depend upon the width and thickness of the particular sheet to be manufactured, the thickness of the extruded sheet will usually be at least twice, and sometimes many times, the thickness of the final rolled sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process, an extruded sheet with a thickness of about 6 mm may be rolled into a sheet with a thickness between about 0.2 mm and about 0.5 mm. (Because this is a 12 to 30 fold decrease in thickness, the sheet should correspondingly elongate 12 to 30 times its original length after extrusion.)

It will be appreciated that where the differential between the roller nip and the sheet thickness before the sheet passes between the reduction rollers is small, the fiber orienting flow of material will tend to be localized at or near the sheet surface, with the interior not being subjected to fiber orienting flow. This allows for the production of sheets that have significant unidirectional or bidirectional orientation of fibers at or near the surface of the sheet and more random orientation of fibers within the interior of the sheet. However, by decreasing the nip relative to the initial sheet thickness it is possible to increase the orientation of the fibers within the interior of the sheet by increasing the fiber orienting flow of material within the sheet interior.

In addition to narrow die slits to form flat sheets, other dies may be used to form other objects or shapes, the only criterion being that the extruded shape be capable of being thereafter formed into a sheet. For example, in some cases it may not be desirable to extrude an extremely wide sheet. Instead, a pipe may be extruded and continuously cut and unfolded using a knife located just outside the die head.

The amount of pressure that is applied in order to extrude the moldable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the rollers during the rolling step. If the rate of extrusion is too high, excess moldable material will tend to build up behind the rollers, which will eventually cause a clogging of the system. Conversely, if the rate of extrusion is too low, the rollers will tend to stretch the extruded sheet, which can result in a fractured or uneven structural matrix, or worse, breakage or tearing of the sheet. The latter can also result in a complete breakdown of the continuous sheet forming process.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the moldable mixture to be extruded through a die head, as well as the rate at which it is extruded, is generally a function of the rheology of the mixture, as well as the operating parameters and properties of the machinery. Factors such as the amount of water, water-dispersible organic binder, dispersant, the perlite packing density, or the level of water absorption by the mixture components all affect the rheological properties of the mixture. Because it will sometimes not be possible to control all of the variables that can affect the rate of extrusion, it may be preferable to have an integrated system of transducers which measure the rate of extrusion, or which can detect any buildup of excess material behind the rollers. This information can then be fed into a computer processor which can then send signals to the extruder in order to adjust the pressure and rate of extrusion in order to fine tune the overall system. As set forth below, a properly integrated system will also be capable of monitoring and adjusting the roller speed as well.

As set forth above, adequate pressure is necessary in order to temporarily increase the workability of the moldable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions. However, as the mixture is compressed within the extruder, the compressive forces drive the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

It should be understood that the pressure exerted on the moldable mixture during the extrusion process should not be so great as to crush or fracture the lightweight, lower strength aggregates (such as perlite, hollow glass spheres, pumice, or exfoliated rock). Crushing or otherwise destroying the structural integrity of these or similar lightweight aggregates containing a large amount of voids will decrease their insulating effect by eliminating the voids. Nevertheless, because perlite, exfoliated rock, or other such materials are relatively inexpensive, some level of crushing or fracturing of the aggregate particles is acceptable. However, at some point excess pressure will eliminate the lightweight and/or insulative effect of the lightweight aggregate, at which point it would be more economical to simply include a less expensive aggregate, such as sand.

In light of each of the factors listed above, the amount of pressure which will be applied by the extruder in order to extrude the moldable mixture will preferably be in the range from about 50 kPa to about 70 MPa, more preferably in the range from about 150 kPa to about 30 MPa, and most preferably in the range from about 350 kPa to about 3.5 MPa.

It will be understood that the extrusion of the moldable mixture through the die head will tend to unidirectionally orient the individual fibers within the moldable mixture along the "Y" axis, or in the lengthwise direction of the extruded sheet. As will be seen herein below, the rolling process will further orient the fibers in the "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with rolling, which will have bidirectionally oriented fibers.

In addition to the use of traditional extrusion methods, such as those set forth above, it may be preferable in some cases to either extrude individual mixture masses, which are conveyed to a hopper situated immediately above two horizontally oriented extruding rollers, or simply convey the moldable mixture to the hopper. This eliminates the need to initially extrude the moldable mixture into a sheet before the rolling process. One conveyor method is an auger conveyor, which allows for variations in feed pressure of the moldable mixture through the rollers.

Reference should be made to FIG. 11b, which illustrates an alternative preferred embodiment in which the moldable mixture is conveyed directly from the mixer 410 to a pair of extruding reduction rollers 440, which converts the amorphous moldable mixture directly into a sheet without the use of an extruder die. As in the other system illustrated in FIG. 11a and described above, the sheet formed by the rollers 440 is fed through a series of drying rollers 450, optional compaction rollers 460, optional second drying rollers 470, optional finishing rollers 480, and then wound onto optional spooler 490.

C. The Rolling Process.

In most embodiments of the present invention, it will be preferable to "roll" or "calender" the extruded sheet by passing it between at least one pair of rollers, the purpose of which is to improve the uniformity and surface quality of the sheet. In some embodiments, the rolling step will only reduce the thickness of the sheet by a small amount, if at all. In other cases, it will substantially reduce the thickness of the sheet, particularly where the moldable mixture is fed directly between the rollers without first extruding the mixture into the form of a sheet. In cases where it is desirable to greatly reduce the thickness of the inorganically filled sheet, it will often be necessary to reduce the thickness of the sheet in steps, wherein the sheet is passed through several pairs of rollers, with each pair having progressively narrower gap distances therebetween.

Figure 14:
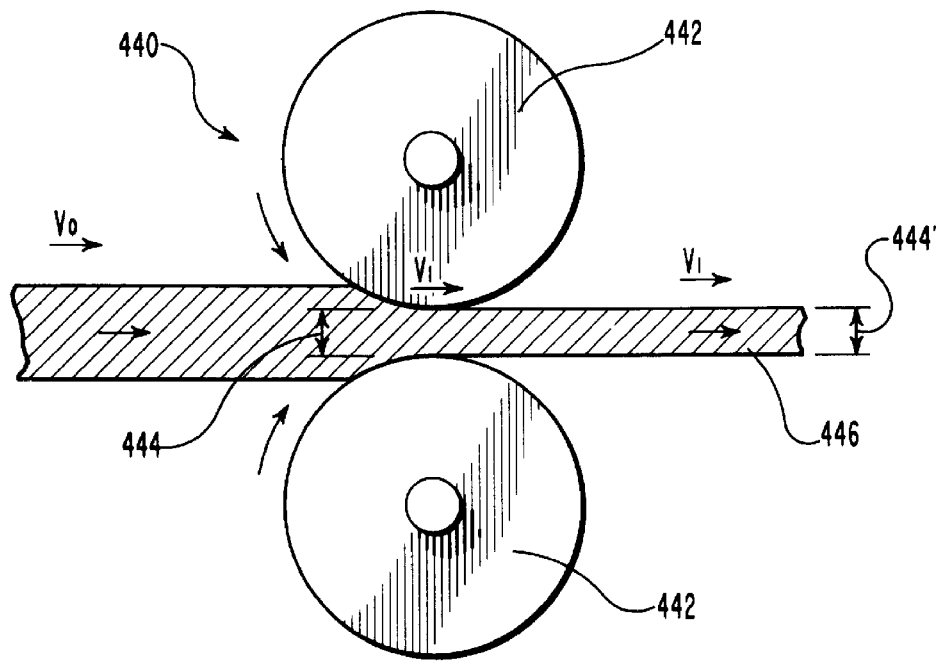
FIG. 14 is a side view of a pair of reduction rollers and a sheet being reduced in thickness by the rollers.

Reference should be made to FIG. 11a which shows one embodiment of the present invention in which a series of three pairs of rollers are employed during the rolling process. The rollers within each of the three roller pairs have similar diameters, although in some cases it may be preferable to use smaller diameter rollers in combination with larger diameter rollers. As seen in FIG. 14, a set or pair of rollers 440 normally includes two individual rollers 442 positioned adjacent to one another with a predetermined gap distance 444 therebetween. The gap distance 444 between the two individual rollers 442 corresponds to the desired thickness 444' of the reduced sheet 446 after it passes between the set of rollers.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction. However, as previously stated, increasing the speed of the rolling process has been found to create a better randomization of fibers throughout the sheet.

Another way to maintain the random orientation of fibers within the sheet is to decrease the differential forming speed of the rollers. That is, where the moldable mixture is fed between the extruding rollers under lower pressures, the sudden increase in machine-direction velocity and accompanying shear as the mixture passes between the rollers will tend 14 to orient the fibers in the machine direction. However, by increasing the pressure of the mixture it is possible to decrease the level of machine-direction shear, thereby resulting in a sheet with a more randomized fiber orientation.

Another consequence of sheet elongation is that the sheet will "speed up" as it passes between a pair of reduction rollers. Reference is again made to FIG. 14 to illustrate that the rotational speed $v_1$ of the rollers will correspond to the speed $v_1$ of the reduced, elongated sheet as it exits the rollers, not the speed of the sheet as it enters the gap between the rollers.

By way of example, if the sheet thickness is reduced by 50%, and assuming there is no widening of the sheet during the reduction process, the sheet will elongate to twice its original length. This corresponds to a doubling of the sheet's velocity before it enters the rollers compared to when it exits the rollers. Thus, as in FIG. 14, if the sheet thickness is reduced by 50%, then $v_1=2xv_0$; the velocity doubles from point "a" to point "b".

The sheet "speeds up" while passing between a pair of rollers by being squeezed or pressed into a thinner sheet by the rotating rollers. This process of squeezing or pressing the sheet, as well as the speed differential between the entering sheet and the rollers, can create varying shearing forces on the sheet. The application of an excessively large shearing force can disrupt the integrity of the structural matrix of the sheet and create flaws within the sheet, thereby weakening the sheet. Nevertheless, it has been found that for mix designs having very low adhesion to the rollers, and which are highly plastic, it may be possible to reduce the extruded sheet to the final thickness in just one step using a pair of relatively large diameter rollers.

The diameter of each of the rollers should be optimized depending on the properties of the moldable mixture and the amount of thickness reduction of the inorganically filled sheets. When optimizing the diameter of the rollers, two competing interests should be considered. The first relates to the fact that smaller diameter rollers tend to impart a greater amount of shearing force into the sheet as it passes between the rollers. This is because the downward angle of compression onto the sheet is on average greater than when using a larger diameter roller as shown in FIG. 15.

Figure 15:
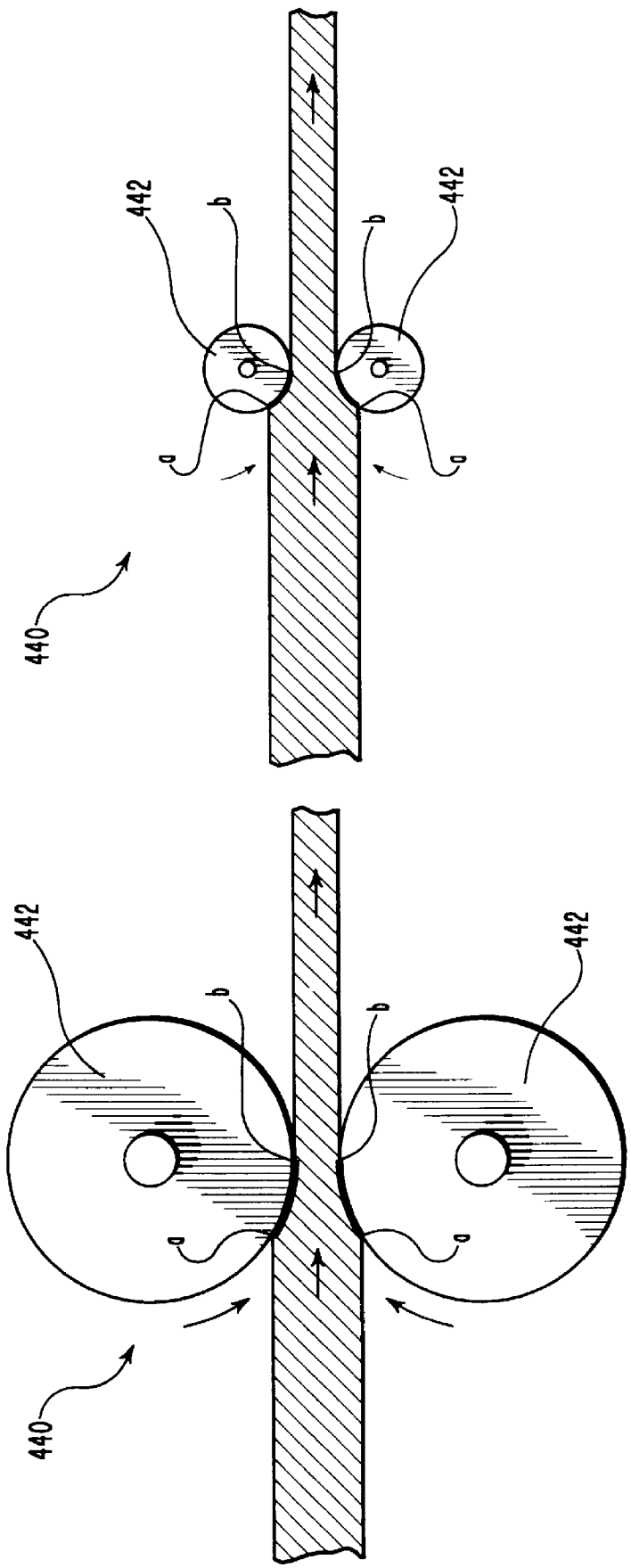
FIG. 15 is a side view comparing the effect of narrow and broad rollers on sheet reduction.

Reference to FIG. 15 illustrates that not only is the downward angle of compression less severe in a larger diameter roller, the distance (and by analogy, the time) during which the sheet is being accelerated is greater when using larger diameter rollers. Because it takes longer for the sheet to pass from point "a" to point "b" when using broader rollers, the rate of acceleration is decreased, as are the shearing forces associated with the reduction in sheet thickness. Consequently, from this perspective, larger diameter rollers appear to be advantageous compared to smaller diameter rollers because less shearing forces would be expected to introduce fewer flaws into the structural matrix.

However, the use of larger diameter rollers has the drawback of the moldable material coming into contact with the roller for a greater period of time, thereby resulting in increased drying of the sheet during the rolling process in the case where the rollers arc heated to prevent adhesion. Because more of the sheet comes into contact with a larger diameter roller, heating is even more important when using larger diameter rollers to prevent adhesion. While some drying is advantageous, drying the sheet too quickly during the rolling process could result in the introduction of fractures and other flaws within the structural matrix. A drier sheet is less able to conform to a new shape without a rupture in the matrix compared to a wetter sheet subjected to the same level of shearing forces. Consequently, from this perspective the use of smaller diameter rollers is advantageous for reducing the drying effect of the reduction rollers. Nevertheless, some of the drawbacks of using a larger diameter roller can be minimized by using a highly polished roller, lower temperatures, and appropriate mix designs to reduce the stickiness of the moldable mixture. Also, passing the sheet through faster reduces the drying effect of the rollers and causes greater widening of the sheet.

The optimization of the roller diameters in order to achieve the greatest amount of reduction of sheet thickness, while at the same time preventing overdrying of the molded sheet, is preferred in order to reduce the number of reduction steps in a manufacturing process. Besides reducing the number of working parts, reducing the number of reduction steps also eliminates the number of rollers whose speed must be carefully synchronized in order to prevent sheet buildup behind the rollers (in the case of rollers rotating too slow) or sheet tearing (in the case of rollers rotating too fast).

As set forth above, it is preferable to treat the roller surfaces in order to prevent sticking or adhesion of the sheet to the rollers. One method entails heating the rollers, which causes some of the water within the moldable mixture to evaporate, thereby creating a steam barrier between the sheet and the rollers. Evaporation of some of the water also reduces the amount of water within the moldable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature in the range from about 40° C. to about 140° C., more preferably from about 50° C. to about 120° C., and most preferably from about 60° C. to about 85° C.

In addition, the rate of drying of the sheet can be reduced by incorporating aggregates having a low specific surface area. Aggregates which have a greater specific surface area can more readily release any water that is absorbed within the aggregate, or adsorbed onto the surface, compared to aggregates having a lower specific surface area.

Generally, the stickiness of the moldable mixture increases as the amount of water in the mixture is increased. Therefore, the rollers should generally be heated to a higher temperature in cases where the mixture contains more water in order to prevent sticking, which is advantageous because sheets containing a higher water content must generally have more of the water removed in order to obtain adequate green strength.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the sheets and rollers can be reduced by cooling the rollers to or below room temperature. Heating the mixture in the extruder to a relatively high temperature, between about 20° C. to about 80° C. for example, and then cooling the sheet surface causes the vaporizing water to condense, which is thought to create a thin film of water between the sheet and the roller. The rollers should be cool enough to prevent the surface of the sheet from adhering to the rollers, but not so cold as to cause the sheet to freeze or become so stiff or inflexible that it will fracture or shatter during the rolling process. Accordingly, it is preferable to cool the rollers to a temperature in the range from about 0° C. to about 40° C., more preferably from about 5° C. to about 35° C., and most preferably from about 10° C. to about 15° C.

Another way to reduce the level of adhesion between the rollers and the inorganically filled sheet is to treat the roller surfaces in order to make them less amenable to adhesion. Rollers are typically made from polished stainless steel and coated with a nonstick material such as polished chrome, nickel, or Teflon.

Finally, it should be understood that due to the plastic nature and relatively high level of workability of the moldable mixture, the rolling process will usually not result in much compression of the inorganically filled sheet. In other words, the density of the sheet will remain substantially constant throughout the rolling process, although some compaction would be expected, particularly where the sheet has been significantly dried while passing between the reduction rollers. Where compaction is desired, the sheet can be passed between a pair of compaction rollers 460 as shown in FIG. 11a following a drying step, as set forth more fully below.

One of ordinary skill in the art will appreciate that the extrusion step need not formally employ the use of an "extruder" as the term is used in the art. The purpose of the extrusion step is to provide a continuous, well-regulated supply of moldable material to the rollers. This may be achieved by other mechanisms known to those skilled in the art to effect the "extrusion" or flow of material through an appropriate opening. The force needed to cause a moldable mixture to flow may, for example, be supplied by gravity.

As set forth above, it may be advantageous to simply feed the moldable mixture through the rollers according to the extrusion process shown in FIG. 11b. This reduces the cost of the sheet-forming process while also allowing for the adjustment of the pressure of the mixture being fed between the rollers. Increasing the pressure increases the randomization of the fibers within the final sheet, while decreasing the pressure increases the differential speed and shear in the machine direction, resulting in greater alignment of the fibers in the machine direction.

In summary, it has been found that the important parameters within the rolling process include the diameter, speed, and temperature of the rollers, as well as the "nip height" (or gap therebetween). Increasing the roller speed will generally allow, and may require, a corresponding increase in the temperature of the rollers in order to prevent adhesion of the sheet to the rollers. Increasing the diameter of the rollers, as well as the nip height, each tend to decrease the shear rate that is imparted by the rollers to the moldable mixture and inorganically filled sheet during the rolling process, while increasing the speed increases the shear rate.

D. The Drying Process.

Although the rolling process often results in partial or even substantial drying of the inorganically filled sheet, it will be preferable to further dry the sheet in order to obtain a sheet with the desired properties of tensile strength and toughness. (Of course, the sheet will naturally dry out over time, although it may be unfeasible to wait for the sheet to naturally air dry.) Accelerated drying may be accomplished in a number of ways, each of which involves heating the sheet in order to drive off the excess water. A preferred method of drying the sheet involves the use of large diameter, heated drying rollers, sometimes known in the art as "Yankee" rollers, although a series of smaller rollers may also be employed. The main concern is that the combined surface areas of the rollers be adequate to efficiently effectuate drying of the sheet.

In contrast to the reduction rollers, which are generally aligned in pairs of rollers, the drying rollers are individually aligned so that the sheet passes over the surface of each roller individually in sequence. In this way, the two sides of the inorganically filled sheet are alternatively dried in steps. While the sheet passes between the reduction rollers during the rolling step in a generally linear path, the sheet follows a generally sinusoidal path when wrapping around and through the drying rollers during the drying step shown in FIG. 11a.

The temperature of the drying rollers will depend on a number of factors, including the moisture content of the sheet as it passes over a particular roller. In any event, the temperature of the drying rollers should be less than about 300° C. Although the moldable material should not be heated to above 250° C. in order to prevent the destruction of the organic constituents (such as the organic polymer binder or cellulosic fibers), rollers heated to above this temperature may be used so long as there is adequate water within the mixture to cool the material as the water vaporizes. Nevertheless, as the amount of water decreases during the drying process, the temperature of the rollers should be reduced to prevent overheating of the material.

In some cases, it may be preferable to use a drying tunnel, oven, or chamber in conjunction with the drying rollers. In order to obtain the full effect of heat convection drying, it is often preferable to circulate the heated air in order to speed up the drying process. The temperature within the drying tunnel, as well as the residence or dwell time of the sheet within the tunnel, will determine the amount and rate of evaporation of the water within the moldable material. The temperature of the drying tunnel should not usually exceed 250° C. in order to prevent the destruction of the cellulose fibers and the binder. In light of the foregoing, the drying tunnel will preferably be heated to a temperature in the range from about 50° C. to about 250° C., and more preferably in the range from about 100° C. to about 200° C.

Figure 19:
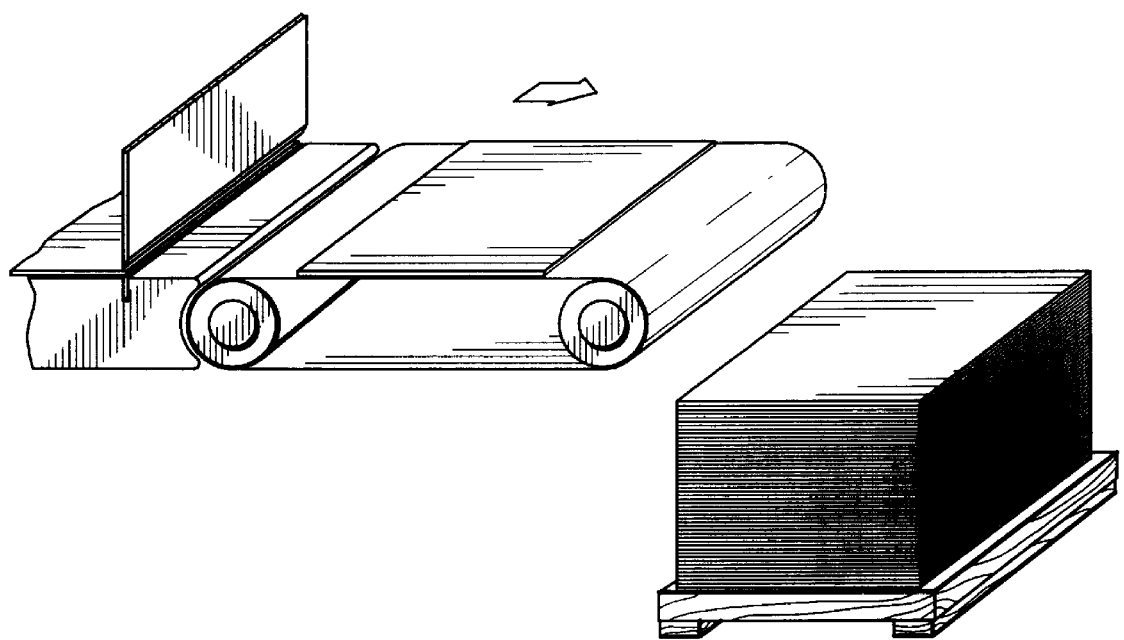
FIG. 19 is a perspective view showing a continuous sheet being cut and stacked as individual sheets.

In some cases, the drying process set forth above will be the final step before the sheet is either used to form a container or other object or, alternatively, rolled onto a spool (FIGS. 11a or 11b) or stacked as sheets until needed (FIG. 19). In other cases, particularly where a sheet with a smoother, more paper-like finish is desired, this drying step will be followed by one or more additional steps set forth more fully below, including a compacting step and/or a finishing step.

In the case of compaction, it is generally preferable to leave the sheets with adequate moisture so that the structural matrix remains in a moldable condition to prevent fracturing of the matrix during the optional compaction step. Otherwise, if the drying step is not followed by a compaction step, it is generally desired to substantially dry out the sheet in order to quickly maximize the tensile strength and toughness of the sheet.

E. Optional Finishing Processes.

Figure 16:
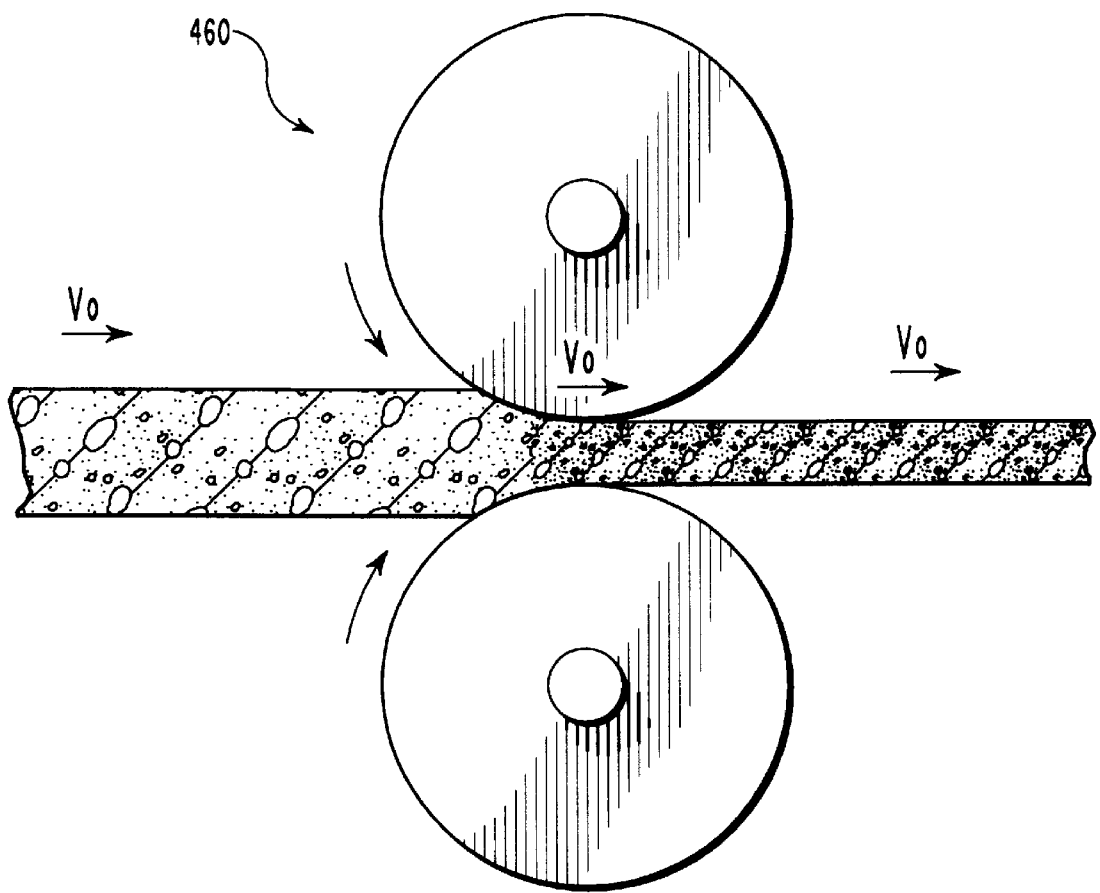
FIG. 16 is a side view of a pair of compaction rollers with a sheet being compacted therebetween.

In many cases, it may be desirable to compact the inorganically filled sheet in order to achieve the final thickness, tolerance, and surface finish. In addition, the compaction process can be used to remove unwanted voids within the structural matrix. Referring to FIG. 16, the sheet may optionally be passed between a pair of compaction rollers 460 after being substantially dried during the drying process. The compaction process generally yields a sheet with higher density and strength, fewer surface defects, and a smaller thickness, and also fixes and aligns the compacted particles within the sheet surface. The amount of compressive force of the compaction rollers should be adjusted to correspond to the particular properties of the sheet.

The compaction process is preferably carried out without causing significant elongation of the sheet and without negatively disrupting or weakening the structural matrix. In order to achieve compaction without elongating the sheet and without weakening the structural matrix, it is important to control the drying process so that the sheet contains an appropriate amount of water to maintain a moldable rheology of the sheet. If the sheet contains too much water, the compaction rollers will elongate the sheet in similar fashion as either the extruding or reduction rollers. In fact, the compaction rollers are substantially the same as the extruding or reduction rollers, the only difference being that compaction, rather than elongation will occur if the sheet is dry enough and the reduction in sheet thickness is less than the total porosity left by the evaporation of the water (i.e., if the evaporation of water creates an additional porosity of 25% then the roller nip should be at least 75% of the thickness of the precompacted sheet).

On the other hand, overdrying the sheet prior to the compaction step can yield a weaker sheet. At some point the inorganically filled sheet can become so dry and brittle that the structural matrix is no longer moldable and cannot be compressed without fracturing. The stressing of the structural matrix can diminish the final strength and other beneficial properties of the sheet even if the fractures are microscopic and not visible to the naked eye. The structural matrix should preferably be just moist enough to allow it to flow or mold out the voids when compacted, but dry enough so that compaction, not elongation, occurs. (Nevertheless, even a completely dry sheet may be compacted in some cases without introducing significant defects by first remoistening the sheet.)

It has been found preferable to compact and dry the sheets in a sequential fashion in order to progressively compact the sheet. This allows for the removal of just enough of the water to allow the sheet to compact, while retaining sufficient water to maintain the moldability of the structural matrix. Because the compaction process forces the particles into closer proximity, thereby increasing the particle packing density and reducing the porosity within the sheet, there is more water available for lubricating the particles after the compaction step, assuming a constant water content, within the inorganically filled sheet. This allows for the simultaneous or subsequent removal of water from the inorganically filled sheet without a significant reduction in moldability. This in turn makes possible the sequential compaction and removal of water without concomitant damage to the inorganically filled sheet structure.

Because the compaction process (including one or more compaction steps) usually involves a slightly moist sheet, it is usually preferable to further dry the sheet after the compaction step in a manner similar to the drying process outlined above using optional drying rollers 470 (FIGS. 1a and 1a). This optional drying step may be carried out using drying rollers, a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

Figure 17:
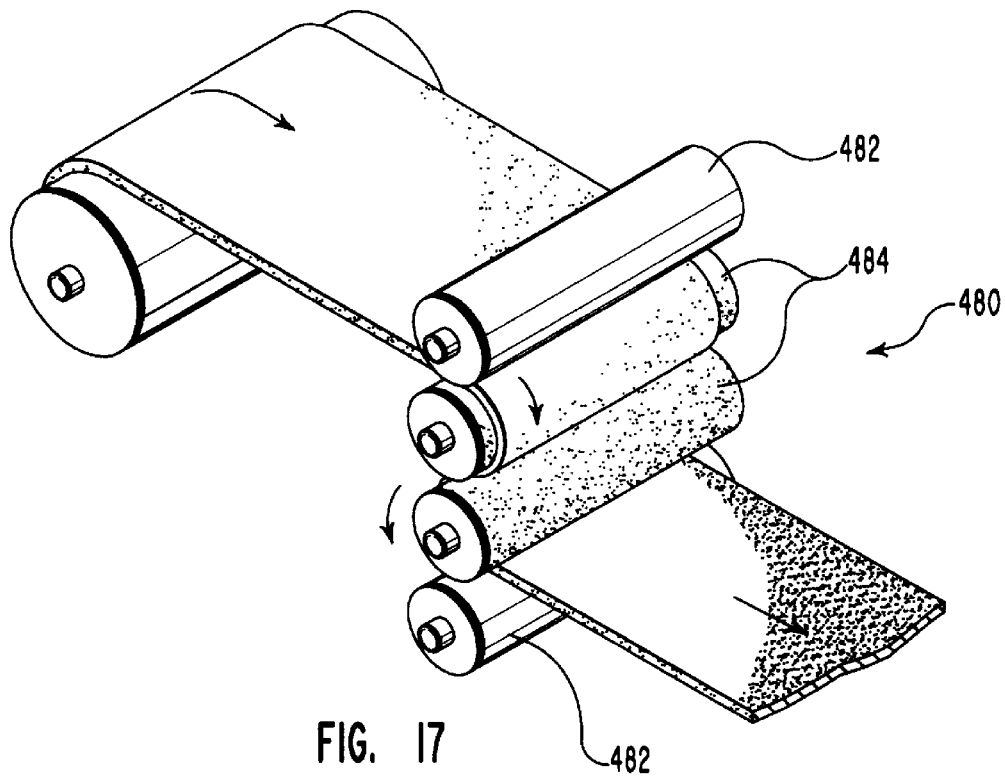
FIG. 17 is a perspective view of a pair of finishing rollers including a "hard" roller and a "soft" roller.

It may also be preferable to further alter the surface of the sheet by passing the sheet between one or more pairs of finishing (or "calendering") rollers 480 (FIGS. 1a and 1b). For example, in order to create a sheet with a very smooth surface on one or both sides, the sheet may be passed between a pair of hard and soft rollers (FIG. 17). The term "hard roller" refers to a roller 482 having a very polished surface and which leaves the side of the sheet in contact with the hard roller very smooth. The term "soft roller" refers to a roller 484 having a surface capable of creating enough friction between the soft roller 484 and the sheet to pull the sheet through the hard and soft roller pair. This is necessary because the hard roller 482 is usually too slick to pull the dry sheet through a pair of hard rollers. Besides, some slippage of the hard roller 482 is advantageous in order to align the particles within the surface of the sheet. Using a driven, highly polished hard roller in order to "supercalender" the sheet results in a sheet having a very smooth surface finish. The finishing process may be optionally facilitated by spraying water on the sheet surface, and/or by coating the surface with clay, calcium carbonate, or other appropriate coating materials known to one of ordinary skill in the art.

Figure 18:
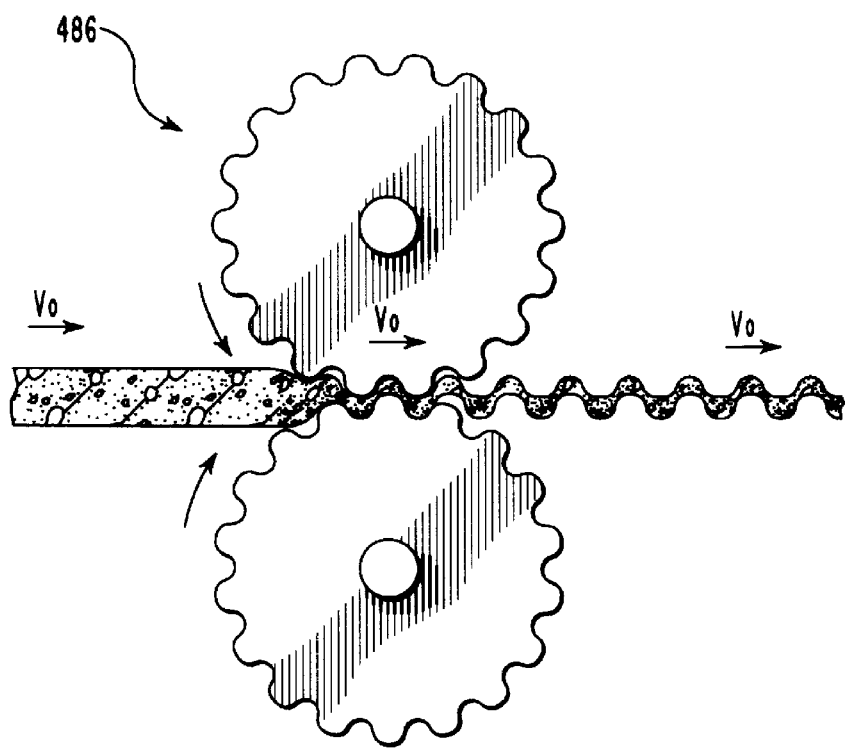
FIG. 18 is a side view of a pair of corrugated rollers used to form a corrugated sheet.

In other embodiments, as illustrated in FIG. 18, the finishing rollers can impart a desired texture, such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers. The extruder rollers, reduction rollers, or compaction rollers may contain means for producing a water mark by either producing a raised or depressed area within a sheet passing therethrough.

Although the finishing or calendering process usually requires some compaction of a sheet that has been dried to the point where the structural matrix is no longer moldable, the compaction is not so great that it significantly weakens the sheet and is generally localized at the surface of the sheet. The slight reduction in sheet strength is counterbalanced by the vast improvement in surface quality that is brought about by the finishing process.

3. Processing the Inorganically Filled Sheets Preparatory to Forming Composite Laminate Structures The inorganically filled sheets prepared according to the methods set forth above may be used in a dry or semi-dry state in order to fashion the laminates of the present invention. In addition, it is also within the scope of this invention to remoisten dried sheets in order to introduce increased flexibility, particularly where the sheet is to be subsequently sharply folded or bent. The sheets can be remoistened using any liquid, both volatile and nonvolatile, although water and minimal oil are preferred.

Laminates are made from one or more sheets having a structural matrix by rolling the sheet in the nip of two rollers with a sheet of the same or a different material, with or without an adhesive therebetween. Such laminated layers could also be done by hand, depending upon choice of sheet materials and conditions thereof.

Containers and other objects are fashioned from laminates having at least one sheet made of a structural matrix by cutting a blank from the laminate composite structure and then folding, rolling, convoluting, spiral winding, pressing, or assembling the blank into the desired object. In many cases, two or more of these object forming processes may be used in combination or in sequence.

Depending on the design or function of the desired objects, the sheets, blanks, or laminates therefrom can also be subjected to other optional processes prior to (and in many cases to aid in) their formation into the desired object. These optional preparatory processes within the scope of this invention include moisture assistance, processing through various heating and chilling systems, formation into substrates such as honeycombs, lamination, corrugation, the application of coatings, the printing of indicia, scoring and perforation (as an aid in bending for folding), and slotting.

A. Processes Related to and Assisting in the Formation of Composite Laminate Structure (1) Moisture Assistance Equipment Experience has shown that moisture added to polymer coated sheets immediately before combining will dramatically aid clarity. This can be done with a flooded nip, or liquid dam between the rolls used to combine the sheets. This may also be done with a steam source directed at one or more of the sheets. Steam is far less troublesome from a practical standpoint, although a clean steam source will probably make such a system more expensive.

The flooded nip approach, while inexpensive and relatively easy to test, has definite practical problems. A dam system must be fabricated to contain the water to form the pool. The water will be released every time the nip is opened. While the volume of the pool will be small, this can cause waste if moisture sensitive materials are used. Liquid level control is another important aspect. Manual supervision would detract from operator attention to more important detail. A simple overflow orifice in one end dam is one possibility and definitely preferable to elaborate electronic control. Moisture addition is also used as a cure accelerator for single-component, 100% solids urethane adhesives.

(2) Heating Systems

Direct electrical resistance heating is used for smaller laminating rollers. But it is difficult to design a large hot roll that is heated this way with acceptably uniform face temperatures. A fluid medium, such as oil, water, or steam is easily controlled and existing designs give very uniform surface temperatures over wide widths. Compact heaters, complete with temperature controllers and pumping system, are available which require only simple plumbing to rotary unions on the hot roll to complete the installation.

Pressurized water systems have the advantage of low-cost heaters and inexpensive transfer medium. The disadvantage is limited maximum temperature. Water-heated systems are used for operating temperatures below 120° C. Steam systems react quickly to desired temperature changes but will require licensed operating personnel for higher temperatures.

Oil type transfer media are quite expensive. Oil systems are slow to respond to temperature changes but do offer the advantage of high temperatures without the need for highly trained personnel.

(3) Sheet Chilling

Sheets exiting thermal laminators and most dry bond laminators are at highly elevated temperatures and must be cooled before rewinding. A coated, tightly wound, very warm roll will otherwise tend to form a solid block. It is not necessary to chill far below ambient temperature. In fact, if catalyzed adhesives are involved, it may actually be desirable to rewind the laminate slightly warm to accelerate cure. Only very specialized applications require cooling below 25° C.

An extremely important factor in thermal laminating is control of sheet tension variations induced by thermal expansion and contraction of the backing and chill rollers. In the interest of drive system economy, it is common practice to have a fixed speed ratio between these elements. The tension changes between these points can be appreciable if highly thermoplastic materials only are involved. However, a metal foil or other nonextensible sheet will exhibit relatively short, randomly located machine direction wrinkles. A new machine intended for high-temperature operation should include provisions for compensation. If wrinkles are observed on an existing machine and tension is a suspected cause, simply bypass the chill or other potentially offending component temporarily. Addition of a mechanical speed variator is not difficult and will permit operation over any process temperature range that does not include web distortion.

Automatic temperature control of cooling rolls is desirable for several reasons:

a) Excessive chilling is a needless waste of energy and may actually be detrimental to adhesive cure.

b) Cooling far below the dew point will produce condensation which accelerates rusting of unprotected roll journals.

c) Accumulated condensate may create waste product if moisture-sensitive webs are involved.

(4) Sheet Coating Apparatus and Processes a. Adhesives Coating Machinery and Processes When the combination of two sheets requires that there be an adhesive applied therebetween, gravure coating is a suitable process to apply the coating. The two sheets are fed into a sheet fed press, preceded by gravure coating. One such apparatus in front of a press, for example, could apply a hold-out coat to a porous sheet. A unit at the end of a press can be used to apply a top coating over the printing, or heat sealing stripes on the back of the sheet. Some flexographic presses are equipped with a gravure unit at the end to apply a thermoplastic adhesive, followed by a laminating station. Most laminators for aluminum foil and paper-like sheets have a gravure coater to apply an overall coating to the foil, to prevent corrosion from moisture and slats in the paper-like sheet as well as to prime it for printing. It is contemplated that inorganically filled sheets be used for such paper-like sheets.

b. Extrusion Coating Machinery and Processes

Extrusion coating, as opposed to laminating, is a complex process involving many related variables all of which result in the coating of a sheet with a particular desirable material with certain beneficial properties.

In practice, an extrusion coating section in a laminating machine line is arranged in the machine line to coat either one side of a sheet or the other, but usually not both. The facility to coat either side might be provided by an unwind machine able to unwind a roll in either direction. An extrusion coating machine can also be provided with a coating nip assembly on both sides of the chill roll and the facility to arrange the die and nip configuration to coat either side of the sheet.

Another device facilitating coating either side of the sheet is a turning bar which, as its name implies, will turn the sheet over upside down within the machine line. The sheet traveling downstream makes a 90° turn around a bar which is angled at 45° to the machine direction, which turns the sheet upside down but going in the wrong direction, perpendicular to the required flow. The sheet then makes a 180° turn around a roll, now right side up and traveling in the other direction perpendicular to the required flow. The sheet then makes another 90° turn around a bar which is angled at 45° to the machine direction which again turns the sheet upside down but now traveling in the original downstream direction.

The turning bars, or air bars, are air-greased, meaning that they have small perforations through which air is blown so that the sheet rides around them on a cushion of supporting air and does not contact the stationary metal bars. Turning bars are useful devices. Some machine lines might have two or three of them providing much flexibility of which side of the sheet is to be coated in multiple coating stations.

Machine lines can employ two extrusion coating stations in tandem allowing either two-side coating in one pass or extrusion lamination plus one-side coating. The second station can be equipped for coextrusion. A composite laminate structure could be [inorganically filled sheet]-[poly]-[foil]-[poly]-[poly]. The "polys," of course, can all be different polymers depending upon the required function. A third station can provide the ability for extrusion lamination plus two-side coating such as for a construction of [poly]-[inorganically filled sheet]-[poly]-[foil]-[poly]-[polyl]. There are also machine line installations of four stations where the last poly layer is applied independently.

4. Laminates Having Structural Enhancements

Laminate composites are complemented with strength not only due to the principles of blunting and arresting fracture as described above, but also when laminated layers are shaped into strength enhancing structures.

A laminated sandwich of particular strength is the metal-faced honeycomb-cored sandwich, which is designed with skins of aluminum, and the honeycomb is formed from phenolic-resin-impregnated inorganically filled sheets. There are two methods of making such a sandwich, and they center around the method used for forming the honeycomb structure. In one case the impregnated inorganically filled sheets are corrugated by means of meshing belts carrying suitably shaped and spaced bars or gears, and the corrugations are glued together at their crests.

The other is formed by striping the flat web of the inorganically filled sheets at intervals with adhesive, laying alternate pieces of the sheets so that even-numbered layers have their stripes centered between those on the odd-numbered layers. After the adhesive in the stripes is activated and cured, the pad is sliced into sections of the proper thickness, and the honeycomb is expanded in the same manner as is used in opening a paper Christmas bell.

A 20 percent, by weight, phenolic resin is used with inorganically filled sheets. Various types of phenolics can be in the inorganically filled sheet core. A water-soluble resin has a high degree of effectiveness, but will make the impregnated inorganically filled sheet somewhat too brittle for some applications. An alcohol-soluble resin does not penetrate the inorganically filled sheets as completely as does the water-soluble type, but the treated inorganically filled sheet paper will be far more flexible.

Plastics are also used in honeycomb sandwiches to provide the bond between the honeycomb core and face sheets, in which case the inorganically filled sheet could form either or both of the core or face sheets.

5. Miscellaneous Containers Made from Composite Laminate Structures

The term "blank" as used in this specification and the appended claims is intended to include a sheet ready for formation into a container. A blank is a sheet that has been cut into the appropriate shape, with any appropriate slots, holes, perforations, or scores which might facilitate its formation into the appropriate container.

The phrases "mass producible" or manufactured in a "commercial" or "economic" manner are intended in the specification and the appended claims to refer to a capability of the inorganically filled sheets incorporated into laminates described herein (and containers and other objects made therefrom) to be rapidly produced at a rate that make their manufacture economically comparable to laminates of sheets, containers, and other objects made from other materials, such as paper, cardboard, plastics, polystyrene, or metal. The present invention is directed to innovative compositions which solve the prior art problems involved in molding moldable materials in an economic or cost-effective manner. Laminates incorporating moldable materials are intended to be competitive in the marketplace with laminates currently made of other standard materials, such as paper, cardboard, plastic, polystyrene, or metals.

The terms "container" or "containers," as used in this specification and the appended claims, are intended to include any receptacle or vessel utilized for packaging, storing, shipping, serving, portioning or dispensing various types of products or objects (including both solids and liquids), whether such use is intended to be for a short-term or a long-term duration of time.

Containers within the scope of this invention include, but are not limited to, the following: cartons, boxes, corrugated boxes, sandwich containers, "clam shell" containers, frozen food boxes, milk cartons, fruit juice containers, beverage carriers, "six pack" holders, ice cream cartons, cups (including but not limited to disposable drinking cups, one piece pleated cups and two piece cold cups), french fry containers used by fast-food outlets, fast food carryout boxes, packaging, flexible packaging such as bags for snack foods, bags with an open end such as grocery bags and bags within cereal boxes, wraparound casing, support cards for products which are displayed with a cover, particularly plastic covers (including food products such as lunch meats, office products, cosmetics, hardware items, and toys); support trays (for supporting products such as cookies and candy bars), cans, yoghurt containers, convoluted or spiral wound containers (for products such as frozen juice concentrate, oatmeal, potato chips, ice cream, salt, detergent, and motor oil), mailing tubes, tubes for rolling materials (such as wrapping paper, cloth materials, paper towels and toilet paper), sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, meat wraps, sausage wrap, food containers, substantially spherical objects, bottles, jars, cases, crates, dishes, lids, straws, envelopes, cutlery, three-ring binders, book covers, folders, toys, medicine vials, ampules, animal cages, non-flammable firework shells, model rocket engine shells, model rockets, and an endless variety of other objects.

In short, the container should be capable of holding its contents, whether stationary or in movement or handling, while maintaining its structural integrity or that of the materials contained therein or thereon. This does not mean that the container is required to withstand strong or even minimal forces. In fact, it may be desirable in some cases for a particular container to be extremely fragile or perishable. The container should, however, be capable of performing the function for which it was intended. The necessary properties may always be designed into the material and structure of the container beforehand.

The container should also be capable of containing its goods and maintaining its integrity for a sufficient period of time to satisfy its intended use. It will be appreciated that, under certain circumstances, the container may seal the contents from the external environments and in other circumstances may merely hold or retain the contents.

Containment products used in conjunction with the containers are also intended to be included within the term "containers." Such products include, for example, lids; straws; interior packaging, such as partitions or liners; anchor pads, corner braces, comer protectors, clearance pads, scored sheets, and trays; funnels, wrappers, cushioning materials, and any other object used in packaging storing, shipping, portioning, serving, or dispensing an object within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded. The containers formed from laminates of the present invention have a composition such that they can be readily discarded or thrown away in conventional waste landfill areas, and the inorganically filled sheet in the laminate will degrade within such landfill as an environmentally neutral material (i.e., without causing significant extraordinary environmental hazards).

A. Carded Packaging Containers

Carded packaging containers are particularly useful for visually displaying a product. Carded packaging containers within the scope of this invention can be constructed by combining a support card cut from an inorganically filled sheet and a cover generally formed from plastic. The support card can readily accept printing indicia, and the cover permits the packaged product to be visually displayed. Carded packaging containers can be utilized to package and display many products, including food products such as lunch meats, office products, cosmetics, hardware items, and toys.

Carded packaging containers involve two varieties, blister packaging containers and skin packaging containers. Blister packaging containers within the scope of the inventive laminate utilize a preformed blister to contain a product and a support card cut from an inorganically filled sheet which supports the product within the blister. The preformed blister is usually a clear plastic allowing display of the product. The support cards utilized in blister packaging containers can have a wide variety of configurations including but not limited to: a flat support card, a two piece support card, and a hinged support card. The flat support card is to be generally utilized with a plastic blister which is sealed to the card. The two piece support card is generally utilized to sandwich the ends of a hinged plastic blister. The hinged support card is generally utilized in blister packaging by dividing the card into equal lengths by the hinge, inserting the base of a plastic blister into one of the lengths to anchor the plastic blister, and then sealing the two lengths together.

Skin packaging containers within the scope of this invention also involve the use of a support card cut from an inorganically filled sheet for supporting the product, however, the blister is not preformed. The product is utilized as a mold over which a heated plastic film or "skin" is drawn and heat sealed to the support card. This can be accomplished by heating a plastic film, draping the film over the product and the support card, and applying vacuum pressure to bring the film in contact with the support card. The heat within the film creates a heat seal.

B. Constructing Containers by Pouch Forming

It is also within the scope of this invention to form pouches utilizing an inorganically filled sheet or laminated inorganically filled sheet. Examples of pouch containers within the scope of this invention include dried soup pouches, candy wrappers, cereal bags, potato chip bags, powder packaging, tablet pouches, condiment pouches, and cake mix bags.

Utilization of continuous sheets of moldable material within the scope of this invention permits continuous pouch forming, filling, and seaming. The operations of forming, filling, and seaming can be generally accomplished by three different methods. The three different methods include, but are not limited to, horizontal, vertical, and two sheet forming, filling, and seaming of pouches. These methods can be utilized for containing a wide range of products.

Horizontal forming, filling, and seaming generally involves folding a continuous sheet in half along its length, then seaming the sheet at intervals to form a series of pouches which are then filled and seamed. The process begins by advancing a sheet horizontally across a plow assembly which folds the sheet in half. The folded sheet is seamed at intervals into pouches to permit the filling of products into the pouches. The pouches can be filled with products by gravity or other means. After the pouches have been completely seamed, the pouches can be separated from each other by cutting along the connecting side seams. The pouches can also be perforated along the connecting side seams for subsequent detachment.

Vertical forming, filling, and seaming generally involves forming a continuous sheet into a tube along its length, seaming the tube at intervals to form a series of pouches, filling the pouches and then seaming the pouch closed. The sheet is formed into a tube by advancing the sheet vertically over a plow assembly. The tube is then seamed at intervals into pouches and filled in a similar fashion utilized in vertical forming, filling and seaming.

The third method involves forming pouches by combining two sheets, at least one of the sheets being an inorganically filled sheet or laminated sheet. The inorganically filled sheet or laminated sheet can be combined with a wide variety of other sheets including, but not limited to, an inorganically filled sheet, a laminated sheet, a paper sheet, an aluminum foil sheet, cellophane sheet, a plastic sheet, and any laminates of these sheets. The two sheets can be combined vertically or horizontally, each pouch having four seamed sides.

The pouches can be seamed by any of the methods which have been disclosed including the use of adhesives, plastics, crimping, pressure seaming, hermetically sealing, and by utilizing the properties of the inorganically filled sheet itself. The pouches formed within the scope of this invention can have any structural configuration, including, but not limited to, three-sided seam pouches, four-sided fin seam pouches, bottom gusset pouches, standup pouches, pillow pouches, shaped seam pouches, wraparound pouches, multiple compartment pouches, and die-cut pouches.

C. The Use of Laminates In Corrugated Packaging and Processing Therefor

The inventive laminates which incorporate inorganically filled sheets are usable as substitution materials for one of the largest commercial areas of laminate usage, which is the area of laminated paper and paperboard. A particular intended use for the inventive laminates is in the field of the packaging industry which prominently utilizes corrugated board.

The corrugated sheet can be utilized as a single sheet or it can be combined with other sheets to form laminates as described above. The corrugated sheet can be laminated with a single flat inorganically filled sheet or a sheet formed from other materials, thus resulting in a "single-face" corrugated sheet. Sandwiching a corrugated sheet between two flat sheets results in a "double-face" sheet. Multiple wall corrugated sheets can be created by alternating flat and corrugated layers. For instance, a double-wall corrugated sheet can be formed which has layers in the following order: flat, corrugated, flat, corrugated, and flat. Single-face, double-face, and multiple wall corrugated sheets are characterized by relatively low density and relative high stiffness and compressive strength. They can be used wherever containers and packaging materials require such properties.

The strength and flexibility of a single corrugated sheet can be altered by varying the number of corrugations or flutes per linear foot. The flutes per linear foot can be increased to create a more flexible sheet or the flutes can be decreased to obtain a strong sheet with a high degree of cushioning ability.

In addition, like scoring, score cutting, and perforating, individual flutes of the corrugated sheets create locations where the sheet might more naturally bend or fold. However, the sheet is actually much stiffer and stronger in the direction perpendicular to the row of the flutes. Therefore, a container or other packaging material should be constructed so that the corrugated sheet will afford maximum flexibility where needed and maximum stiffness where needed, such as where the container will be stacked.

Laminates composed of multiple wall corrugated sheets can also be created with two or more corrugated sheets having different amounts of flutes per linear foot. For instance, a double wall corrugated sheet can have layers in the following order: a flat sheet, a corrugated sheet with 33 flutes per linear foot, a flat sheet, a corrugated sheet with 90 flutes per linear foot, and a flat sheet.

(1) Coatings and Coating Processes

Coatings can also be applied as part of the corrugating process. Coatings, particularly waxes or polyethylene, can be applied with hot roll coaters on the corrugator. Coatings can also be applied by curtain coating the corrugated blank before it is constructed into a container. Other useful coating processes involving corrugated sheets include dipping completed containers into coatings, such as waxes, or cascading such coatings through and around the flutes of the corrugated container.

Coatings may provide protection against moisture, base, acid, or organic solvents. They may also provide a smoother, glossier, or scuff-resistant surface. They may even reinforce the inorganically filled sheet, particularly at a bend or fold line. Some of the coatings can also be utilized as laminating materials or as adhesives.

Corrugated board is made from two basic components, both of which can be made from sheets of moldable material or laminates incorporating same. Henceforth, references to linerboard or liners, and medium, shall be intended to mean such components made from inorganically filled sheets.

Linerboard is flat while the medium is initially flat until it is fluted. Linerboard is used for the facings and medium is used for the flutings. Series of alternating liner and fluted medium are used to make up the corrugated packaging board.

The liner and fluted medium are laminated together in a corrugator machine. Thus, the corrugator is technically a sheet laminator. The corrugator layers a preprinted liner onto a pre-layered combination structure consisting of a liner and a fluted medium, also called singleface. The corrugator may also be used to glue several layers of liner or medium together, even while corrugating.

A paster machine may also be used in the assembly process, which is a machine that does only laminating without creating flutes. The process is the same in each assembly: glue is applied to one member, the sheets are held under compression, and the glue is set or dried. There may be either a take-up stand or a sheeting knife in the case that a paster machine is used. Of course, fluted medium with two or more liners cannot be rewound, only cut into sheets.

It may be desirable to corrugate an inorganically filled sheet in a manner similar to corrugated cardboard. This may be accomplished by passing a semi-moist sheet between a pair of corrugated rollers. The moisture content of the sheet should be controlled so that the corrugation process does not result in a sheet with a damaged moldable matrix. If the sheet is too dry, the corrugation process can damage the moldable matrix, and in some cases may even result in the tearing or splitting of the sheet. Conversely, if the sheet is too moist, the corrugated sheet may lack the green strength necessary to maintain the corrugated shape.

Coatings can be applied at the corrugator in several different ways. Corrugating medium can be threaded through a pan having a roller that keeps the sheet under the surface of the liquid. The medium can be saturated with hot wax in this manner. Additionally, coating machines can be placed in line with either liner, with the sheet running into a pan, picking up liquid and then having the excess wiped off with a plastic flexible blade. After combining and before slitting, the sheet emerging from the belts can be coated on the top or bottom liners. The top may be coated by flooding the sheet and wiping off the excess with a blade. The bottom may be coated by using rollers or sponges set in a pan of the liquid and rolling or rubbing against the passing sheet. There are also machines that spray the liquid onto the bottom liner.

The object of the coating process is usually to achieve a uniform film with minimum defects on the surface of the sheet. Coatings can be applied during the sheet forming process, the lamination process, the container forming process, or after the container is formed. The selection of a particular coating process depends on a number of substrate (i.e., sheet) variables, as well as coating formulation variables. The substrate variables include the strength, wetability, porosity, density, smoothness, and uniformity of the sheet. The coating formulation variables include total solids content, solvent base (including water solubility and volatility), surface tension, and rheology.

The coatings may be applied to the sheets and laminates thereof using any coating means known in the art of manufacturing paper, paperboard, plastic, polystyrene, sheet metal, or other packaging materials. Coating processes known in the art that may be used to coat the inorganically filled sheets of the present invention include blade, puddle, air-knife, printing, Dahlgren, gravure, and powder coating. Coatings may also be applied by spraying the sheet, container, or other packaging material with any of the coating materials listed below or by dipping the sheet, container, or other object into a vat containing an appropriate coating material. Finally, coatings may be coextruded along with the sheet in order to integrate the coating process with the extrusion process.

Appropriate coatings include calcium carbonate, sodium silicate, melamine, polyvinyl chloride, polyvinyl alcohol, polyvinyl acetate, polyacrylates, polyamides, hydroxypropyl-methylcellulose, polyethylene glycol, acrylics, polyurethane, polyethylene, polylactic acid, Biopol® (a polyhydroxybutyrate-hydroxyvalerate copolymer), waxes (such as beeswax or petroleum based wax), elastomers, kaolin clay, and synthetic polymers including biodegradable polymers. Biopol® is manufactured by ICI in the United Kingdom.

In some cases, it may be preferable for the coating to be elastomeric, deformable, or waterproof. Some coatings may also be used to strengthen places where the inorganically filled sheets are more severely bent, such as where the sheet has been scored. In such cases, a pliable, possibly elastomeric, coating may be preferred. Besides these coatings, any appropriate coating material would work depending on the application involved.

If the sheets and laminates thereof are used to manufacture containers or other products intended to come into contact with foodstuffs, the coating material will preferably comprise government-approved coating. An example of a particularly useful coating is sodium silicate, which is acid resistant. Resistance to acidity is important, for example, where the container is exposed to foods or drinks having a high acid content, such as soft drinks or juices. Where it is desirable to protect the container from basic substances, the containers can be coated with an appropriate polymer or wax, such as those used to coat paper containers.

Polymeric coatings are useful in forming generally thin layers having low density such as polyethylene. Low density polyethylene is especially useful in creating containers which are liquid-tight and even pressure-tight to a certain extent. Polymeric coatings can also be utilized as an adhesive when heat sealed. Waxes provide a barrier to moisture, oxygen, and some organic liquids, such as grease or oils.

They also allow a container to be heat sealed. Waxes which are particularly useful include paraffin waxes, microcrystalline waxes and synthetic waxes.

Corrugated board formed from laminates incorporating inorganically filled sheets adequately meets the demands for special performance and physical requirements of a variety of market segments through imparting special characteristics to improve the resultant corrugated board, in addition to the previously discussed environmental benefits. Such corrugated board meets the more stringent requirements through creative laminates and coatings. These requirements include moisture and grease resistance, insulation, decoration, abrasion resistance, release, high friction, flame/fire retardation, adhesion, rust resistance, gloss, added strength, and anti-static properties. Each of these requirements is discussed below.

a. Moisture Resistance

Resistance to water and moisture in the atmosphere is one of the demands made most frequently of corrugated board. It can be attained in several ways and to various degrees, such as waxing. Saturating with hot wax done on a cascader apparatus is the most effective but also the most expensive. Saturation with hot wax on a corrugator machine is almost as effective. When done with cold wax in a water-based form, its effectiveness is more limited.

Hot wax cannot be applied to the liners at the wet end of the corrugator because the wax may migrate to the belts, with a resulting loss in permeability. The medium may be waxed without this happening.

Curtain coating and roller coating protect the outside of the liners effectively, but the flutes are not protected. Any water entering through the edges of the board will cause the flutes to lose their stiffness, with a consequent reduction in flat crush and stacking strength. Water-resistant or waterproof adhesive would be needed if water is expected to enter the flutes.

With curtain coating the barrier may not be complete. Because the sheet runs through a waterfall, any raised part of the sheet, be it due to warp or die cutting, may result in an unwaxed space behind it. A depression caused by scoring and running across the direction of feed may not be filled completely by the wax. A temporary break in the curtain, which may be caused by dirt in the wax or a gust of wind in the manufacturing environment, will cause a dry ovoid-shaped area, often called a "boat," on the sheet.

Liner and medium can be made waterproof or water resistant as a fluid or liquid barrier during the formation of the inorganically filled sheets. This is done by adding plastics such as phenolics to the moldable mixture, or by coating the inorganically filled sheets with same. Waterproof adhesive may be used with these members.

Products that may be packed in the resultant waterproof or water-resistant boxes include produce, where wire bound and other wooden cases may be supplanted. By so doing, the produce can be packed in the field, rain or shine, and water may be used to cool the plants to retard spoilage. An added processing step is to provide boxes with holes to pack lettuce. The filled boxes may then be run through ice water, then packed in refrigerator cars or trailers with shaved ice and sent cross country. Upon their arrival at their destination, the cases hold together well enough to be handled individually.

b. Grease Resistance

It may be desirable that laminates incorporating inorganically filled sheets be resistant and non-absorbent to both oil and grease. Such would be the case when the staining that results from contact is not acceptable and the liner must be shielded from contact. In such circumstance, the wax formulations that do not stain the lamination material, yet repel grease, can be used. Wax formulations of this nature can be selected which also repel water, such as are widely used in the meat packing industry.

Glassine paper is laminated to liners to form a grease-proof barrier, which can be used for cartons in which oily metal parts are packed. Glassine is a very dense paper whose fibers have been calendered under so much pressure that oil cannot penetrate them so as to form an oil resistant layer. Cookies and other baked goods made with shortening are often packaged in glassine singleface pads and trays.

c. Insulation

Aluminum foil has insulating qualities and can be laminated to liners for that purpose. When combined with a proper adhesive that seals off any pinholes, the barrier formed also prevents air and moisture transmission so as to form barriers to flavors, gasses, odors, carbon dioxide, and oxygen. This is important for a number of products.

Foam plastic can be laminated to two liners to form a structural board having thickness like corrugated board but having foam in place of the flutes. This board can be processed on corrugated converting equipment. The foam insulates and the resultant board is quite firm for printing and stacking strength.

d. Decoration

Printed plastic films such as Mylar® and vinyl can be laminated to liners after combining so as to provide a surface superior in some ways to a printed liner. The plastic film adds resistance to abrasion and moisture but also adds significantly to the cost. However, products that use such expensive laminates may be permanent or semi-permanent displays or furniture, so that the added expense is justified.

e. Abrasion Resistance

Corrugated applications requiring abrasion resistance, such as packing wood furniture and enameled metal, can be satisfied by applying a wax coating that reduces the roughness of the inside liner. This is readily applied by a sheet coater on the dry end of the corrugator.

f. Release

In packaging some products, the box is used as a mold. For example, asphalt for roofing is poured hot into a carton and cooled for shipment. At the work site, the box is torn off the asphalt, which is then melted for reuse. The inside liner must release cleanly from the contents to avoid having the construction workers spend time picking off pieces of stuck liner. Another example is fresh wet meat which is packed in cartons and frozen. Water penetration before freezing might cause the meat to stick to the liner. A release coat of wax prevents this from happening.

g. High Friction

Rough as a draft liner may be, it may not be rough enough to avoid having a pile of filled boxes shake themselves loose from a load during shipment. To keep the stacks more stable, the flaps of the cartons are coated with colloidal silica. When two such surfaces are in contact, as they would be when the boxes are stacked, the coefficient of friction is very high.

The application is a simple one, being performed at the dry end of the corrugator. The material is applied to the underside of the sheet, and is required only on the flaps. The cost of the material is small. The silica is transparent and does not affect subsequent application of ink. In another means of reducing the slippage of stacked boxes, the outside liner in the flap locations can be mechanically dimpled at the wet end of the corrugator.

h. Flame/Fire Retardation

One of the more dramatic uses of coatings is the development of a fire retardant treatment that also happens to be water repellent. The application can be made by immersion in a tank, followed by drainage and drying. Also available is a flame retarding chemical that is applied by either coating or saturating. When flame is applied to a treated liner, the board chars, rather than burns, and the surface thus formed acts as an insulator against the flame.

i. Adhesion

Small objects offered for sale at retail are often packed in plastic bubbles attached to corrugated pads. The pads add size to the package to discourage pilfering and provide a surface for printing. These packages are often hung on hooks for display. Getting the plastic to adhere to the board had been a problem, but a coating that primes the pad liner can be applied so as to solve this problem. The primer coating may be applied on the corrugator for large orders or to sheets using a roller coater for smaller runs.

j. Rust Resistance

Unprotected metals are subject to rust and tarnishing when exposed to moisture and air. There are coatings that vaporize inside the package and prevent corrosion from occurring. Most often the products are wrapped in the coated paper, but volatile corrosion inhibitors (VCI) can be run on a corrugator machine and on combined board at a subsequent operation. The inside liner must be heavily coated because the heat of corrugating causes some of the chemical to vaporize. Loss of the coating through heat is not a problem if the sheets are coated after corrugating.

k. Gloss

A high gloss can be applied to a printed surface in several ways. Oil-based inks can contain wax for this purpose. Ultraviolet (UV) cured inks can also have such material in its formulation. There are also varnishes, both water-based acrylics and UV cured, that are applied as an overall coating to provide gloss. Often, the same material is hard enough to provide scuff resistance as well.

l. Added Strength

Liners and medium can be laminated to produce extra strong members. Two 26-pound medium webs can be laminated together to form 52-pound flutes, which adds greatly to stacking strength. 600-test single wall board can be made by laminating an extra 90-pound liner to one of the facings of 350-test single wall. The added liner is run over the lower glue station and the singleface sheet over the upper station.

The inner soles of men's shoes are frequently made of fiber and not leather. The material for this can be made on a corrugator or paster. Fourdrinier and cylinder liners may be mixed in these combinations, depending upon the quality desired.

The use of inorganically filled sheets, corrugated and glued to inorganically filled sheet faces to form container board and boxes with sandwich material constructed of inorganically filled sheets formed into a honeycomb core adds strength to the resultant structure. This honeycomb core is described below.

When the inside of a container is lined with a layer by lamination, the internal layer may serve a particular benefit. Such is the case with a bag-in-a-box structure. Rather than coat the inside of a container to hold a product, the container can be laminated with a glued-in plastic bag. Liquids and products that might sift through small openings in the corrugated box can be packaged using this method. A plastic bag is spot-glued to the inside of a corrugated box in such a position that when the box is opened the bag is also open and ready to be filled.

The location of the bag is critical. It must be deep enough so that when it is filled the box and not the bag is supporting the weight of the contents. The glue must be applied only to those locations where the bag and the box will not move relative to each other during filling and handling. Otherwise, the bag may tear at the glue spot.

Bags come in two styles, flat bottom, and gusseted. Either one will function adequately if properly designed. They must be large enough to fill the box so as not to lose the space within the box. Those for liquids can be provided with plastic closure and dispensing attachments, while dry contents are provided with the top of the bag tied to seal it. Spigots can be retracted during shipment, and can be exposed by tearing out a die-cut opening in the carton. Wine and milk can be the products dispensed from a bag-in-a-box at the consumer level.

Adhesives in bulk bins can be used with construction that is basically similar but is correspondingly stronger as the weight is increased. The economics justify a disposable bag-in-a-box having reinforced corrugated board around it. Steel strapping can be used to keep the sides from bulging and to hold the unit on a wooden pallet.

m. Anti-Static

As electronic components are manufactured smaller and smaller, the electrical resistance of their circuitry keeps decreasing. The smallest spark of static electricity is sufficient to destroy them. When such components are packaged, the workplace and the person doing the packing must be grounded to avoid sparking.

In order to avoid having the corrugated box carry a static charge, the outside liner is coated with a conductive ink. Carbon is a conductor and is also the pigment of black ink, so liners are coated on the corrugator with such a coating.

6. Printing and Related Processes

It may be desirable to apply print or other indicia on the surface of the inorganically filled sheet and laminates thereof, such as trademarks, product information, container specifications, or logos. This can be accomplished using printing means known in the art of printing on paper or cardboard products. In addition, the sheets, laminates of the sheets, or containers made from such laminates may be embossed or provided with a watermark. Because the inorganically filled sheets may have a relatively high porosity like paper or card-board, the applied ink will tend to dry rapidly. In addition, decals, labels or other indicia can be attached or adhered to the inorganically filled sheet using methods known in the art.

Methods for printing on the inorganically filled sheets include, but are not limited to, any conventional method of printing including planographic, relief, intaglio, porous, and impactless printing. Printed indicia may be applied to a continuous sheet, individual sheets, laminated sheets, blanks, or completed containers depending on the printing process involved and the shape of the container.

Planographic printing, or offset lithography, relies on the insolubility of ink and water to print in a desired area. Plates for lithography accept ink and repel water in the image areas and attracts water and repels ink in the non-image areas. Sheet-fed offset lithography is very useful as it can accommodate wide variations in the dimensions of the sheet. Additionally, the printing plates can easily be remade to accommodate different graphic designs. Continuous feed offset lithography is similarly useful, particularly when different graphic designs are utilized with identical container designs.

Relief printing or letterpress printing involves raising the areas to be printed above the areas which will not be printed. Ink rollers touch only the top surface of the raised areas. Ink is transferred to an image carrier and applied to the sheet as the sheet passes between the image carrier and an impression cylinder. Individually cut sheets and laminates thereof are printed on individually fed presses and continuous sheets are printed on continuously fed presses. The presses which can be utilized in this process include platen, flatbed (cylinder), and rotary presses. Another useful form of relief printing is flexography, which involves the use of flexible plates (including rubber stamps) and fast drying inks.

Intaglio printing, often called gravure or rotogravure printing, is another useful printing method. Intaglio printing involves printing directly from a rotating engraved cylinder. The engraved cylinder rotates in a source of ink and as the cylinder rotates a doctor blade removes excess ink from areas which are not intended to transmit an image. Ink is transferred from the engraved cylinder as a sheet passes between the engraved cylinder and an impression cylinder. The cylinder is more expensive than the plates utilized with sheetfed offset lithography; however, the engraved cylinder is more durable and can be used to print more sheets than the plates used in planographic printing.

Porous printing, often called screen printing (or silk screening), is useful for printing on irregular surfaces or surfaces that arc not flat. Porous printing involves forcing a screen-mesh-supported stencil of silk, synthetic fabric, or stainless steel onto the sheet.

Impactless printing prints indicia without contacting the sheet or container through jet spraying electrically charged drops of ink. This process is inexpensive and can be utilized at high speeds. Of course, ordinary pens and pencils may be employed to write messages or other information on the sheets, laminates, or containers made therefrom.

7. Scoring and Perforation Processes

In some cases it may be desirable to alternatively score, score cut, or perforate the sheet or laminates thereof in order to define a line upon which the sheet may fold or bend. Score cuts can be made by using a knife blade cutter mounted on a score press, or it can be accomplished using a continuous die cut roller. Alternatively, a score (not a score cut) may be pressed into the sheet by means of a rounded scoring die. The scoring die can be used alone or in conjunction with a score counter. This scoring die configuration forces the sheet to deform into the groove of the score counter. Finally, a perforation may be made by means of a perforation cutter.

The purpose of the score, score cut, or perforation is to create a location on the inorganically filled sheet, or laminate thereof, where it can be bent or folded. This creates a "hinge" within the sheet with far greater bendability and resilience than possible with an unscored or unperforated inorganically filled sheet. In some cases multiple score cuts or perforations may be desirable.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the moldable matrix to fracture upon being folded or bent. Third, the score cut or perforation allows for a controlled crack formation within the moldable matrix in the event that fracture of the moldable matrix occurs.

It may sometimes be preferable to concentrate more fibers at the place in which the score cut or perforation will be made. This can be accomplished by co-extruding a second layer of moldable material containing a higher fiber content at predetermined timed intervals to correspond with the location of the score cut or perforation. In addition, fibers can be placed on top of, or injected within, the sheet during the extrusion or calendaring processes in order to achieve a higher fiber concentration at the desired location. When scoring corrugated sheets it is generally preferable to score the corrugated sheet in the direction perpendicular to the direction of the flutes.

The inorganically filled sheet will be preferably in a substantially dry or semi-hardened state during the scoring or perforation process. This is desirable to prevent the score or perforation from closing up through the migration of moist material into the score cut. Since scoring generally (and perforation always) involves cutting through a portion of the moldable matrix, the sheet can even be totally dry without the scoring or perforation process harming the sheet. However, in cases where a score is pressed rather than cut into the sheet surface, the sheet should be moist enough to prevent fracture due to the dislocation of the moldable matrix.

The depth of the score cut will generally depend on the type of score, the thickness of the inorganically filled sheet, and the degree of bending along the score line. The scoring mechanism should be adjusted to provide for a score of the desired depth. Of course, the die cutter should not be so large as to actually cut through the sheet or render it too thin to withstand the anticipated forces (unless an easily tearable score is desired). Preferably, the score cut should be just deep enough to adequately serve its purpose. A combination of score cuts on alternative sides of the sheet may be preferred in some cases to increase the range of bending motion.

In most cases where a thinner sheet (<1 mm) is being score cut, the cut will have a depth relative to the thickness of the sheet that is within the range from between about 10% to about 50%, more preferably within the range from between about 20% to about 35%. In the case of thicker sheets, the score cut will usually be deeper due to the decrease in bendability of the thicker sheet.

It should be understood that the inorganically filled sheets of the present invention will bend away from a score cut or perforation, while bending toward a score that is pressed into the surface of the sheet. That is, the sides of the sheet defined by a score cut or perforation will close together in the side opposite the score cut or perforation. Conversely, like paper or cardboard products, the sides of the inorganically filled sheet defined by a score pressed into the sheet surface will close together on the side of the score.

8. Varieties of Composite Laminate Structures Incorporating Inorganically Filled Sheets A. Materials Variations In the Inorganically Filled Sheet (1) Green Sheets and Dry Sheets Prior to incorporating an inorganically filled sheet into a composite laminate structure, the inorganically filled sheet can be fully dried or it can be left in a damp, wet or green state. The advantage of the green state is the inherent adhesive bond. Given the two states of the inorganically filled sheets, several ply variations in composite laminate structures are contemplated as being within the scope of the invention and are discussed below.

Using the inherent property of the green state, a green or wet inorganically filled sheet can be laminated to another green or wet inorganically filled sheet without the aid of an adhesive ply or coating. A dry inorganically filled sheet can have an adhesive coating applied thereto prior to lamination to another dry inorganically filled sheet.

Another composite laminate structure is composed of a green or wet inorganically filled sheet laminated to a dry inorganically filled sheet. Again, the adhesive bond property of the green state provides the adherence to the dry sheet due to a reaction of the wet materials in the green sheet with materials in the dry sheet. Alternatively, this laminate structure can also be accomplished using additional processes such as subjecting the sheets to a combination of pressure and temperature variations to achieve the desirable resultant properties.

A further variation on the above lamination is the laminating of a green or wet inoinorganically filled sheet with another green or wet inorganically filled sheet, where later additional processes are also included so as to subject the sheets to a combination of pressure and temperature variations to achieve desirable resultant properties.

In the lamination of a dry inorganically filled sheet to another dry inorganically filled sheet, moisturizer assist equipment is desirable to be included in the lamination processing. Moisture assist equipment is sequenced prior to the layering together of the plies.

The moisture can be added by steam under pressure, by a water dam at the nip between the laminating rolls at which the dry sheets meet, by dry sheet routing to submergence in an aqueous medium prior to the lamination rolls, or by other means known to those of skill in the converting technologies. Similarly, a dry sheet can be moisturized prior to lamination with a green sheet.

(2) Nonagueous Variations in the Inorganically Filled Sheet

By altering the fiber, aggregates, organic binders, and dispersants, as well as the moldable mixture and aqueous medium used, the properties of the inorganically filled sheet will also be altered. Thus, inorganically filled sheets of different compositions can be laminated together in the pursuit of desired laminate properties. Such properties may be a composite laminate structure having a porous sheet laminated to a fluid impervious sheet, or a stiff sheet laminated to a flexible sheet.

a. Coatings Applied to the Inorganically Filled Sheets Prior to Lamination

A coating may be desired on a surface of an inorganically filled sheet to be laminated. The coating can be on a surface of the resultant composite laminate structure or in can be between the laminated plies. A discussion of coatings applicable here, and particularly to the use of inorganically filled sheets in corrugated packing, is included under the section titled "Coatings and Coating Processes."

(i) Adhesive Coatings on Inorganically Filled Sheets

When a dry inorganically filled sheet is laminated to another dry inorganically filled sheet, no bonds are formed stemming from the moldable mixture. Thus, a coating of adhesive is needed to set the laminate bond. As inorganically filled sheets can be designed to have surface properties similar to paper and cardboard, similar adhesives known to those of skill in the art of the converting technologies can be employed to set the bond. Conversely, adhesives conventionally used for paper-like materials are generally not as effective in bond and adherence when applied to green sheets due to the moisture in green sheets.

B. Materials Variations Other Than In the Inorganically Filled Sheets

A composite laminate structure is designed to the needs of each application. Therefore, the design may require the choice of a material ply which has properties other than those conventionally associated with paper and paper-like materials. As such, the design choice for the lamination may include not only one or more layers of inorganically filled sheets, but also one or more layers of dissimilar materials. By way of example, and not by way of limitation, dissimilar plies which may be incorporated into the composite laminate structure include metallic foils, textile fabrics, paper, paperboard, foam, sheets that form bonding with increased temperatures, inorganically filled sheets, plastics (e.g., polymers), and air core or voids between plies.

To form a bond between two dry inorganically filled sheets, a plastic sheet or other thermally setting sheet may be used. Upon application of sufficient heat to the thermally settable sheet, either immediately prior to or after layering of such a laminate structure, the bond is formed. Alternatively, a thermal coating may also be set by application thereto of increased temperature.

A related layering variation of such composite laminate structures is the production of two thermally settable sheets having layered therebetween a green or a dry inorganically filled sheet to which composite laminate structure a heat source is applied. Also contemplated is the composite laminate structure having two thermally settable sheets with an interposed green or dry inorganically filled sheet and including a coating layer of hot or cold setting adhesive on one or more of the layered sheets. In addition to or in substitution for the layered coating of adhesives, the coating may be one of those discussed above under the section titled "Coatings and Coating Processes."

The following layers are contemplated as being laminated to inorganically filled sheets: polyolefin, ethylvinyl alcohol, polyester, copolymerized polyester, polyamide, aluminum foil, caulking polymer layers, polyethylene teraphthalate, polyurethate elastomers, polyethylene polymer, polyvinylchloride film, and polybutylene teraphthale.

C. Layering Variations (1) Air Cores

By including within a composite laminate structure an air core, the composite structure can be used in bags and containers that are useful as packaging materials. The air core, when inflated, serves as a protection for contents of the container against blows and impacts so that the contents of the container will be undamaged.

For instance, a composite laminate structure of this kind can be made into a cargo airbag, where an inorganically filled sheet, having the consistency of paperboard, is used as an outer layer. The inner layer would be the air core and a corresponding inorganically filled sheet would be the innermost layer on the opposite side of the air core from the initial inorganically filled sheet. The inorganically filled sheets are overlapping and glued together so as to form an airtight bladder.

Alternatively, layers of plastic can be used between the inorganically filled sheets to form an airtight bladder. When so constructed, the resultant container made from the composite laminate structure can be used as packing material within a container or as the container itself for the purposes described. Also, to be layered within the composite laminate structure are various coatings which can serve as bonding layers, property imparters, or a combination of these to the resultant composite laminate structure.

As mentioned above, a void within the composite laminate structure may also be beneficial depending on the application. Thus, the beneficial properties described above of air cores between inorganically filled sheets can be complimented and enhanced through engineering analysis of composite laminate structure resulting in a desired design for a given application.

Air voids in a composite laminate structure can also include a structure in the void to maintain two layers in the composite laminate in a spaced apart condition. This structure may be provided by a layer of material in a cellular shape, such as a honeycomb shape. Within such cellular structure, a variety of materials can be retained. For instance, the structured layer can contain fluids such as liquids and high pressure gases. Alternatively, solids or particulate matter can also be maintained within the cellular structure. Thus, the composite laminate can be used to store various material within the voids created within the composite laminate and supported by structured layers within the composite laminate.

Composite laminate structures can be made where one layer of the laminated structure comprises a thermoplastic resin inner wall layer with a plurality of minute holes and an inorganically filled sheet outer wall layer which is permeable to gases but is impervious to microorganisms. The thermoplastic layer, prior to being heat bonded to the laminate structure, is irradiated with ionizing radiation rays to introduce thereunto a crosslinked structure. A composite laminate structure of this type can be used to seal packages of medical supply commodities. When medical supplies are stored in a composite laminate structure of this variety, the commodity can be sterilized using gas or steam, is readily unsealable when placed in a sealed packet, and the sealed package can be used at any time and place. When a container of this structure has been formed, the outer wall layer can be made of inorganically filled sheets which are permeable to gases but impervious to microorganisms. The inorganically filled sheets are paper-like in construction. The minute number of holes in the thermoplastic synthetic resin can be formed by perforations mechanically inserted via heated needles or needles in general.

(2) Multiple Layers of Various Materials

Each layer in a composite laminate structure incorporating inorganically filled sheets contributes its beneficial properties to the resultant structure. By increasing the number of layers of a particular type of material, additional properties can be realized from the multiplication of the specific type of material within the structure. As the number of layers of a particular material increase, the resultant structure takes on similar and increased properties to that of the particular material due to the presence and predominance of the particular material. Conversely, a layer or layers in the composite laminate structure which are relatively few compared to the other number of sheets or layers, will have a lesser effect of its own properties upon the resultant composite laminate structure.

It is the goal of composite laminate structure engineering to provide an arrangement of the appropriate number and sequencing of layers of different materials to result in a maximization of the beneficial properties desired to be achieved in the resultant material, while minimizing the constraints needed to be overcome in order to achieve an engineering objective. Thus, engineering of composite laminates involves considerations of barrier and barrier characteristic properties, as well as the situational placement of each type of sheet within the overall laminate structure.

Placement of each sheet of different material within the composite structure is important to distribution of the beneficial properties within that structure. As each composite laminate structure has exposed outside surfaces, the resultant properties of the outside surface are a function of the materials of the most immediate layers closest to the outside surface. Thus, the layers closest to an outside surface of the composite laminate structure may be designed for more barrier properties than for giving the overall composite structure strength and rigidity, which may be designed by providing bonded intermediate sheets within the composite laminate structure. Conversely, durability and stiffness may be desired to be had on the outermost sheets of the composite laminate structure, whereas flexibility and weakness may be desirable in the innermost intermediate position between the two sides of the composite laminate structure.

As can be demonstrated, proper sequencing of multiple layers of various material sheets within a composite laminate structure will result in the ideal barrier properties, strength and flexibility properties, and other beneficial properties which are desired to be had in the resultant composite laminate structure.

(3) Coatings Interposed between Various Layers of Various Materials

Given the above discussion regarding variations of layers of various materials on a composite laminate structure, a composite laminate structure incorporating inorganically filled sheets can be further engineered by application of coatings interposed between various layers of various materials in a composite laminate structure. Coatings can be applied over the entire surface of a layer within a lamination or only partially applied. Barrier properties as well as adhesive properties may also be attributes of coating layers. Some sheets in the laminate, inorganically filled sheets or otherwise, may have a coating layer interposed therebetween, while other sheets have no coating therebetween. Although the possible combinations are quite numerous, composite engineering of laminate structures has as its tools many variations of sheets, coatings, types of coatings, and types of sheets to arrive at the end result of the desired composite laminate structure for a given application.

(4) No Coatings Interposed between Various Layers and Having "Free-floating" Layers It may be desirable in a composite laminate structure to have free floating layers which are not bonded to any other layer. The result of such free floating layers is that the lamination will be more flexible due to the layers' slippage against the other along the interfacing surfaces thereof. Laminates of this sort are less prone to fracture when a perpendicular force is applied to a surface thereof. Further, rigid material sheets can be combined with flexible material sheets to obtain beneficial properties from each, while giving the overall composite structure a bendability and flex to the laminate. Depending on the friction coefficients between the layers, and the absence of coatings to effect such friction coefficients, flexibility can be engineered into the composite laminate structure. Thus, by weak bonds interposed between various layers, the overall composite takes on a flexibility characteristic.

Alternatively, if an inorganically filled sheet in the composite laminate structure, or any other sheet, is a rigid material and a strong bond exists thereto with the other sheets in the laminate structure, the property of the rigid sheets will be taken on and the property of flexibility will decrease. Ultimately, the laminate structure will break when a perpendicular force is applied thereto because such rigid sheets having a strong bond therebetween. In the alternative, where rigid and non-rigid sheets in a laminate structure have weak bonds therebetween, a perpendicular force applied to the laminate structure will tend to cause intersheet slippage and avoidance of breakage.

(5) Noncontinuous Sheets Laminated with Continuous Sheets: e.g., Window Envelopes.

In a composite laminate structure, layers may be noncontinuous therein. An inorganically filled sheet may be laminated with a plastic transparent sheet where there is an area in the lamination where the transparent plastic sheet is continuous and the inorganically filled sheet is non-continuous. An example of such a structure is a window envelope where the envelope itself is made from inorganically filled sheet material and the window in the envelope is made of transparent plastic or other transparent polymeric material. By such structure, printed material can be seen through the transparent polymeric sheet, while the inorganically filled sheet provides the strength and rigidity necessary to carry the printed material in an envelope structure. The plastic polymeric transparent material may be bonded to the inorganically filled sheet by an adhesive coating, by thermosetting means, or by other bonding techniques described herein, or known to those of skill in the converting arts.

Another example of non-continuous sheets within a laminate structure is where an air core or void is found within a composite laminate structure. The void or air core area represents an area in which one or more sheets within the structure are non-continuous. The air core or void area can be used to store or otherwise package items within the composite laminate structure. Alternatively, the air core or void may be empty so as to serve as packing or force absorbing sections of the composite laminate structure. The aspect of air core and void composite laminate structures is discussed further in a previous section.

D. Layering Variations In the Composite Laminate Structure

By varying the number and types of layers in the composite laminate structure, a great variety of properties can be achieved, which variety is as great as the type and material and number of sheets that are a part thereof. Discussed below are layers that are porous or impervious, orientation of grain variations within a laminate structure, cellular structures of sheets within a laminate structure and flexible sheets combined with inflexible sheets. While this collection of layer properties is incomplete, it is representative of the great diversity that can be accomplished through composite laminate engineering. In each case, the incorporation of inorganically filled sheets into the composite laminate structure provides for added depth of beneficial properties, which benefits are as diverse as the composite composition and manufacturing processes which are capable of manufacturing such inorganically filled sheets. The diversity of constructing the inorganically filled sheets is discussed elsewhere within the present disclosure or is otherwise incorporated by reference.

(1) Porous\Impervious Layers

Beneficial properties of a composite laminate structure can be gained by incorporation therein of porous sheets as well as impervious sheets. A porous sheet, when serving as the outermost layer on a laminate structure, will allow fluids and gases to pass through the porous outer sheet to the internal sheets of the composite laminate structure. When porous sheets are a portion of the internal layers of a composite laminate structure, gases and liquid fluids can travel from intermediate positions within a composite laminate structure to the outermost sheets thereof. The porosity of the various sheets in a composite laminate structure will vary depending on the size of the holes or voids in each sheet. For instance, the porosity may extend to the permitting of gases to pass there through, while not permitting liquids. Alternatively, both gases and liquids may pass through larger voids in the sheet while disallowing passage to solids.

Impervious sheets are included within a composite laminate structure for the purpose of forming a barrier to prevent the passage of fluids such as liquids and gaseous materials. Impervious layers within a composite laminate structure can serve the purpose of compartmentalizing fluid flow in particular areas within the composite laminate structure. For instance, a gas material may be held between two impervious layers where porous layers are found between the two impervious layers. Such a structure will permit gas to flow freely throughout the porous sheets while being bounded and prohibited from going beyond the impervious sheets.

When a porous sheet is on the exterior most layers of a composite laminate structure, the designer of the laminate structure may desire to absorb external liquids within the composite laminate structure for later application to another surface. An example of such an application is in the stencil sheet printing field. A porous base is required in such an application so that printing ink can pass through during printing. A porous inorganically filled sheet is suitable for such application.

(2) Grain Orientation and Fiber Orientation; e.g., Cross-grains Layering

Inorganically filled sheets can be manufactured in a variety of ways which impact the fiber orientation in the inorganically filled sheets. Extrusion processes, generally characterized by a high degree of the force of inorganically filled sheet material through a dye, rollers, or extruder apparatus, tend to orient the fibers in the resultant sheet. Typical orientation is in the machine direction when extruding rollers are not spreading the sheet in a cross machine direction. When extruding rollers both spread and flatten the sheet material, fiber direction will be in both machine and cross machine directions.

Layers which have a machine direction fiber orientation can be alternated with the layers having a cross machine direction fiber orientation. The sum total of the fiber orientations in each layer amount to a "grain" of the layer. By alternating the grain direction of layers within a composite laminate structure, strength characteristics can be added to the resultant structure. An analogy can be made to plywood and the variations of grain of the individual wood layers to result in the inherent strength of plywood material.

Inorganically filled sheets having a particular grain direction can be alternated and combined with non-inorganically filled sheets with alternative grain directions or directional fiber orientations. Choice of grain orientation is a factor to be considered in composite laminate structure engineering to arrive at desired strength properties in the resultant composite laminate structure. Alternating grain inorganically filled sheets can also be laminated together.

(3) Cellular Structures

Inorganically filled sheets which have been impregnated with thermal setting phenolic resin can be formed into a panel of rigid resin-treated honeycomb shapes. A top and bottom layer of inorganically filled sheet, or other material, can be layered over the honeycomb core so as to form flat articles such as doors and panels. Additionally, such composite laminate structures may be formed into curved articles such as poles and boat hulls, honeycomb shapes can add great strength to composite laminate structures, while minimizing the weight to strength ratio of the resultant composite laminate structure.

(4) Flexible Sheet Combined with an Inflexible Sheet

A composite laminate structure contemplated within the scope of the present invention is the laminating of a flexible sheet to an inflexible sheet. Further, multiple flexible sheets can be laminated to a plurality of inflexible sheets. The ratio of inflexible sheets to that of flexible sheets will determine the resultant overall flexibility of the composite laminate structure.

Inorganically filled sheets can be manufactured, according to the present invention, in both flexible and inflexible forms. The inflexibility of an inorganically filled sheet may be due to the choice of materials or may be due to the processing of the inorganically filled sheet. A key ingredient of the inorganically filled sheets which is capable of inducing flexibility or lack thereof into the sheet is the type and concentration of fibers. Plasticizing agents may also be within the sheet forming mixture to induce flexibility.

A thin sheet of polyethylene can be laminated on top of an inorganically filled sheet with the net result being that the composite laminate structure has an overall flexible characteristic. This is particularly the case when a weak bond exists between the polyethylene sheet and the inorganically filled sheet. Conversely, a strong bond between the polyethylene sheet and the inorganically filled sheet will produce an overall inflexible composite laminate structure. The weak bond allows slippage between layers in the lamination and the slippage produces the net effect of a flexible composite laminate structure.

E. Stressed Layers Incorporated Into Laminates

It is intended that the present invention have within its scope composite laminate structures that are not necessarily planar. Rather, laminates can take a variety of forms including tubular, arcuate, and curled. To induce such nonplanar forms, stressed sheets may be laminated to nonstressed sheets. The stress in the sheet within the laminate structure will induce the resultant shape of the composite laminate structure. Various methods for inducing tension to a sheet prior to lamination are known within the art. For example, a tenter frame is a typical web or sheet stretching machine that can be incorporated into a composite laminate manufacturing process in order to accomplish stress induced shapes in composite laminate structures. Additionally, sheets can be overfed in downstream rollers and underfed in upstream rollers in order to induce a machine direction tension therein immediately prior to lamination to a corresponding sheet. Any of the conventional methods can be used to apply tension to a stretchable sheet prior to lamination within a composite laminate structure. By way of example of inducing tension to a sheet prior to lamination, FIG. 4 shows a cross machine direction force being applied to a top sheet prior to a lamination step at a nip between two lamination rollers.

(1) Curl/Non-Planar/Tubular Forms

Composite laminate structures can be used for wrapping piping or other tubing by having a curl or bend in the composite laminate structure which is readily formable around piping or tubing. To produce such a composite laminate structure, there is proposed a continuous sheet-like covering material consisting of a multi-layer laminate containing at least two layer groups. The first layer group, which forms the outside portion of the sheet material when it is curled up, contains a supporting layer consisting of a continuous inorganically filled sheet with a small amount of stretch, the sheet being covered on its outwardly facing surface by a polyethylene layer and similarly on its inward surface by a polyethylene layer or by a glue layer. The other group (forming the inner portion when the material is coiled up) contains a layer of highly extensible inorganically filled sheets which, by high tensional loading during manufacture, is given a contracting tendency caused by its striving to regain its shape, the highly extensible inorganically filled sheet having on its surface facing of the first layer group a polyethylene layer or glue layer, which is bonded to the corresponding layer in the first layer group, or consists of said layer, and on its opposite side is protected by a polyethylene layer, or layer groups being bonded to each other so that the sheet material has an enduring free curvature, which is characteristic for it. It is also contemplated that the sheet material further has a layer of metal foil, e.g., an aluminum foil, applied to its outermost layer. Aluminum foil would add a heat reflective barrier to the resultant composite laminate structure.

During the manufacture of the described composite laminate structure, one side has been exposed to a greater specific tensional force than the other and thereby has become more stretched. As a result of this, the most stretched side contracts more than the other in a free condition, resulting in the laminate assuming a curled shape. The non-inorganically filled sheet side must be an elastic material, e.g., paper, having the capacity of being stretched when subjected to a tensional force and which strives to regain its original shape when tensional force ceases. The greater the stretching and elastic characteristics of the material, the greater will the curling effect be. The different tensional forces are thereby regulated, for instance, in a plastics coating machine with the aid of the breaking equipment associated with the machine. Of course, other manufacturing techniques are contemplated.

F. Laminating Inorganically Filled Sheets to Dissimilar Sheets to Combine Beneficial Material Properties from Each

(1) Mere Cling Bonds

In the case of pressure sensitive tapes, where the backing paper is desired to be used repeatedly, there is proposed a composite laminate structure formed by laminating a polyolefin film, preferably oriented, to an inorganically filled sheet substrate by means of a melt of a polymer containing the same olefin as used in the film. The resulting composite laminate structure is tough, tear-resistant, well-bonded, and reusable as backing sheets for pressure-sensitive tapes in that there is only a slight bonding or "mere cling" thereto.

(2) Barriers and Barrier Characteristics a. Waterproof/Oil Resistant

This invention also concerns a composite laminate structure that is both oil-resistant and waterproof. The laminate can be formed for making containers for food and non-food products, where the laminate makes use of a high-strength, heat-resistant and caulking polymer layers which prevent pinholes, cuts or cracking of the barrier layers during manipulation of the laminate such as during package formation.

The resultant laminate acts to caulk the seams and channels present in a packing container so as to provide a sealed leak-free container. This laminate is accomplished by providing a food contacting exterior layer of a low density polyethylene laminated to an inorganically filled sheet substrate having the consistency of paperboard or paper. Laminated on the inorganically filled sheet is a corrugated board layer, followed by a stiff polymer resin material such as high-density polyethylene or polypropylene or multi-ply combinations thereof.

Next, a first layer of a caulking polymer resin, such as an ionomer type resin and an oxygen barrier material layer, such as an aluminum foil layer, followed by a sandwich interior layer of an abuse-resistant polymer such as a polyamide type polymer (nylon 6) surrounded by two additional caulking polymer resin layers such as an ionomer type resin and lastly a layer of low-density polyethylene in contact with the food or non-food product rendering the laminate structure heat sealable. The exterior layer of low-density polyethylene does not contact the food but, rather, the lowest layer of low-density polyethylene contacts the food.

This composite laminate structure is produced using conventional co-extrusion coating equipment. After co-extrusion, the composite laminate structure is printed and forwarded through scoring dies and cutting dies to create flat blanks which are later used to be skived and folded into cartons.

b. Flavor Barrier

Polyolefin films in laminates incorporating inorganically filled sheets can be used as flavor barriers for food and beverage containers. The containers have a high retention of volatile materials and flavor oils commonly lost during food storage of food products within containers made from conventional paper laminates. These containers are made from a composite laminate structure having the top layer of biaxially oriented polyethylene terephthalate film which is bonded to a surface of an inorganically filled sheet. The other surface of the inorganically filled sheet is bonded to a polyolefinic resin, such as low density polyethylene resin. Additionally, a laminating resin is interpositioned between the polyethylene terephthalate film and the surface of the moldable binder sheet to adhere the film to the moldable binder sheet.

Laminates of inorganically filled sheets with mixtures of polyethylene and ethylvinyl alcohol co-polymers also have a barrier-type property useful in containers for food and beverages, where the barrier is useful for oxygen and flavor-sensitive liquid foods, for example, fruit juices. The barrier layer is laminated on top of the inorganically filled sheet layer. Since the barrier layer includes both polar (the ethylene vinyl alcohol co-polymer) and non-polar (polyethylene) components, the material possesses barrier properties against both polar and non-polar flavor components, at the same time as the material moreover displays tightness properties vis-a-vis oxygen.

(i) Gases: Odor Barriers; or Gas Absorbent

A composite laminate structure proposed for packing gas-tight containers is contemplated. A carrier layer of inorganically filled sheets formed into corrugated board and having thereon outer coatings of plastics, are proposed as the carrier layer. The inorganically filled sheet should be formed so as to be rigid and foldable. A gas-tight metal foil layer is disposed on one side of the carrier layer and an ethylvinyl alcohol layer produced through extrusion is disposed between the carrier layer and the metal foil layer, where the ethylvinyl alcohol layer is attached directly to the metal foil.

To manufacture the packaging composite laminate structure, the paperboard-like inorganically filled sheets have a coating of extruded plastic layer and are guided past the first extruder which deposits a layer of molten polyamide on the free side of the inorganically filled sheets, and then are passed through a second extruder. The second extruder deposits a layer of molten ethylvinyl alcohol on top of the polyamide layer and the resultant intermediate laminate is passed to a guided deflection roller. The guided deflection roller lightly presses an aluminum foil against the intermediate laminate. From the deflection roller, the intermediate laminate with the aluminum foil is passed through a nip of two co-rotational cooling rollers which are pressed against each other with a light pressure and which compress and cool the previously deposited layers so as to form a lasting bond together. From the cooling rollers, the resultant composite laminate structure is further advanced past one or several further extruders which bring on one or more further plastic coats. The resultant composite laminate structure so coated with plastic finally is passed through the nip between a pair of co-rotational cooling rollers which compress the laminated material layer to form the finished, well-coherent packing laminate. The laminate may then be wound up on a magazine roll.

Another gas tight composite laminate structure having aluminum foil is useful due to the barrier properties of nonporous foil. Laminate structures having aluminum foil result in oxygen passage or percentage loss of vitamin C being greatly reduced versus prior art laminates that do not contain aluminum foil. A contemplated composite laminate structure has an inorganically filled sheet substrate laminated to an outer layer of a heat-sealable low density polyethylene polymer, and the other side of the inorganically filled sheet having laminated thereto an aluminum foil layer, and finally a product-contact layer of a heat-sealable low density polyethylene polymer extruded on and over the aluminum foil layer. This composite laminate structure is heat-sealed on conventional equipment at temperatures ranging from 250° Fahrenheit to 500° Fahrenheit so as to create a non-polar homogenous heat-seal. Containers made from this composite laminate structure serve to tightly contain citrus juices and other liquids, as well as being a good barrier layer of heat-sealable oxygen and flavor oil barrier material.

C. Electromagnetic Radiation

Inorganically filled sheets may be combined in a variety of composite laminate structures to produce an effective barrier against electromagnetic radiation. The properties of the various materials, in combination with the inorganically filled sheets, give the resultant barrier which will be effective against electromagnetic radiation (EMR) by absorbing or by reflecting. EMR can take on the forms of light, radio waves, magnetic fields, or electricity. Each of these EMR effects can be prevented from propagation by proper choice of materials and structure in a composite laminate barrier. Each of these four types of EMR will be discussed hereinafter.

(i) Light

EMR in the form of light waves may be blocked by opaque inorganically filled sheets. Air voids within the inorganically filled sheets cause the sheet to be an opaque barrier to light. Conversely, an inorganically filled sheet can be processed into a translucent or a transparent sheet. One method of decreasing the opacity and forming a translucent transparent sheet involves passing the sheet between one or more pairs of rollers with sufficient pressure to decrease the air void volume within the sheet and resulting in a decreased diffraction of light. Another method involves passing an inorganically filled sheet through a pair of hard and soft rollers resulting in a highly polished surface. The opacity of inorganically filled sheets can also be decreased by including silica fiber and Tylose®. Additionally, combinations of these methods of decreasing the opacity of inorganically filled sheets can be utilized.

A transparent or translucent inorganically filled sheet can be used in conjunction with carded packaging containers to form a laminate structure in the form of a blister pack to package and display many products including food products such as lunch meats, office products, cosmetics, hardware items, and toys. A support card, which can be an inorganically filled sheet, can readily accept print indica and the translucent inorganically filled sheet which is the cover of the blister pack permits the packaged product to be visually displayed. Other examples of translucent or transparent inorganically filled sheets include both blister packaging containers and skin packaging containers.

(ii) Radio Wave Barrier

Composite laminate structures which form barriers for radio waves are contemplated within the scope of the present invention. Such composite laminate structures are contemplated for food packaging for use in microwave ovens. Such food packaging will ideally have a microwave-reflective grid in combination with a microwave susceptor. This combination provides a useful arrangement in the microwave cooking of food stuffs for consumption, by controlling surface heat in microwave transmittance to the food stuff to achieve a more uniformly heated product.

The microwave susceptor is the element of the composite laminate structure which generates thermal energy when exposed to microwave radiation and often can take the form of a thin metal film, usually aluminum, supported on a polymeric substrate. The rest of the laminate structure involves the use of inorganically filled sheets which are adhesively bonded by laminating adhesive to the susceptor-polymeric film combination on the opposite side thereof.

A polymeric dome layer adhesively bonded by laminating adhesive to the grid is also incorporated to avoid the food stuff contacting the grid directly. The aforementioned grid ideally has an electroconductive surface surrounding apertures which are transmissive to microwave radiation. The layer of electroconductive material is of sufficient thickness that a portion of incident microwave energy is converted to thermal energy.

Inorganically filled sheets can be microwave-transparent to permit the passage therethrough of microwave radiation to the other components of the composite laminate structure, including the food stuff interposed between the inorganically filled sheet substrate and the electroconductive layer of the composite laminate structure.

Composite laminate structures having microwave-transparent inorganically filled sheets as well as microwave-susceptor layers are contemplated for microwaveable packaging for food stuffs such as pizza and popcorn. Using vapor deposition of aluminum or other technique, an inorganically filled sheet can be metallized and then layered into a laminate structure. Alternatively, aluminum foil can be coated with adhesive prior to application to an inorganically filled sheet to form the lamination.

Other metals besides aluminum can be used. For example, the microwave interactive layer may include at least one metallic alloy layer such as an alloy of nickel and chromium. The addition of a thermal conductivity layer to the inorganically filled sheets in the lamination results in thermal conductivity so as to cause microwave absorption heating to provide crisping and/or browning of a food item contained within the food packaging structure for microwave cooking.

(iii) Magnetic

Materials forming a magnetic barrier and materials carrying magnetization can be incorporated into laminates to accomplish a laminate energizing objective. Examples of such objects include magnetically readable cards and computer cards.

Magnetically readable cards can be formed by laminating stripes of encodable magnetic material to rigid inorganically filled sheets so as to produce therefrom magnetically readable credit cards, computer readable cards, and other magnetic media used in reading machines. In this regard, stripes of encodable magnetic material are applied in the fabrication of magnetically readable credit cards by incorporating the magnetic stripes in the cover sheet itself, where the cover sheet can be made of inorganically filled sheets containing therein plasticizers so as to give a flexible quality to the resultant inorganically filled sheets. Next, the cover sheet having thereon magnetic stripes is laminated to a sheet of core stock for forming the credit card. The core stock may also be an inorganically filled sheet, but preferably will have a different flexibility characteristic than the cover sheet. The resultant composite laminate structure will have a bendability necessary to be adaptable to be read in magnetic media reading machines, while at the same time having a magnetic stripe to serve its basic function.

An analogous process to magnetic credit cards is that of magnetic computer cards which are more paperboard-like, where the paperboard type base substrate upon which the magnetic stripe is mounted is formed of an inorganically filled sheet. This computer readable magnetic card will have a greater flexibility than the aforementioned magnetic credit card. In each of the above cases, a heat roller can be used to apply magnetic stripes to the substrate inorganically filled sheets. The magnetic stripes can be surrounded or covered or coated with thermosetting resins or films in order to bond and laminate the magnetic stripes to the substrate inorganically filled sheets. Conversely, a combination of heat rollers and chill rollers, in a given temperature range effective for the materials being used, will achieve reliable bonding of the magnetic laminate stripe or tape to the substrate inorganically filled sheet without causing the deformation thereof as a result of substantial heat shrinkage. The manufacturers ability to maintain the heat and chill rollers at controlled temperatures, in addition to enhancing the bonding qualities of the resultant composite laminate structure, allows also for increased production speeds and greater reliability.

(iv) Electricity

Composite laminate structures in which at least one layer thereof is an inorganically filled sheet can be used as electrically insulative barriers to shield against transmission therethrough of electricity. Further, such composite laminate structures can be formed into containers that protect electrical components from damage that may result from the discharge of electrostatic charges. The construction of such a container provides a Faraday "cage" effect. A Faraday cage is a substantially enclosed conductive structure. The effect of the Faraday cage on an electrostatic charge occurs when the cage is not grounded or otherwise connected to a voltage reference. Because the cage is substantially enclosed and isolated from any such reference, an electrostatic charge held on the cage has no path through which the charge may dissipate. This forces the charge to circulate about and dissipate from the surface of the cage into the surrounding atmosphere.

A protective container for electrical components can be made of composite laminate structures to protect electrical components from damage caused by the discharge of electrostatic charges. The container includes a hollow body and a pair of electrically conductive end caps. The hollow body includes a laminate of inorganically filled sheets, having the consistency of paperboard, and at least one layer of electrically conductive material, preferably on the outer surfaces of the inorganically filled sheets. The electrically conductive end caps close the opposite ends of the hollow body, and at least one of the end caps is removable so that electrical components stored therein can be removed. Further, at least one of the end caps makes conductive contact with the conductive material to provide a complete enveloping enclosure.

The hollow body is preferably cylindrical shaped and also includes a layer of conductive foil. The conductive foil serves as an electromagnetic radio frequency interference shield as well as a vapor barrier to prevent the migration of vapors into the interior of the tube.

The layers of the cylindrical body may be made up of a variety of materials. For example, at least one of the layers of a conductive material may include a metallized nonwoven fabric or a coating of conductive material, such as carbon, on or impregnated in the surface of the inorganically filled sheet. Such materials provide the necessary electrostatic protection to the integrated circuits.

Alternative shapes to the hollow tubular body include a square-like shape, i.e., two pairs of pairable sides. This design allows a number of printed circuit boards to be inserted inside the protective container. The conductive material can be aluminum and the conductive layer can be carbon-coated or carbon-impregnated inorganically filled sheets.

The conductive container also serves to protect the electrical components stored therein from migration of vapors that may enter the container. This vapor barrier function may be accomplished using a vapor resistant material in addition to the aforementioned layers. Preferably, the innermost layer of the composite laminate structure acts to serve both the metallization and vapor barrier functions. Carbon-coated or carbon-impregnated inorganically filled sheets may serve as the innermost layer. Other alternatives include the use of an electrostatic dissipating polyethylene foam in combination with the material providing a vapor barrier, and a metallized film on the material providing the vapor barrier.

Composite laminate structures having inorganically filled sheets can be engineered to prevent the buildup of static electricity on the surface of the lamination. To do so, the laminate structure has an inorganically filled sheet layer laminated to a layer of pliable closed-cell microcellular resin foam. The foam has its outer surface coated with a cohesive-nonadhesive layer containing sufficient anti-static material to inhibit the build-up of static electricity on the sheet. Sheets of this sort can be used to package different products that are sensitive to static electricity, such as delicate electronic parts. The foam acts to cushion the electronic parts as well as prevent damage due to the static electricity. The cohesive-nonadhesive surface coating helps to prevent damage from contact between adjacent parts within the same package. Examples of anti-static coatings which may be usable in this composite laminate structure include potassium formate, although other anti-static coatings are also contemplated. The polymer of the foam layer can incorporate anti-static ingredients that impart anti-static properties to the foam, such as potassium formate, sodium formate, or acetylene black.

Inorganically filled sheets can be formed into composite laminate structures, in combination with other material sheets, to make electrical power supply cable insulating layers. Such a power supply cable includes a centrally located conductor, 3–10 plies of moldable material wound around the conductor, and a plurality of insulating layers. At least one of the pluralities of insulating layers is an insulating polyolefin sheet that is laminated to first and second moldable ply layers with a permeability of 20 to 4,000 gurley-seconds and a polyolefin film layer to which the first and second moldable ply layers are laminated. At least one of the moldable ply layers is mechanically deformed prior to lamination such that irregularities, whose depth is 2–50% of the thickness of the moldable ply layer, are formed thereon. Also, the water content of the moldable ply layers must be controlled to be 4% or less immediately before laminating to the polyolefin film layer. Preferably, the moldable ply layers have a thickness of at least 30 microns.

Another form of insulation lamination for electric cables is a bi-axially oriented polypropylene film bonded to an oil-impregnated inorganically filled sheet by means of a melt-extruded polyolefin adhesive. Polypropylene is desirable in such an insulation laminate structure in that it has superior buckling strength, oil resistance, heat resistance, and electrical breakdown strength as compared to a polyethylene film. The polypropylene is extruded in a molten state on an extrusion process onto an inorganically filled sheet in preparation for insulation on the electric cable. Biaxially oriented polypropylene films are relatively low in cost, and are superior to polytheylene films in heat resistance, oil resistance, and electrical breakdown strength. The inorganically filled sheet proposed has a high electrical insulation capability and a high dielectric constant. The inorganically filled sheets may be impregnated with an alkylbenzene oil. The inorganically filled sheet will be manufactured preferably to have a high air-impermeability. Inorganically filled sheets having a high air-impermeability lower than 200 gurley-seconds is undesirable. Since inorganically filled sheets with high air-impermeability are expected to have a great effect of trapping ions or electrons generated by a strong electric field, it is considered to contribute an improvement in voltage strength.

A composite laminate structure having a molded and extruded polypropylene or other polyolefin film is also contemplated for this invention. Polyolefin, within a laminate having inorganically filled sheets, has an excellent dielectric characteristic and a high dielectric strength. As such, the laminate may be used as an insulating cover for electrical equipment such as ultra- or ultra-super high voltage cables.

d. Soundproofing/Sound Absorbing

By forming inorganically filled sheets into honeycomb cores, such as was described above, and lining the periphery of each side of the honeycomb core with a perforated sheet, the resultant perforated sheet-honeycomb-perforated composite laminate structure serves as an acoustic laminate used for machinery noise attenuation structures. The sound attenuation is achieved through inhibition of flow through resistance between the outer surface of the porous material and the cells of the honeycomb core.

A composite laminate structure is contemplated for insulating piping against the passage of sound utilizing an incorporated polyethylene layer. The laminate also thermally insulates. The pipe insulating material consists of two layer groups. The first layer group forms the outer part of the sheet material when rolled up and contains a supporting layer consisting of an inorganically filled sheet with minor extensibility which is covered on its outward facing surface with the aforementioned polyethylene layer, and is similarly covered on its inner surface with a polyethylene or glue layer. The second group, which forms the inner part of the material when rolled up, contains a layer consisting of a highly extensible inorganically filled sheet which is given a contracting tenancy due to its striving to return to its original shape, being given a high tensional load during manufacture.

Alternatively, the foregoing composite laminate structure, when seeking to add the benefit of fire retarding effect to that of sound proofing, is composed of the following: an aluminum foil layer, a glue or low density layer of polyethylene, an inorganically filled sheet without extensibility characteristics, a low-density polyethylene layer, an unbleached, unglazed highly extensible inorganically filled sheet, and a low-density polyethylene layer.

e. Thermal (i) Food Cooking Vessels

A composite laminate structure incorporating a polyethylene film is beneficial in the food packaging industry due to the nature of polyester material as having good moisture barrier properties as well as freedom from any harmful residues which may pass into food materials. Polyester films are useable in packaging frozen foods with laminates of polyesters on inorganically filled sheet substrates and are contemplated herein as being very suitable for forming rigid packaging structures which may be employed for transporting and storage of foods as well as for use as cooking containers in microwave ovens.

The composite laminate structure contemplated is made by heating and plasticizing a polyester and then extruding same from an elongated die. The polyester may be selected from the group consisting of polymethylmethacrylate, polyethylene terephthalate, polybutylene terephthalate, and blends and copolymers of these. After extrusion of the polyester, a second organic polymer is heated and plasticized and then fed toward an elongated die upstream to the polyester while both are in a liquid state. This permits intimate mixing of the polyester in the second polymer in areas near both of the opposite ends of the elongated dies. The composite stream of polyester and second polymer are again extruded through a secondary die and greatly reduce the thickness thereof.

The second polymer is a polyolefin and is preferably a low-to-high density polyethylene. After the thickness of the resultant composite film is reduced, the composite film is then laminated onto a sheet of moldable material as disclosed according to the present invention. It is preferable that the inorganically filled sheet would be physically similar to cardboard and have a thickness of about 0.015"–0.024"

and a density of about 10–13 lbs./ft³. This type of inorganically filled sheet is very suitable for use in preparing paperboard-like trays for storing food products in frozen condition and heating them directly therein in a microwave oven.

The use of polyester with cardboard-like inorganically filled sheet laminates is contemplated herein in the preparation of ovenable containers. To obtain such a composite laminate structure, a layer of polyester, and particularly polyethylene terephthalate (PET) is laminated to a cardboard-like inorganically filled sheet. In so doing, a layer of polyester and a layer of polymeric adhesive layer are coextruded. The polymeric adhesive layer adheres to both the polyester layer and the cardboard-like inorganically filled sheet. The composite laminate structure produced hereby can be used to produce ovenable containers. The cardboard-like inorganically filled sheets can be coated with sizes, wet strength resins or combinations thereof, as desired, without serious adverse effects as to adherence of the polyester layer. Where it is desired to use the two-dimensional laminate to form a three-dimensional object, such as a food tray through the use of forming die, the inorganically filled sheet is advantageously treated with a sizing agent comprising an alkyl ketene dimer (commercially available as Aquapel™) which not only provides wet strength and edge wick resistance to the inorganically filled sheet but additionally renders the inorganically filled sheet more amenable to die molding.

Suitable coextrusion apparatus are well known for those of skill in the converting arena to produce the aforedescribed coextrusion. For example, an advantageous arrangement for providing the aforementioned two-molten layer involves use of a primary extruder and a satellite extruder with the molten plastic issuing from the two extruders being fed through a combining adapter which advantageously comprises a dual manifold, single slot die. This type of die can utilize the supported nature of the adhesive layer to help carry the less viscous PET layer.

Another composite laminate structure is proposed having properties which are resistant to burning and are needful in ovenable containers. The composite laminate structure is used to form an ovenable tray where the tray is composed of such laminate. The laminate has one layer made of a cardboard-like inorganically filled sheet and is coated on its food-contacting surface with a food grade resin such as polyester. The other surface of the inorganically filled sheet has adhered thereto another inorganically filled sheet which is coated with an essentially non-burning coating which is heavily pigmented. The polyester proposed may be a polyethylene terephthalate. It is also contemplated that the inorganically filled sheets would be impregnated with a flame-retardant material, such as boric acid. The laminate proposed herein may be molded into the form of trays by known processes.

The resultant composite laminate structure formed into an ovenable tray is flame resistant. The laminated inorganically filled sheet has on its non-food-contacting surface an inorganically filled sheet coated with an essentially nonburning coating such as a silicone polymer coating or a highly pigmented coating of the sort generally used on publication grade papers. The coated inorganically filled sheet is suitably affixed to the non-food-contacting surface of the cardboard-like inorganically filled sheet by means of adhesive, typically polyvinyl acetate (PVA).

The resultant tray is then defined by a laminate of cardboard-like inorganically filled sheet and paper-like inorganically filled sheet secured together by an adhesive. As described, the composite laminate structure has a coating on the food-contacting surface of the cardboard-like inorganically filled sheet substrate with the food grade resin, such as polyethylene teraphthalate (PET). Next, conventional flame retardant treatments, such as a solution of boric acid and polypropylene glycol, may be applied to the non-food-contacting surface of the paperboard-like inorganically filled sheet and allowed to penetrate it.

Next, an adhesive is applied, typically polyvinyl acetate, over this non-food-contacting cardboard-like inorganically filled sheet surface. Then, a paper-like inorganically filled sheet stock such as a silicone coated inorganically filled sheet is applied to the adhesive or, alternatively, a printing grade coated inorganically filled sheet is applied to the adhesive. Such a sheet would be paper-like in appearance and in properties. Thereafter, the resulting laminate is subjected to pressure or possibly a combination of heat and pressure in a platen press or between laminating rollers. Then, the resultant composite laminate structure is made into an ovenable frame, filled with food, and is ready for shipment as a preprocessed food meal.

A laminate of at least a layer of polyethylene teraphthalate and a nonbrowning sheet of moldable material having the consistency of paperboard is also useful in the construction of containers for cooking food. The container is formed when a blank is made of a material comprising a nonbrowning inorganically filled sheet, which sheet has the consistency of paperboard, the sheet having polyethylene teraphthalate material extruded onto one or both of its surfaces.

The method of making this composite laminate structure in which an uncoated surface or surfaces of the inorganically filled sheet is heated, preferably by flame, enables a bond to be set between the inorganically filled sheet and the polyethylene teraphthalate. This method is effective in food cooking applications. In forming the container from the blank of this composite laminate structure, the polyethylene teraphthalate surface, or parts of it, may be brought into abutting contact with other parts of the polyethylene teraphthalate surface or with other parts of the inorganically filled sheet surface and secured or heat sealed together, or the container may be formed by appropriately folding the blank or by heating the blank and die pressing it into container form. Food can then placed in the container, which food may then be heated or reheated to temperatures up to about 400° F. without having browning problems with the inorganically filled sheet and without having delamination problems with the laminate.

The resultant container of this composite laminate structure does not deleteriously affect the cooking of the food contained therein and may be formed at low heat sealing temperatures and cooked or used at high cooking temperatures and still remain attractive in appearance.

Ideally, the paperboard-like inorganically filled sheet will have a pH of between 7.0 and 7.5. The layer of polyethylene teraphthalate which is laminated onto a surface of the inorganically filled sheet should have an intrinsic viscosity within the range of 0.51 to 0.85. After such extrusion, the composite laminate is cooled so as to solidify and affect a bond between the inorganically filled sheet and the polyethylene teraphthalate to form a two-ply laminate. It is also within the scope of this invention to apply a second layer of polyethylene teraphthalate on the uncoated side of the inorganically filled sheet.

An alternative use for polyethylene teraphthalate is to use a thin layer of the same, modified by glycol in a thin layer upon an inorganically filled sheet having a consistency of paper, paperboard, fiberboard or bleached Kraft paper. This layer of glycol-modified polyethylene teraphthalate is bonded to the inorganically filled sheet's inner and outer surfaces and becomes a desirable beverage-contacting surface for use in containers as a barrier laminate for making containers and cartons. The advantage of such a laminate is it can substantially resist the absorption of essential oils and flavoring components, e.g., peel oil, as well as the oxidation of one-ascorbic acid (vitamin C) normally found in various beverages, such as fruit and citrus juices.

Also contemplated as a composite laminate structure is a laminate having a food contacting polyethylene teraphthalate layer which is laminated onto an inorganically filled sheet having the consistency of paperboard, where the means for lamination therebetween is a crosslinkable adhesive. The use of such a coating in such an adhesive formulation permits use of the laminate, when forged into a food cooking tray, in oven temperatures to about 400° F. without delamination of the coating from the inorganically filled sheet or cracking of the coating. The crosslinkable adhesive is preferably applied to both the inorganically filled sheet and the polyethylene teraphthalate thin layer.

Each of the above disclosed laminates for food cooking vessels have the common component of one or more inorganically filled sheets incorporated therein. By such incorporation, the paper-like qualities of such sheets are realized in the laminates, while minimizing the environmental impact upon disposal of the laminates after use.

(ii) Insulations Thermal

A composite laminate structure suitable for use as a thermal insulation package incorporating in the lamination an inorganically filled sheet is within the scope of the present invention. The thermal insulation package is made from laminated sheet material which includes an inner layer of inorganically filled sheet material. An outer layer of aluminum foil and an intermediate layer of fiberglass webbing are also provided in the thermal insulation package. The three layers are adhesively secured together and the inner surface of the inorganically filled sheet is coated with a heat-activated adhesive. The sheet material is formed into a tubular section by overlapping opposite edges of the sheet material and heat sealing the edges together. The tubular section thus formed is subsequently cut into tubular sections of smaller length, and the bottoms of each of the smaller sections are then heat sealed. The containers thus formed are filled with polystyrene pellets and a hydrate compound is added. The open end of each of the containers is then closed and heat-sealed to form a completed package. In an aspect of the present invention, the inorganically filled sheets may be impregnated with a fire-retardant composition such as Surlyn®, a duPont trademark, and neoprene water-based adhesive with halogens so that the resulting insulation package will be in compliance with conventional fire regulations. The resultant insulation package is fairly inexpensive and capable of being installed in a broad range of structural environments.

f. Fire Retardant

Inorganically filled sheets vary with the ability to retard flame depending on the concentration of fiber therein. A low-fiber content will yield an inorganically filled sheet that is a poor combustion material. Alternatively, a high-fiber content will yield a combustible inorganically filled sheet. When high temperature, such as flame, contacts an inorganically filled sheet, the binder is weakened and the form stability of the inorganically filled sheet is compromised. In the event that an inorganically filled sheet is to used in an environment where contact with flame and subsequent combustion is undesirable, it may be that the inorganically filled sheet should be coated with a fire retardant layer or laminated to a fire retardant material in the interest of preventing combustion from the resultant composite laminate structure.

Inorganically filled sheets having paper-like characteristics tend to be porous. Therefore, a cost-saving measure for applying a fire retardant to an inorganically filled sheet would be to apply a solid sheet layer of fire-retardant material to the inorganically filled sheet as opposed to coating the inorganically filled sheet with a liquid fire-retardant material. In this way, less fire-retardant material will be used.

g. Abrasion Resistance

Abrasion resistance in a composite laminate structure is within the scope of the inventive lamination incorporating inorganically filled sheets, where the outermost inorganically filled sheet has been impregnated with a thermosetting resin, such as melamine-formaldehyde resin. The inorganically filled sheet on the outermost layer is coated with the thermosetting resin or, alternatively, can have a hardened thermosetting resin laminated to the outermost inorganically filled sheet. It may be desirable to laminate a hardened thermosetting resin to the inorganically filled sheet in order to conserve resin usage due to the porosity of the substrate inorganically filled sheet.

To further increase the abrasion resistance of the inorganically filled sheet, in addition to the impregnation with thermosetting resins, the thermosetting resin can be further coated with small, hard particles evenly distributed over the resin. After such coating with small, hard particles, the resin is dried. The hard particles may consist of many different materials. Particularly suitable for such use is silica, aluminum oxide and/or silicon carbide. Thus, a mixture of two or more materials is possible. The size of the particles is relevant to the final result. If the particles are too big, the surface of the laminate will be rough and unpleasant. On the other hand, too small particles can give too low abrasion resistance. Preferably, the average particle size is about 1–80 $\mu$m, preferably about 50–60 $\mu$m.

A composite laminate structure ideally suited for application by lamination onto a substrate such as a wall covering is contemplated. The benefit thereby conferred by this laminate is abrasion resistance. The surface laminate film is comprised of polyvinyl chloride film plasticized with a polymer plasticizer and combined with an acrylic adhesive. The adhesive would most ideally be an acrylic adhesive. The surface laminate is laminated to an inorganically filled sheet having the consistency of paper.

This composite laminate structure is useful as a decorative composite material for wallcoverings, lampshades, menus, window blinds, pamphlets, printed substrates of continuous lengths, and other uses as well. Specifically, the composite laminate structure is formed by laminating release inorganically filled sheets coated with a pressure sensitive acrylic adhesive to a clear polyvinyl chloride film plasticized with a polymeric plasticizer, so that the lamination of the inorganically filled sheet, adhesive, and film is formed. Next, the inorganically filled sheet is removed from the lamination, which provides, in turn, a polyvinyl chloride film with a pressure sensitive acrylic adhesive coating.

The pressure sensitive acrylic adhesive coating, polyvinyl chloride film, is laminated then to a wallcovering web. When this composite laminate structure is used as a wallcovering, the durability and stain resistance of the wallcovering is realized.

h. Tearing

A composite laminate structure having excellent hygienical properties and bond strength to resist tearing even after retort sterilization is a lamination of the following structure. A thermoplastic resin sheet or film and a metal foiler sheet are placed one upon the other with a specific polyolefin-type resin being interposed therebetween.

The specific polyolefin-type resin has at least one member selected from the group consisting of a carboxyl group containing polyolefin resins and metal compound-added carboxyl group containing polyolefin resins. It is applied through the metal foiler sheet to the specific polyolefin-type resin, the heat being not lower than the melting point of the specific polyolefin-type resin to obtain an intermediate laminate. Finally, a lamination is made on the metal foiler sheet side of the intermediate laminate where the laminate is selected from the group consisting of inorganically filled sheets and thermoplastic sheets or films. An ordinary adhesive is used to adhere the inorganically filled sheets and thermoplastic sheets or films to the intermediate laminate, where the ordinary adhesive does not require to be heated to a temperature not lower than the melting point of the specific polyolefin-type resin at the time of the lamination.

The ordinary adhesives which may be used are those which do not require heating at a temperature not lower than the melting point of the specific polyolefin-type resin to exhibit necessary bond strength. They include urethane-type adhesives, epoxy-type adhesives, vinyl-type adhesives, acryl-type adhesives and rubber-type adhesives, each in non-solvent form, in the form of a solution or dispersion in an organic solvent, in organic solution form or in aqueous dispersion form.

The urethane-type adhesives are preferred and they may be in the form of a solution in an organic solvent, in non-solvent form (two-component form, moisture cure form) or in other suitable forms. Further, adhesives which may be heated to temperatures below 100° C. may also be used. As to application, the ordinary adhesives may be roll-coated, gravure-coated, spray-coated, curtain-coated, or air knife-coated, for example, or they may be applied in film form.

Containers made from the above laminate are excellent in compression resistance and hygienic safety due to the use of a polyolefin film or film as the innermost barrier thereof and are also excellent in barrier properties due to the use of a metal foiler sheet as one of the layers thereof. Further, strong bond strength may be obtained by heat-treating a specific polyolefin-type film for a short time in the preparation of laminates.

With the foregoing laminates, there is no problem as to the deformation of the resulting laminates even if the heat treatment is carried out for a long time. If a polyolefin film, polyester film, or polyamide film coated inorganically filled sheet is used as the outermost layer in the preparation of laminates and the laminates so prepared are used in the preparation of containers, the resulting containers will have excellent tensile strength and impact resistance.

A composite laminate structure suitable for being formed into packaging materials for use in six pack can wraps, six pack bottle carriers, twelve pack carriers, etc. can be made using a composite of inorganically filled sheets, having the consistency of paper material, which is then laminated to a plastic film. The plastic film is preferably 0.25–2 mils thick and is preferably formed of polyethylene. Alternatively, the plastic film may also be polyethylene teraphthalate, polyvinyl chloride, polypropylene, or cellophane.

Adhesives are used to bond the film to the inorganically filled sheet and may be selected according to compatibility with the inorganically filled sheet. Additionally, the film may be metallized to produce a foil effect or may be strengthened by radiation treatment. The resulting containers formed from this composite laminate have shipping and handling strength and are attractive in consumer appearance due to ease in printability. Additionally, the packaging features strengths in tensile load and resistance of the material to diametrically opposed forces and tear strength, relating to the internal resistance of the material to tearing.

The inorganically filled sheet will preferably have the consistency of paper material, where the thickness is 0.03–0.080 mm and has a density of 0.02–0.63 kg/in$^2$. Also, the tensile load of the inorganically filled sheets should be 40 lbs. in the machine direction and 30 lbs. in the cross direction for a six-pack of typical 12 ounce cans. The inner inorganically filled sheet material should provide at least 85% of the tensile load and the plastic film laminated to the inorganically filled sheets should provide at least 28% of the tearing resistance.

i. Elastic Quality

Inorganically filled sheets may be composed of a microstructurally engineered admixture of fibers, aggregates, organic binders, and dispersants. By adding glass balls to this mixture, an elastic quality can be added to the resultant inorganically filled sheet. Many of such sheets combined together result in a resilient or elastic composite laminate structure. For instance, if inorganically filled sheets of this type are laminated together into a spherical structure, the resulting sphere will bounce as would a polymeric or rubber ball, depending on the concentration of glass balls in the inorganically filled sheets of the composite laminate structure.

Of further assistance to such a spheroid laminate structure is a loose bond between the various sheets in the lamination. Loose bonding between the interposed sheets will cause a surface-to-surface slippage therebetween. The slippage further adds a flexible quality to the composite laminate structure. Further, a high concentration of fiber will lend to the increased elastic qualities of the individual sheets in the composite laminate structure.

j. Optical Properties

(i) 3-D Effect

A visual three-dimensional effect of depth can be designed into a composite laminate structure which incorporates inorganically filled sheets. To create the 3-D effect of depth, the laminate should comprise a core of a plurality of translucent, resin-impregnated, absorbent and transparent inorganically filled sheets. The inorganically filled sheets can be made increasingly transparent as the air voids are pressed and calendered out of the inorganically filled sheet during the formation thereof. Further, with a high polishing of the surface of the inorganically filled sheet, further transparency is achieved.

Laminated upon the core of the plurality of translucent inorganically filled sheets, two or more translucent resin impregnated decorative sheets with printed variegation therein are laminated to obtain a desired decorative effect. At least two or more translucent resin impregnated translucent intermediate inorganically filled sheets are inserted between the decorative sheets. Finally, a translucent resin-impregnated inorganically filled sheet is laminated to the previous structure.

The resultant 3-D effect is similar to the appearance of decorative stone such as alabaster or marble. The resin which is used could be a melamine resin or a polyester resin or a resin such as epoxy resin. Such resins should have the relevant volatile content to impregnate either the core, the decorative or the intermediate or surface inorganically filled sheets. Preferably, the melamine resins should be transparent or translucent in the cured state. Such resins include melamine-formaldehyde resins, co-polymers of melamine, aqueous amines, and formaldehyde, and acrylic modified melamine formaldehyde resins.

To accomplish the resin impregnation of inorganically filled sheets, it is desirable that the inorganically filled sheets be absorbent in consistency so as to maximize the impregnation thereof. The translucent or transparent sheets near the upper layers add a depth perspective to the decorative sheets therebelow so as to give the impression of depth as a result of the incorporation of decorative sheets with variegated designs at different levels within the laminate.

(ii) Phosphorescent Laminates

A composite laminate structure may be made into an engraving stock for the purpose of manufacturing from such lamination name plates, room numbers, control panels, plaques, diagrams, directories, etc. The engraving stock, which is a high pressure laminate, has a core material which is bonded to a cover material on one or both sides of the core material. By scribing the cover material by any means, such as an electric saw, sandblasting or machine engraving by pantograph, there results a multi-colored sign due to the coloration of the core material.

The proposed composite laminate structure has its core material coated with a phosphorescent material prepared by admixing a phosphor which is non-thermally degradable in nature with a resin such as an epoxy resin, a phenolic-melamine resin, a vinyl resin or the like. Examples of phosphors which are not thermally degradable under conditions of curing include inorganic sulfides which have been activated with other elements. Particular examples of synthetic phosphors which may be utilized include alkaline earth sulfide such as beryllium sulfide, calcium sulfide, strontium sulfide, barium sulfide, and the like, which have been activated with various elements such as bismuth, copper, manganese, cerium, europium, samarium, and the like. The surface material coating the core material may also be inorganically filled sheets, or may be plastic or other suitable material to be bonded to the core material. The phosphorescent material is adapted to be internally activated to luminesce in a sub-normal amount of light.

(iii) Reflective and Absorbent

The present invention also contemplates a composite laminate structure capable of absorbing or reflecting different amounts of light to produce unique visual effects for decorative purposes, as well as producing different amounts of heat when exposed to microwave energy in a microwave oven. To produce such a composite laminate structure, a nonconductive backing formed from inorganically filled sheets is laminated with an electrically semi-conductive metal film. The metal film has thereon a selective resistivity and optical density in one portion thereof and a different resistivity and optical density in another portion. The resultant composite laminate thus has different regions with gradations in resistivity and optical density. As a result, the lamination will absorb or reflect different amounts of light and other forms of electromagnetic radiation.

The amount of metal present in the electrically semi-conductive metal film can vary gradually and continuously or in stages resulting in a series of bands or patches. The resulting semi-conductive coated laminate structure is supple, flexible, and can be made with numerous areas, each of a desired shape and each area adapted to produce a different amount of heat.

The various differentially metallized areas appear uniform, homogenous and uninterrupted to the unaided eye. Several metal-coated areas can be made to appear as various shades of gray or, under some conditions, reflective of light to different degrees.

The metal film is thin enough to be electrically semi-conductive so that during the heating process an electric current induced into the metal film from the electromagnetic field of a microwave oven produces energy losses which heat the food when the composite laminate structure is formed into a food storage container to be used in a microwave oven.

The metal coating can be applied to the inorganically filled sheets by vapor deposition under vacuum. Where there is little electrically conductive metal on the inorganically filled sheets, the optical density will be great in that large amounts of electromagnetic radiation will be transmitted therethrough. Conversely, where there is a heavier deposition of metal on the inorganically filled sheets, the metal will act as a susceptor of microwave energy to produce heat. Thus, when the composite laminate is formed into a food storage bag and microwave radiation is applied thereto, the area of the lamination containing the most metal will heat most rapidly and the compartments of the food storage bag made of the lamination containing less metal coating will heat to a more moderate degree. The amount of metal on the inorganically filled sheets can be regulated by patterned demetalization of the metallized film.

As a further variation, the electrically semiconductive film can be laminated to nonconductive plastic, which is in turn laminated to inorganically filled sheets having paper-like or paperboard-like consistency to achieve similar objectives.

(iv) Transparency and Opacity

Inorganically filled sheets can be made translucent or transparent by removing the number of air voids in the inorganically filled sheet. Pressure techniques such as calendaring can be used to reduce air voids. Alternatively, by highly polishing the surface of the inorganically filled sheet a similar result of reducing air voids can also be achieved. Such inorganically filled sheets, when laminated one to another, result in an overall composite laminate structure having a transparent quality. Such a composite laminate structure can be laminated to an opaque sheet having indicia thereon. In this way, the transparent lamination will allow the indicia to be seen therethrough in the application of a signage or display usage of composite laminate structures. In order to make an inorganically filled sheet opaque, air voids should be included as part of the individual inorganically filled sheet matrix. Thus, inorganically filled sheets can range from being opaque to being transparent depending on the content of air voids therein.

EXAMPLES OF THE EMBODIMENTS

The following examples are presented in order to more specifically illustrate the properties of laminates comprising inorganically filled sheets according to the present invention.

Example 1–3

The effects of lamination of inorganically filled sheets were studied at three different conditions as shown in examples 1–3.

Example 1

Two dry Aliite paper sheets were laminated at 90° to each other by spraying water on the surface of the sheets and passing the sheets through forming rollers. The mix design of the Aliite paper per single batch in example 1 was: 500 g Squmash fiber, 200 g Methocel 240, 1750 gama sperse $CaCO_3$, and 2600 g water.

Example 2

A starch paper laminate was formed by forming crust on both sides of a foam mixture before calendering. The materials of the foam mixture were first cooked at 190° C. for 30–40 seconds to form a crust. The materials were then calendered by passing the foam mixture through the forming rollers. The mix design of the Aliite foam per single batch was: 475 WP potato starch, 120 g SW fiber, 20 g Mg St, 525 R-40 $CaCO_3$, and 1200 g water.

Example 3

Two sheets of Weyerhaeuser office paper were laminated, by spraying a foam mixture on the surfaces of the paper and passing the two sheets through forming rollers. All of the starch in the foam mixture was gelled before spraying. The mix design of the Aliite foam per single batch was: 500 WP potato starch, 120 g SW fiber, 500 g R-40 $CaCO_3$, and 1500 g water.

The tensile properties of the laminated sheets in examples 1–3 were tested and the results were as follows:

| Example | Stress (MPa) | CD Strain (%) |
| --- | --- | --- |
| 1 | 27 | 4 |
| 2 | 8 | 1.5 |
| 3 | 52 | 3 |

SUMMARY

From the foregoing, it will be appreciated that the present invention provides improved compositions and methods for manufacturing laminates incorporating inorganically filled sheets or layers which laminates can be formed into a variety of objects presently formed from laminates of paper, cardboard, polystyrene, plastic, and the like.

The present invention also provides compositions and methods which yield laminates of inorganically filled sheets which have properties similar to laminates of paper, cardboard, polystyrene, and plastic. Such sheets can be formed into a variety of composite laminate structures, which laminate structures can be formed into containers and other objects using the same or similar manufacturing apparatus and techniques as those presently used to form such objects from paper, cardboard, polystyrene, plastic, and the like.

The present invention further provides compositions and methods for manufacturing composite laminate structures which result in the generation of less wastes than those involved in the manufacture of paper, cardboard, plastic, or polystyrene materials. Further, such sheets, as well as the laminates and the containers or other objects made therefrom, are more readily degradable into substances which are commonly found in the earth due to the presence of the inorganically filled sheets in the laminate structure.

In addition, the present invention provides compositions and methods which make possible the manufacture of such sheets incorporated into composite laminate structure at a cost comparable to and even superior to existing methods of manufacturing paper or polystyrene products.

Finally, the present invention provides compositions and methods for mass producing laminates from inorganically filled sheets, which sheets can rapidly be formed and substantially dried within a matter of minutes from the beginning of the manufacturing process, to be subsequently incorporated into composite laminate structures.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture having a laminate structure comprising an inorganically filled sheet and at least one other sheet laminated to the inorganically filled sheet, the inorganically filled sheet including an organic binder selected from the group consisting of polysaccharides, proteins, water soluble polymers, and mixtures and derivatives thereof, a fibrous material, and an inorganic aggregate filler in an amount in a range from about 20% to about 90% by weight of solids in the inorganically filled sheet, said inorganically filled sheet having a thickness less than about 1 cm.

2. An article of manufacture as defined in claim 1, wherein the inorganically filled sheet has physical characteristics which differ from the physical characteristics of the at least one other sheet.

3. An article of manufacture as defined in claim 1, wherein the inorganically filled sheet has chemical characteristics which differ from the chemical characteristics of the at least one other sheet.

4. An article of manufacture as defined in claim 1, wherein the inorganically filled sheet and the at least one other sheet have physical and chemical properties which combine to produce a synergistic result in the laminate structure.

5. An article of manufacture as defined in claim 1, wherein the at least one other sheet creates a barrier to fluid within the laminate structure.

6. An article of manufacture as defined in claim 1, wherein the laminate structure is substantially impermeable to gas.

7. An article of manufacture as defined in claim 1, wherein the laminate structure provides a barrier to electromagnetic radiation.

8. An article of manufacture as defined in claim 1, wherein the at least one other sheet comprises a metallic material.

9. An article of manufacture as defined in claim 1, wherein the laminate structure provides a fire retardant barrier.

10. An article of manufacture as defined in claim 9, wherein the fire retardant barrier is essentially noncombustible.

11. An article of manufacture as defined in claim 1, wherein the organic binder comprises a cellulose-based material.

12. An article of manufacture as defined in claim 11, wherein the cellulose-based material is selected from the group consisting of methylhydroxyethylcellulose, hydroxymethylethylcellulose, carboxymethylcellulose, methylcellulose, ethylcellulose, hydroxyethylcellulose, hydroxyethyl-propylcellulose, and mixtures or derivatives thereof.

13. An article of manufacture as defined in claim 1, wherein the organic binder comprises a starch-based material.

14. An article of manufacture as defined in claim 13, wherein the starch-based material is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

15. An article of manufacture as defined in claim 1, wherein the organic binder comprises a polysaccharide material selected from the group consisting of alginic acid, phycocolloids, agar, gum arabic, guar gum, locust bean gum, gum caraya, gum tragacanth, and mixtures or derivatives thereof.

16. An article of manufacture as defined in claim 1, wherein the organic binder comprises a protein-based material selected from the group consisting of prolamine, collagen, casein, and mixtures or derivatives thereof.

17. An article of manufacture as defined in claim 1, wherein the organic binder further comprises a synthetic organic material selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethyleneoxide polymers, polylactic acid, synthetic clay, latex, and mixtures or derivatives thereof.

18. An article of manufacture as defined in claim 1, wherein the organic binder has a concentration in a range from about 2% to about 40% by weight of total solids in the inorganically field sheet.

19. An article of manufacture as defined in claim 1, wherein the organic binder has a concentration in a range from about 5% to about 30% by weight of total solids in the inorganically filled sheet.

20. An article of manufacture as defined in claim 1, wherein the inorganic aggregate filler is selected from the group consisting of perlite, vermiculite, sand, gravel, rock, limestone, sandstone, glass beads, aerogel, xerogels, seagel, mica, clay, synthetic clay, alumina, fly ash, fumed silica, fused silica, tabular alumina, kaolin, microspheres, hollow glass spheres, porous ceramic spheres, gypsum dihydrate, calcium carbonate, calcium aluminate, cork, fiber glass, lightweight polymers, xonotlite, lightweight expanded clays, hydrated cement particles, unhydrated cement particles, pumice, exfoliated rock, and mixtures or derivatives thereof.

21. An article of manufacture as defined in claim 1, wherein the inorganic aggregate filler has a concentration in a range from about 30% to about 80% by weight of total solids in the inorganically filled sheet.

22. An article of manufacture as defined in claim 1, wherein the inorganic aggregate filler has a concentration in a range from about 40% to about 70% by weight of total solids in the inorganically filled sheet.

23. An article of manufacture as defined in claim 1, wherein the inorganically filled sheet further comprises an organic aggregate.

24. An article of manufacture as defined in claim 23, wherein the organic aggregate is selected from the group consisting of seeds, starches, gelatins, agar materials, and mixtures or derivatives thereof.

25. An article of manufacture as defined in claim 23, wherein the organic aggregate is a light-weight polyethylene having a concentration between about 3% to about 6% by weight of total solids in the inorganically filled sheet.

26. An article of manufacture as defined in claim 1, wherein the fibrous material comprises organic fibers.

27. An article of manufacture as defined in claim 26, wherein the organic fibers are selected from the group consisting of hemp, cotton, bagasse, abaca, flax, southern pine, southern hardwood fibers, and mixtures or derivatives thereof.

28. An article of manufacture as defined in claim 1, wherein the fibrous material comprises inorganic fibers.

29. An article of manufacture as defined in claim 28, wherein the inorganic fibers are selected from the group consisting of glass fibers, silica fibers, ceramic fibers, carbon fibers, metal fibers, and mixtures or derivatives thereof.

30. An article of manufacture as defined in claim 1, wherein the fibrous material includes individual fibers having an average aspect ratio of at least about 10:1.

31. An article of manufacture as defined in claim 1, wherein the fibrous material includes individual fibers having an average aspect ratio of at least about 100:1.

32. An article of manufacture as defined in claim 1, wherein the fibrous material includes individual fibers having an average aspect ratio of at least about 200:1.

33. An article of manufacture as defined in claim 1, wherein the fibrous material has a concentration in a range from about 0.2% to about 60% by weight of total solids in the inorganically filled sheet.

34. An article of manufacture as defined in claim 1, wherein the fibrous material has a concentration in a range from about 1% to about 40% by weight of total solids in the inorganically filled sheet.

35. An article of manufacture as defined in claim 1, wherein the fibrous material has a concentration in a range from about 5% to about 20% by weight of total solids in the inorganically filled sheet.

36. An article of manufacture as defined in claim 1, wherein the fibrous material comprises a mixture of different fibers having varying strengths and flexibilities.

37. An article of manufacture as defined in claim 1, wherein the fibrous material increases the flexibility of the inorganically filled sheet.

38. An article of manufactured as defined in claim 1, wherein the fibrous material comprises individual fibers which have a substantially random orientation within the inorganically filled sheet.

39. An article of manufacture as defined in claim 1, wherein the fibrous material comprises individual fibers which have a substantially unidirectional orientation within the inorganically filled sheet.

40. An article of manufacture as defined in claim 1, wherein the fibrous material comprises individual fibers which have a substantially bidirectional orientation within the inorganically filled sheet.

41. An article of manufacture as defined in claim 1, wherein the inorganically filled sheet is water degradable.

42. An article of manufacture as defined in claim 1, wherein the inorganically filled sheet is readily degradable into environmentally neutral components.

43. An article of manufacture as defined in claim 1, wherein the inorganically filled sheet has a tensile strength in a range from about 0.05 MPa to about 70 MPa.

44. An article of manufacture as defined in claim 1, wherein the inorganically filled sheet has a tensile strength in a range from about 5 MPa to about 40 MPa.

45. An article of manufacture as defined in claim 1, wherein the inorganically filled sheet has a tensile strength to density ratio in a range from about 2 MPa-cm$^3$/g to about 200 MPa-cm$^3$/g.

46. An article of manufacture as defined in claim 1, wherein the inorganically filled sheet has a tensile strength to density ratio in a range from about 3 MPa-cm$^3$/g to about 50 Mpa-cm$^3$/g.

47. An article of manufacture as defined in claim 1, wherein the inorganically filled sheet has a maximum density of about 2 g/cm$^3$.

48. An article of manufacture as defined in claim 1, wherein the inorganically filled sheet has a density in a range from about 0.4 g/cm$^3$ to about 1.5 g/cm$^3$.

49. An article of manufacture as defined in claim 1, wherein the inorganically filled sheet can elongate in a range from about 0.5% to about 8% without completely fracturing.

50. An article of manufacture as defined in claim 1, wherein at least one of the inorganically filled sheet and the one other sheet is corrugated.

51. An article of manufacture as defined in claim 1, wherein at least one of the inorganically filled sheet and the one other sheet is creped.

52. An article of manufacture as defined in claim 1, wherein the inorganically filled sheet has been compacted.

53. An article of manufacture as defined in claim 1, wherein the inorganically filled sheet has been calendared.

54. An article of manufacture as defined in claim 1, further comprising a coating on at least a portion of the inorganically filled sheet.

55. An article of manufacture as defined in claim 1, further comprising an adhesive between the inorganically filled sheet and the one other sheet.

56. An article of manufacture as defined in claim 1, wherein the inorganically filled sheet has been resin impregnated.

57. An article of manufacture as defined in claim 1, wherein the laminate structure further comprises a cavity within the laminate structure, wherein the cavity is formed by a structural element within the cavity.

58. An article of manufacture as defined in claim 57, wherein the cavity is formed between the inorganically filled sheet and the one other sheet.

59. An article of manufacture as defined in claim 57, wherein the cavity comprises a material selected from the group consisting of a fluid, a gas, a granular particulate material, a solid material, and mixtures thereof.

60. An article of manufacture as defined in claim 1, wherein the laminate structure further comprises:
means for adhering the inorganically filled sheet and the one other sheet together to form the laminate structure.

61. An article of manufacture as defined in claim 60, wherein the one other sheet is wet bond laminated to the inorganically filled sheet.

62. An article of manufacture as defined in claim 60, wherein the one other sheet is dry bond laminated to the inorganically filled sheet.

63. An article of manufacture as defined in claim 60, wherein the one other sheet is thermal bond laminated to the inorganically filled sheet.

64. An article of manufacture as defined in claim 60, wherein the one other sheet is cementitious bond laminated to the inorganically filled sheet.

65. An article of manufacture as defined in claim 1, wherein at least one of the inorganically filled sheet or the other sheet is porous.

66. An article of manufacture as defined in claim 1, wherein at least one of the inorganically filled sheet or the other sheet is impervious.

67. An article of manufacture as defined in claim 1, wherein the inorganically filled sheet has a thickness less than about 3 mm.

68. An article of manufacture as defined in claim 1, wherein the laminate structure is mass producible.

69. An article of manufacture as defined in claim 1, wherein the inorganically filled sheet includes finely dispersed air voids.

70. An article of manufacture as defined in claim 1, wherein the laminate structure is fashioned into a container.

71. An article of manufacture as defined in claim 1, wherein the laminate structure has a tubular shape.

72. An article of manufacture as defined in claim 1, wherein the laminate structure is water degradable.

73. An article of manufacture as defined in claim 1, wherein the laminate structure includes a score cut.

74. An article of manufacture as defined in claim 1, wherein the laminate structure includes a perforation.

75. An article of manufacture as defined in claim 1, wherein the laminate structure comprises a continuous inorganically filled sheet that has been rolled onto a spool.

76. An article of manufacture as defined in claim 1, wherein the one other sheet is selected from the group consisting of metallic foils, textile fabrics, paper, paperboard, foam, sheets that form bonding with increased temperatures, inorganically filed sheets, plastics, and mixtures or derivatives thereof.

77. An article of manufacture as defined in claim 1, wherein the laminate structure is photosensitive.

78. An article of manufacture as defined in claim 1, wherein the laminate structure is translucent.

79. An article of manufacture as defined in claim 1, wherein the laminate structure is transparent.

80. An article of manufacture as defined in claim 1, wherein the laminate structure is water-proof.

81. An article of manufacture as defined in claim 1, wherein the laminate structure is oil resistant.

82. An article of manufacture as defined in claim 1, wherein the laminate structure is a barrier to flavor.

83. An article of manufacture as defined in claim 1, wherein the laminate structure is a barrier to odor.

84. An article of manufacture as defined in claim 1, wherein the laminate structure is a barrier to microwave radiation.

85. An article of manufacture as defined in claim 1, wherein the laminate structure is a barrier to electricity.

86. An article of manufacture as defined in claim 1, wherein the laminate structure is an electrical insulator.

87. An article of manufacture as defined in claim 1, wherein the laminate structure is an electrical conductor.

88. An article of manufacture as defined in claim 1, wherein the laminate structure is a barrier to sound.

89. An article of manufacture as defined in claim 1, wherein the laminate structure is a thermal insulation barrier.

90. An article of manufacture as defined in claim 1, wherein the laminate structure is an abrasion resistant barrier.

91. An article of manufacture as defined in claim 1, wherein the laminate structure is a barrier to biological agents.

92. An article of manufacture as defined in claim 1, wherein at least one of the inorganically filled sheet or the one other sheet comprise a cellular structure.

93. An article of manufacture as defined in claim 1, wherein the one other sheet is selected from the group consisting of a polyolefin, ethylvinyl alcohol, a polyester, a co-polymerized polyester, a polyamide, aluminum foil, caulking polymer layers, polyethylene terephthalate, polyurethane elastomers, polyethylene, polyvinylchloride film, polybutylene terephthalate, and mixtures or derivatives thereof.

94. An article of manufacture as defined in claim 1, wherein the laminate structure is coated with a conductive ink so that the laminate structure has an anti-static quality.

95. An article of manufacture as defined in claim 1, wherein the laminate structure is glossy.

96. An article of manufacture having a laminate structure produced by the process comprising the steps of:
   providing an inorganically filled sheet including an organic binder selected from the group consisting of polysaccharides, proteins, water soluble polymers, and mixtures and derivatives thereof, a fibrous material, and an inorganic aggregate filler in an amount in a range from about 20% to about 90% by weight of solids in the inorganically filled sheet, said inorganically filled sheet having a thickness less than about 1 cm;
   providing at least one other sheet to be laminated to the inorganically filled sheet;
   applying an adhesive to one of the inorganically filled sheet or the at least one other sheet;
   placing the inorganically filled sheet and the at least one other sheet together; and
   pressing the inorganically filled sheet and the at least one other sheet together.

97. An article of manufacture as defined in claim 96, further including the step of applying heat to the inorganically filled sheet and the at least one other sheet subsequent to the pressing step.

98. An article of manufacture as defined in claim 96, further including the step of corrugating at least one of the inorganically filled sheet or the one other sheet prior to placing the inorganically filled sheet and the one other sheet together.

99. An article of manufacture as defined in claim 96, further including the step of coating at least one of the inorganically filled sheet or the one other sheet prior to placing the inorganically filled sheet and the one other sheet together.

100. An article of manufacture as defined in claim 96, further including the step of fashioning the laminate structure into a container.

101. An article of manufacture as defined in claim 96, further including the step of perforating the laminate structure to facilitate bending of the laminate structure.

102. An article of manufacture having a laminate structure produced by the process comprising the steps of:
   providing an inorganically filled sheet wound on a spool and including an organic binder selected from the group consisting of polysaccharides, proteins, water soluble polymers, and mixtures and derivatives thereof, an inorganic aggregate filler in an amount in a range from about 20% to about 90% by weight of solids in the inorganically filled sheet, and a substantial quantity of starch, said inorganically filled sheet having a thickness less than about 1 cm;
   providing at least one other sheet to be laminated to the inorganically filled sheet;
   removing at least a portion of the inorganically filled sheet from the spool;
   pressing the portion of the inorganically filled sheet and the at least one other sheet together; and
   heating the inorganically filled sheet and the at least one other sheet together in order to form a thermoformed bond therebetween.

103. An article of manufacture as defined in claim 102, further including the step of fashioning the laminate structure into a container.

104. An article of manufacture as defined in claim 102, further including the step of perforating the laminate structure to facilitate bending of the laminate structure.

105. An article of manufacture as defined in claim 102, further including the step corrugating at least one of the portion of the inorganically filled sheet or the one other sheet prior to pressing the portion of the inorganically filled sheet and the one other sheet together.

106. An article of manufacture as defined in claim 102, further including the step of coating at least one of the portion of the inorganically filled sheet or the one other sheet prior to pressing the portion of the inorganically filled sheet and the one other sheet together.

107. An article of manufacture having a laminate structure comprising:
   (a) a starch-bound sheet, including:
      (i) a binding matrix including starch and a cellulosic ether, the starch having a concentration in a range from about 5% to about 90% by weight of total solids in the starch-bound sheet, the cellulosic ether having a concentration in a range from about 0.5% to about 10% by weight of total solids in the starch-bound sheet;
      (ii) a fibrous material substantially homogeneously dispersed throughout the binding matrix and having a concentration of at least 3% by weight of total solids in the starch-bound sheet; and
      (iii) an inorganic aggregate filler having a concentration in a range from about 0% to about 90% by weight of total solids in the starch-bound sheet;
   wherein the starch-bound sheet has a thickness less than about 1 cm and a density greater than about 0.5 g/cm$^3$; and
   (b) at least one other sheet laminated to the starch-bound sheet.

108. An article of manufacture as defined in the claim 107, wherein the starch has a concentration in a range from about 15% to about 75% by weight of total solids in the starch-bound sheet.

109. An article of manufacture as defined in claim 107, wherein the starch has a concentration in a range from about 30% to about 70% by weight of total solids in the starch-bound sheet.

110. An article of manufacture as defined in claim 107, wherein the starch comprises unmodified potato starch.

111. An article of manufacture as defined in claim 107, wherein the starch comprises unmodified corn starch.

112. An article of manufacture as defined in claim 107, wherein the starch comprises unmodified waxy corn starch.

113. An article of manufacture as defined in claim 107, wherein the cellulosic ether has a concentration in a range from about 1% to about 5% by weight of total solids in the starch-bound sheet.

114. An article of manufacture as defined in claim 107, wherein the cellulosic ether has a concentration in a range from about 2% to about 4% by weight of total solids in the starch-bound sheet.

115. An article of manufacture as defined in claim 107, wherein the cellulosic ether is selected from the group consisting of methylhydroxyethylcellulose, hydroxymethylethylcellulose, carboxymethylcellulose, methylcellulose, ethylcellulose, hydroxyethylcellulose, hydroxyethyl-propylcellulose, and mixtures or derivatives thereof.

116. An article of manufacture as defined in claim 107, wherein the binding matrix further includes a protein-based binder selected from the group consisting of prolamine, collagen, gelatin, glue, casein, and mixtures or derivatives thereof.

117. An article of manufacture as defined in claim 107, wherein the binding matrix further includes a polysaccharide selected from the group consisting of alginic acid, phycocolloids, agar, gum arabic, guar gum, locust bean gum, gum karaya, gum tragacanth, and mixtures or derivatives thereof.

118. An article of manufacture as defined in claim 107, wherein the binding matrix further includes a synthetic organic binder selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, latex, and mixtures or derivatives thereof.

119. An article of manufacture as defined in claim 107, wherein the inorganic aggregate filler has a concentration in a range from about 20% to about 80% by weight of total solids in the starch-bound sheet.

120. An article of manufacture as defined in claim 107, wherein the inorganic aggregate filler has a concentration in a range from about 30% to about 70% by weight of total solids in the starch-bound sheet.

121. An article of manufacture as defined in claim 107, wherein the inorganic aggregate filler is selected from the group consisting of clay, gypsum, calcium carbonate, mica, silica, alumina, sand, gravel, sandstone, limestone, and mixtures or derivatives thereof.

122. An article of manufacture as defined in claim 107, wherein the inorganic aggregate filler comprises individual particles that are size optimized in order to achieve a predetermined natural particle packing density.

123. An article of manufacture as defined in claim 107, wherein the natural particle packing density of the inorganic aggregate filler is at least about 0.65.

124. An article of manufacture as defined in claim 107, wherein the inorganic aggregate filler comprises a lightweight aggregate selected from the group consisting of perlite, vermiculite, hollow glass spheres, porous ceramic spheres, pumice, and mixtures thereof.

125. An article of manufacture as defined in claim 107, wherein the fibrous material has a concentration in a range from about 5% to about 30% by weight of total solids in the starch-bound sheet.

126. An article of manufacture as defined in claim 107, wherein the fibrous material has a concentration in a range from about 7% to about 20% by weight of total solids in the starch-bound sheet.

127. An article of manufacture as defined in claim 107, wherein the fibrous material comprises organic fibers selected from the group consisting of hemp fibers, cotton fibers, bagasse fibers, abaca fibers, flax, southern pine fibers, southern hardwood fibers, and mixtures thereof.

128. An article of manufacture as defined in claim 107, wherein the fibrous material comprises inorganic fibers selected from the group consisting of glass fibers, silica fibers, ceramic fibers, carbon fibers, metal fibers, and mixtures thereof.

129. An article of manufacture as defined in claim 107, wherein the fibrous material includes individual fibers having an average aspect ratio of at least about 10:1.

130. An article of manufacture as defined in claim 107, wherein the fibrous material includes individual fibers having an average aspect ratio of at least about 100:1.

131. An article of manufacture as defined in claim 107, wherein the fibrous material includes a mixture of different fibers having varying strengths and flexibilities.

132. An article of manufacture as defined in claim 107, wherein the fibrous material comprises individual fibers which have a substantially random orientation within the starch-bound sheet.

133. An article of manufacture as defined in claim 107, wherein the fibrous material comprises individual fibers which have a substantially unidirectional orientation within the starchbound sheet.

134. An article of manufacture as defined in claim 107, wherein the fibrous material comprises individual fibers which have a substantially bidirectional orientation within the starchbound sheet.

135. An article of manufacture as defined in claim 107, wherein the starch-bound sheet has a tensile strength to density ratio in a range from about 2 MPa•cm$^3$/g to about 500 MPa•cm$^3$/g.

136. An article of manufacture as defined in claim 107, wherein the starch-bound sheet has a tensile strength to density ratio in a range from about 5 MPa•cm$^3$/g to about 150 MPa•cm$^3$/g.

137. An article of manufacture as defined in claim 107, wherein the starch-bound sheet has a tensile strength in a range from about 0.05 MPa to about 100 Mpa.

138. An article of manufacture as defined in claim 107, wherein the starch-bound sheet has a tensile strength in a range from about 5 MPa to about 80 MPa.

139. An article of manufacture as defined in claim 107, wherein the starch-bound sheet has a density greater than about 1 g/cm$^3$.

140. An article of manufacture as defined in claim 107, wherein the starch-bound sheet has a density greater than about 1.5 g/cm$^3$.

141. An article of manufacture as defined in claim 107, wherein the starch-bound sheet can elongate in a range from about 0.5% to about 12% without completely fracturing.

142. An article of manufacture as defined in claim 107, wherein the starch-bound sheet is water degradable.

143. An article of manufacture as defined in claim 107, wherein at least one of the starch-bound sheet and the other sheet is corrugated.

144. An article of manufacture as defined in claim 107, wherein at least one of the starch-bound sheet and the other sheet is creped.

145. An article of manufacture as defined in claim 107, wherein at least one of the starch-bound sheet and the other sheet further includes a coating.

146. An article of manufacture as defined in claim 107, wherein the one other sheet is selected from the group consisting of metallic foils, textile fabrics, paper, paperboard, foam, sheets that form bonding with increased temperatures, inorganically filed sheets, plastics, and mixtures or derivatives thereof.

* * * * *

UNITED STATES PATENT AND TRADEMARK OFFICE
CERTIFICATE OF CORRECTION

PATENT NO. : 5,830,548

DATED : Nov. 3, 1998

INVENTOR(S) : Per Just Andersen, Simon K. Hudson

It is certified that error appears in the above-identified patent and that said Letters Patent is hereby corrected as shown below:

Col. 1, lines 27, 35, and 39, change "Anderson" to --Andersen--

Col. 7, line 31, after "highly" change "processes" to --processed--

Col. 8, line 44, after "would" insert --be--

Col. 10, line 33, after "inorganic" change "fillers" to --filler--

Col. 13, line 7, after "desired" change "Theological" to --rheology--

Col. 19, line 51, after "structure" change "iO" to --10--

Col. 20, line 57, after "coating" insert --layer--

Col. 25, line 10, after "fine" change "yams" to --yarns--

Col. 27, line 39, after "claims" change "is" to --are--

Col. 31, line 17, after "xerogels," change "scagel," to --seagel,--

Col. 31, line 49, delete the second occurance of "calcium oxide,"

Col. 33, line 1, after "choice," delete --the--

Col. 33, line 35, before "properties" change "Theological" to --rheological--

Col. 33, line 64, after "obtain" change "an" to --a--

Col. 34, line1, change "W/m•K" to --W/m·K--

UNITED STATES PATENT AND TRADEMARK OFFICE
CERTIFICATE OF CORRECTION

PATENT NO. : 5,830,548
DATED : Nov. 3, 1998
INVENTOR(S) : Per Just Andersen, Simon K. Hudson It is certified that error appears in the above-identified patent and that said Letters Patent is hereby corrected as shown below:

Col. 34, line 5, change "hr•ft$^2$°F/BTU" to --hr·ft$^2$°F/BTU--

Col. 34, line 11, change "hr•ft$^2$°F/BTU•in." to --hr·ft$^2$°F/BTU·in.--

Col. 34, line 16, change "hr•ft$^2$°F/BTU•in." to --hr·ft$^2$°F/BTU·in.--

Col. 36, line 8, after "aluminum" change "floe" to --floc--

Col. 36, line 45, after "Tylose®)" delete ")"

Col. 43, line 44, after "of" insert --the--

Col. 45, line 14, after "an" change "Firich" to --Eirich--

Col. 49, line 12, before "rollers" insert --reduction--

Col. 49, line 35, after "tend" delete --14--

Col. 54, lines 24 and 25, after "FIGS." change "1a and 1a" to --11a and 11b)--

Col. 59, line 44, after "braces," change "comer" to --corner--

Col. 62, line 23, after "incorporating" insert --the--

Col. 68, line 40, after "that" change "arc" to --are--

Col. 70, line 24, after "wet" change "inoinorganically" to --inorganically--

Col. 70, line 58, after "or" change "in" to --it--

UNITED STATES PATENT AND TRADEMARK OFFICE
CERTIFICATE OF CORRECTION

PATENT NO. : 5,830,548

DATED : Nov. 3, 1998

INVENTOR(S) : Per Just Andersen, Simon K. Hudson

It is certified that error appears in the above-identified patent and that said Letters Patent is hereby corrected as shown below:

Col. 75, line 5, change "(1) Porouslimpervious Layers" to --Porous/Impervious Layers--

Col. 86, line 45, after "then" insert --be--

Col. 88, line 3, after "to" insert --be--

Col. 98, line 26, after "inorganically" change "filed" to --filled--

Col. 102, lines 23 and 24, change "2MPa·cm$^3$/g to about 500 Mpa·cm$^3$/g." to --2MPa·cm$^3$/g to about 500 Mpa·cm$^3$/g.--

Col. 102, line 27 and 28, change "2MPa·cm$^3$/g to about 500 Mpa·cm$^3$/g." to --5MPa·cm$^3$/g to about 150 Mpa·cm$^3$/g--

Col. 102, line 59, after "inorganically" change "filed" to --filled--

Signed and Sealed this

Eighth Day of February, 2000

Q. TODD DICKINSON

Attesting Officer

Commissioner of Patents and Trademarks